US009652939B2

(12) United States Patent
Malek

(10) Patent No.: US 9,652,939 B2

(45) **Date of Patent: *May 16, 2017**

(54) SYSTEM AND METHOD OF CONDUCTING GAMES OF CHANCE AS A PROXY OR BASIS FOR ANOTHER PLAYER

(71) Applicant: Sean Malek, Las Vegas, NV (US)

(72) Inventor: Sean Malek, Las Vegas, NV (US)

(73) Assignee: Sean Malek, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,273

(22) Filed: Jul. 17, 2016

(65) Prior Publication Data

US 2016/0371935 A1 Dec. 22, 2016

Related U.S. Application Data

(63) Continuation-in-part of application No. 14/846,748, filed on Sep. 5, 2015, now Pat. No. 9,396,612, which is a continuation-in-part of application No. 14/742,405, filed on Jun. 17, 2015, now Pat. No. 9,218,722.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC ........ *G07F 17/3288* (2013.01); *G07F 17/323* (2013.01); *G07F 17/326* (2013.01); *G07F 17/3211* (2013.01); *G07F 17/3244* (2013.01); *G07F 17/3251* (2013.01); *G07F 17/3255* (2013.01); *G07F 17/3293* (2013.01); *G07F 17/34* (2013.01)

(58) Field of Classification Search

USPC ........ 463/13, 17, 20, 21, 22, 25, 27, 39, 42; 273/292

See application file for complete search history.

(56) References Cited

U.S. PATENT DOCUMENTS 6,358,149 B1 * 3/2002 Schneider ........... G07F 17/3244 463/27

2013/0090160 A1 * 4/2013 Iyer ..................... G07F 17/3258 463/27

* cited by examiner

*Primary Examiner* — Adetokunbo O Torimiro

(74) *Attorney, Agent, or Firm* — MaxValue IP LLC

(57) ABSTRACT

To bring the excitement to the people (majority, who are not experts in games), we present the examples, described here, for one person to be able to bet on and be part of the deal and excitement for a third party, as his agent, proxy, or shadow, to bet for him, or instead of him, or as if the first person was doing the game directly, or one betting for another, or one playing for another with the other person's money. That generates more excitement on the game or casino, with more participation, transactions, income, profit, loyalty, and repeat customers. This brings a lot of variations on the game, e.g., stock market model, or derivatives model, or hedge model. This can be applied to sports and table games or fantasy sports. This can be applied to online, real, mobile, fantasy, simulation, computer generated, human based, or casino games or settings.

30 Claims, 39 Drawing Sheets

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Of A Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

165

*FIG. 2A*

PRIOR ART-Jacks or Better

| Hand | 1 Credit | 2 Credits | 3 Credits | 4 Credits | 5 Credits |
|---|---|---|---|---|---|
| Natural Royal Flush | 300 | 600 | 900 | 1200 | 4000 |
| Four Deuces | 200 | 400 | 600 | 800 | 1000 |
| Wild Royal Flush | 25 | 50 | 75 | 100 | 125 |
| Five Of A Kind | 15 | 30 | 45 | 60 | 75 |
| Straight Flush | 9 | 18 | 27 | 36 | 45 |
| Four Of A Kind | 5 | 10 | 15 | 20 | 25 |
| Full House | 3 | 6 | 9 | 12 | 15 |
| Flush | 2 | 4 | 6 | 8 | 10 |
| Straight | 2 | 4 | 6 | 8 | 10 |
| Three Of A Kind | 1 | 2 | 3 | 4 | 5 |

170

*FIG. 2B*

PRIOR ART-Deuces Wild

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces | 160 | 320 | 480 | 640 | 800 |
| Full House | 10 | 20 | 30 | 40 | 50 |
| Flush | 7 | 14 | 21 | 28 | 35 |
| Straight | 5 | 10 | 15 | 20 | 25 |
| Three Of A Kind | 3 | 6 | 9 | 12 | 15 |
| Two Pair | 1 | 2 | 3 | 4 | 5 |
| Jacks Or Better | 1 | 2 | 3 | 4 | 5 |

175

*FIG. 2C*

PRIOR ART-Double Bonus

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces w/2,3, or 4 | 400 | 800 | 1200 | 1600 | 2000 |
| Four 2,3, or 4 w/A-4 | 160 | 320 | 480 | 640 | 800 |
| Four Aces | 160 | 320 | 480 | 640 | 800 |
| Four 2,3, or 4 | 80 | 160 | 240 | 320 | 400 |
| Four 5-K | 50 | 100 | 150 | 200 | 250 |
| Full House | 10 | 20 | 30 | 40 | 50 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 1 | 2 | 3 | 4 | 5 |
| Jacks Or Better | 1 | 2 | 3 | 4 | 5 |

180

*FIG. 2D*

PRIOR ART-Double Double Bonus

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces | 80 | 160 | 240 | 320 | 400 |
| Four 2,3, or 4 | 40 | 80 | 120 | 160 | 200 |
| Four 5-K | 25 | 50 | 75 | 100 | 125 |
| Full House | 7 | 14 | 21 | 28 | 35 |
| Flush | 5 | 10 | 15 | 20 | 25 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

185

PRIOR ART-5/7 Bonus Poker

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Of A Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

200

FIG. 3A (≤$50.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

205

FIG. 3B ($50.25 to $100.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 75 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

210

FIG. 3C
($100.25 to $200.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 75 |
| Flush | 6 | 12 | 18 | 24 | 40 |
| Straight | 4 | 8 | 12 | 16 | 25 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

215

FIG. 3D
(>$200.00)

SYSTEM AND METHOD OF CONDUCTING GAMES OF CHANCE AS A PROXY OR BASIS FOR ANOTHER PLAYER

RELATED APPLICATIONS

This application is a Continuation-in-part (CIP) of another co-pending application Ser. No. 14/846,748, filed Sep. 5, 2015, now allowed, which was a Continuation-in-part (CIP) of another application Ser. No. 14/742,405, filed 2015 Jun. 17, now U.S. Pat. No. 9,218,722, issued on Dec., 22, 2015, which is a Continuation-in-part (CIP) of another co-pending application Ser. No. 14/702,701, filed 2, May 2015, which is an application as a Continuation-in-part (CIP) of another application Ser. No. 14/465,670, filed Aug. 21, 2014, now allowed, as U.S. Pat. No. 9,022,858, issued on May 5, 2015, which is a Continuation-in-part (CIP) of another application Ser. No. 14/096,140, filed 4 Dec. 2013, which is a continuation-in-part application of U.S. patent application Ser. No. 12/050,768 filed on Mar. 18, 2008, now U.S. Pat. No. 8,641,514, issued Feb. 4, 2014, which is a continuation-in-part application of U.S. patent application Ser. No. 11/688,111 filed on Mar. 19, 2007. It incorporates by reference the teachings of all applications above, and claims priority to the filing dates of all applications above.

FIELD OF INVENTION

The embodiments of the present invention relate to a system and method of enhancing conventional game in a game of chance, based on the third party proxy, agent, or basis.

BACKGROUND

Casinos are a mix of electronic gaming machines (e.g., slot machines) and live casino games (e.g., craps), or table games, e.g., poker or other playing card games. Most people are not experts in these games, but enjoy playing anyway, with limited skills. Some games have very complex rules and require complex analysis. So, very few are very good at it, but the rest just enjoy watching the experts play. For example, lots of people watch tournaments played on TV for various games, e.g., poker. It can be used for people who are at different casinos or machines, or who cannot physically be there, or cannot afford to go there, or do not have time to go there, or the specific game is not there at the current location. The proxy scheme can help all of those people/situations. It can be used for a $1^{st}$ person, who thinks that the $2^{nd}$ person is an expert or lucky or has luck or is on a lucky machine or on lucky streak or on a roll or has more chance of winning or has a lucky object, or has those impressions mentioned above, regardless of the actual data or validity. So, in those cases, the $1^{st}$ person wants to be in his place, or wants to be there, or wants to sit on that machine and play, instead or with the $2^{nd}$ person.

SUMMARY

To bring the excitement to the rest of people (majority, who are not experts), we invented the following embodiments, described below, for one person be able to bet on and be part of the deal and excitement for a third party, as his agent, proxy, or shadow, to bet for him, or instead of him, or as if the first person was doing the game directly, or one betting for another, or one playing for another with the other person's money. That generates more excitement on the game or casino, with more participation, transactions, income, profit, loyalty, and repeat customers.

This also brings a lot of variations on the game, e.g., stock market model, or derivatives model, or hedge fund model, to make the game very innovative and exciting for mass of people, i.e., majority of people who want to play and cheer up the experts from the side-line, but have a stake in the game and result, making it more interactive and engaging than anything else that has been introduced in casinos and gaming industry, so far. Other variations, embodiments and features of the present invention will become evident from the following detailed description, drawings and claims.

BRIEF DESCRIPTION OF THE DRAWINGS

FIGS. 2*a*-2*e* illustrate four conventional video poker pay tables;

FIGS. 3*a*-3*d* illustrate an exemplary group of pay tables according to the embodiments of the present invention;

FIG. 7 illustrates a flow chart detailing a methodology associated with an embodiment of the present invention utilized with live games of chance.

DETAILED DESCRIPTION

Figure 1:
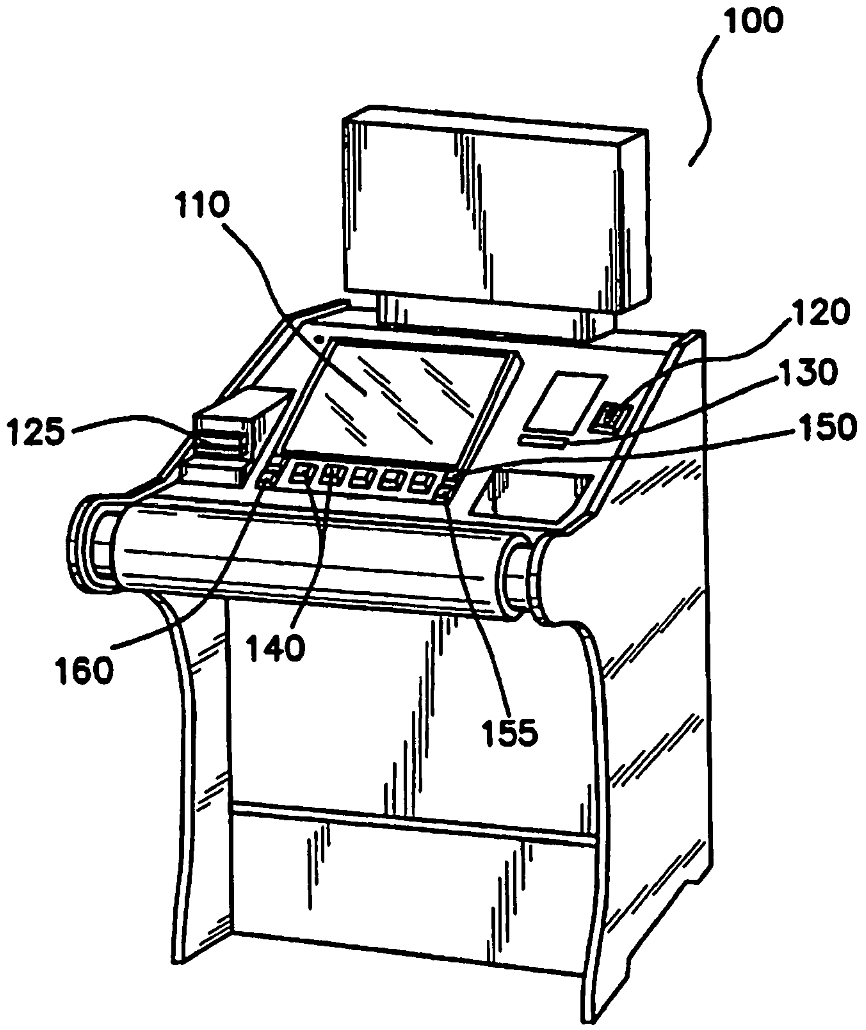
FIG. 1 illustrates a conventional video poker machine.

Proxy or Agent-playing:

Here, we describe embodiments related to the proxy or agent-playing methods and systems for casinos and gaming machines or industry. In one embodiment, we have an original player or expert player. Then, we have one or more players as audience, with low expertise, but game enthusiast, who want to participate, more than watching from sideline. These players are tag along/piggyback/coattail players (new players) who want to learn the games from masters, or want to play for fun alongside masters of the game (experts), or want to make some money based on the expertise of another person. Or, it is for people who, for any reason, cannot be there, or at that time, or for sake of money, they cannot be there.

Here, we describe embodiments for gaming/slot machine or table games or thinking games or board games or strategic games or analyzing games, through which a new player could choose from an array of other machines or electronically controlled/monitored/managed games of chance, with ongoing games and bet along with the ongoing game in real time. Or, the new player could wait for a gaming session to begin on a specific machine or for electronically controlled/monitored/managed game.

This could be one or multiple games at once. It could be that the new player sees the actual game(s) all at the same time in smaller screens, or flip through and go to each game in order to follow the progress, or just be a graph for each ongoing game to show the trend of the game (e.g., winning/losing, how long been playing, how much money the session started with, how much credit is in play now, and any information that may help player choose where to tag along, e.g., history and comments about a master, or number of scores and points or winnings, or statistics of all games the player or master has done so far, or amount of risk the player takes as a score or percentage, based on a base line or threshold, historically or up to now or recently). This could be average, cumulative, weighted average, or total for each of metrics or parameters. This is for comparisons between different game masters or experts. There can be comment or scores for social media around the same topic or game or player, to get a score, or rating, or ranking. It can have follower or fan club or Twitter follower based on that. People can invite friends to join the club or fan club. They can have discounts or coupons or special events for fan club members. Casinos can get data mining from these data or fan club members to customize the message or market for all members, to increase revenue and memberships, or expand the club very fast, or have a repeat customer.

This could be on any device, mobile, phone, casino, virtual, PC, remote, in-person, through Internet, secure network, gaming machine, table, tablet, or the like. This could be inside a casino, remote, nearby, in vicinity, with RFID, in line of sight, with infra-red communicator, with laser communicator, or with one central computer or server. This could be on separate computers, or server farm, or array of computers or processors, or communicating devices peer-to-peer, or centralized, or distributed, or parallel, or the like. This could be in real time or with delay process. This could be in-device processing, or in mobile app, or in mobile device, or centralized, or remote processing, or distributed.

In one embodiment, a new player may allocate portions (percentage or fixed amounts or conditional amounts on rules or conditions) of his credits to different ongoing games. He may be able to move credits/funds around at any time. He may cash out at any time, or he may be bound to stay as long as original player stays. They may form a pool of funds together around an expert player. That fund may have a minimum amount. He may be able to play dollar for dollar, or he may only win or lose by percentage matching the percentage won or lost at real (live) game. The second person may bet as a percentage or ratio of the expert player or up to a fixed amount of dollar value, or based on a formula, to find min, or max, or range of values, e.g.:

$Y=0.5\ G+5$ \$ or $Y=0.5\ G-5$ \$ or $Y=0.5\ G$ or $Y=0.5\ G^2+5$ \$ or $Y=0.5\ G^3+5$ \$ or $Y=0.5\ G^3+0.6\ G^2+8$ \$ or

Y=polynomial (G) or

Y=Function (G) or

Y=exp (G) or
Y=Log (G) or
Y=Ln (G) or
Y=non-linear-Function (G) or
Y=linear-Function (G) or
If . . . G . . . then or
Rules on Y, based on G, using rules engine or
(Case . . . G1 . . . then . . . Y1 . . . &
Case . . . G2 . . . then . . . Y2 . . . &
. . . &
Case . . . Gn . . . then . . . Yn . . . )

In one embodiment, a new player could choose to bet one play at a time or one person at a time. In one embodiment, a new player has to choose to bet multiple plays at a time or multiple persons at a time, or as a min, or by a max, or range of dollar amount, or range of percentage amount, or min time period or times or hours, or max time period or times or hours, or range of those, or thresholds on time, number, dollar value, or percentage value(s) or ratios (or based on number of plays or any other parameters/thresholds, such as handle or cash-in or "theoretical", or the like). In one embodiment, it has an option to choose, or gets mandated, or gets mandated after the first choice. In one embodiment, the choice period is limited or over after some time, initially. In one embodiment, the choices or range of choices are changing over time, or per season, or periodically, or per morning/afternoon, or per day, or calendar, or month. In one embodiment, the older (or so-called "expert" or "lucky" or "original" or "leader" or "lead" or "most wanted/desired" or "experienced") player, vs. as new player, has more choices or less limitations or different thresholds or values or parameters, as mentioned here. In one embodiment, the older player gets credits, bonuses, free plays, awards, mileage points, rewards, lunch, room, drink, gifts, rental car, or the like. In one embodiment, bringing a new member for the club counts as credit or score or dollar value or points for the member. Other embodiments are (Note that: These are different embodiments, but can be combined together, in any mixture, with themselves and any other example in this invention disclosure.):

New player could choose amount of his own bet per hand independently of the original player's bet amount, however, of course, the outcome would depend on the outcome of the original player.
The bet is on 2 or more expert players.
The bet is on average of 2 or more expert players.
The bet is on weighted average of 2 or more expert players.
The bet is on total of 2 or more expert players.
The bet is on min and max of 2 or more expert players.
The bet is on range of 2 or more expert players.
New player could choose amount of his own bet per hand only dependent of the original player's bet amount.
In case the new player just bets along and stands by idly, there could be a side game. This side game could be played for free or for money. There could be prizes/free play, etc., offered with the side game.
It can be hierarchical: first bets on $2^{nd}$, $2^{nd}$ bets on $3^{rd}$, and so on.
It can be proxy voting and betting.
Max betting per person betting, e.g., dollar or number of people or number of bets.
Max betting on expert person, e.g., number or value or ratio or frequency or periodicity.
Syndicate or union betting.
Manager of syndicate gets a salary or percentage of the win.

Group betting.
Auction betting, based on regular or reverse auction.
Stock market model, where the value of great player goes up based on demand, and get more salary or percentage, for his syndicate, as a reward for expertise in the game and great play history, to encourage great players and put values on them, with market setting their values automatically, based on the demand pressures.
Hedge fund model, where one can bet and hedge against not favorable outcome.
Derivative model, where one can bet on a derivative of a game, person, or outcome, or combination of such, for one or more people, as individual or in combo or average or total or formula-based or conditional or rules-based.
Stock market model, where all parameters are variables, based on demand of people.
Auction model, where all parameters are variables, based on demand of people.
The original player may or may not be notified of someone betting along on his game remotely. He may or may not have any choice on that, or some leverage or bonus or percentage or negotiation power.
He may or may not be able to bet on the new players' outcome of cumulative bets.
Cumulative bets.
Total bets.
Average bets.
Average over time.
History average bets.
The coattail machines may have their own independent game, and may also be played along with from other machines.
There could be infinite bets as a new player, or could tag along/bet on one or more coattail machines, that are betting on one or more other ongoing games each.
Original player may be a players' club member with a disclosed history of winning/losing, gaming habits, and etc. He may invite new players to bet on his game, or he may just announce to be available, as a broadcast or text message, so new players can begin betting on his game, or learn from him, with verifiable results and track record by Casino, published or on website for inspection, with statistics of all expert players who are available for this process listed and tabulated, with ranking and scores for each and complete history and curves/stats for each, with recent and overall performances. This notification could be automatic or made by original player, within a property/players' club/group of properties/group of gaming machines/or the like.
The invitation is generated for players with high score, above some threshold, F.
The invitation is generated automatically.
People can invite expert(s) to become lead or leader on a syndicate, where people bet on him or them, individually, or collectively, or in average, or weighted average format, or the like.
The bet can be uniform or proportional or not related at all, for each of the leaders.
The syndicate can be initiated by an expert or group of experts.
There is at least one lead or leader on each syndicate.
There may or may not be one or more managers, who can do one or more of the following tasks:
who acts as a manger of the fund
who selects the expert
who sets the bet and thresholds for the bets.

There might be more than one lead on each syndicate.

There are one or more buckets of funds for each syndicate, to be used independently for different bets for same or different or multiple events or conditions or experts or games or casinos or family of games or group of players or a club's members or any subset of those.

The manager may or may not set his own, or by others, for salary or percentages for manager fees, or per transaction for fixed or percentage values, per period or month or quarter or year or day, on net or gross values.

Players with applicable history of winning/losing could be popular and may be able to collect a flat fee or a percentage of wins or initially deposited monies in order to allow new players to bet on them. The higher the demand and expertise, the higher the value in stock market setting or auction setting, or more income or percentages.

Players may also disallow their gaming session to be followed or bet on, in one embodiment.

In one other example, the followers are not seen or filtered by the expert.

In one other example, the followers are or may be seen or filtered by the expert.

In one other example, the expert has no choice on parameters.

In one example, the expert has some choices on parameters, to set or limit or put ranges, e.g.: for the number of followers and dollar amount or number of games to be followed by all or one person or how the money is distributed or game parameters or the like.

New players may be notified by email/text/social media/call, etc., when their favorite players begin to play or to be notified of when their favorite player(s) may plan to begin a gaming session in the near future, or based on a calendar or entered in personal calendar or reminder clock or calendar. (Or, they are notified, when their favorite lucky machine or game being played, or expert player or lucky player is playing, or will play soon, with complete schedule/calendar marked, in advance, as an option.)

Players may have to sign up in order to be eligible to be followed.

Multiple new players can bet on an ongoing game or an original player.

Favorites could be specific games, specific machines, or specific players.

All this could be done on the Internet where it is legal.

All this could be done on devices like smart phones/tablets/computers/watches/pads/servers/TVs/processors/controllers/ASIC/FPGA/or the like.

Eligible players maybe identified and approached through data collected by casino and/or gaming staff or regular people or as in draft procedure in a Football League or through profiles in a social network setting, for matching, searching, picking up, negotiating, or contracting, based on some terms or conditions. Machines/units that can be played along with remotely, may or may not be able to be physically located/identified by a new player.

Machines that are capable of playing along with other machines may have their own game(s) so that if new player does not wish to play along with any other ongoing games at the moment, he is able to play his own game until such time he decides to play along with someone. For example, if new player wants to wait for his favorite machine/table/player to begin playing, he can do the same, meanwhile.

New player(s) can make himself accessible with an ID/players card number so he can be notified by original player of his intent to play again.

The encryption and biometrics or private/public keys are used for authentication and verification of people.

The smart cards or RFID or GPS or smart phones or passwords or serial numbers for devices or tel. numbers identify/locate the identity of people or players, to reduce fake people in games.

Also, original player can notify new player of his game/day/result, if new player happens to quit, before the original player is done with his gaming session. (Or, this notification is automatically sent by either player.)

Original player can notify a specific person/family/group that he is or will be playing now or soon or date or periodic schedule or condition to trigger to play, e.g., a specific date or event in calendar or town.

Original player can have a data bank of his history/track record identifiable by players club card/specific ID code/user name, etc., that allows/enables new players to follow his progress and decide to tag along on his games, at any given moment.

Expert player can set his own price, and can have different prices for different new players (people/groups). (The parties can set their rates, for matching together, to have a contract with each other, automatically, if they overlap in values.)

Because of the vast variety of games that this invention would encompass, many aspects of individual games need to be customizable based on, for example, but not limited to, level of interactivity between players (both ends) and players, players (both ends) and management, players (both ends) and machines, and the like. Other examples are the design of machines, design of screen, and what is seen by, or hidden from, players (both ends).

Other Inventions:

For the purpose of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

The operation of slot machines, video poker machines, keno machines and other electronic gaming devices is controlled by microprocessors which communicate with internal memory devices and the external features of the machines. The microprocessors also incorporate, or communicate with, a random number generator which ensures the randomness of the machines' outcomes. In one of the embodiments of the present invention, one or more processors, along with memory and related devices, control the new applications disclosed herein. Therefore, the embodiments, along with the corresponding odds, of the present invention may be programmed into the processor or associated software. Since the technology for operating and controlling electronic gaming machines is well known to those skilled in the art, the subtle details are not described herein.

In one specific example, video poker machines and devices have been in existence for many years. Video poker machines utilize a processor that randomly organizes a deck of simulated cards. Once a wager is placed, the order of the cards is set. Cards are then provided to the player in order off the top of the simulated deck. Reference is now made to the figures wherein like parts are referred to by like numerals throughout. FIG. 1 illustrates an exemplary video poker machine generally referred to by reference numeral 100. The machine 100 includes a display 110, coin input 120, card reader 125, bill or coupon acceptor 130 and interface buttons, including hold/discard buttons 140, deal/draw button 150, play max coins button 155 and cash out button 160. In lieu of, or in addition to, all operations achieved using the interface buttons may be accomplished via touch screen implementation.

FIGS. 2*a*-2*e* show conventional pay tables for various video poker games currently played in casinos. The pay tables 165-185 correspond to Jacks or Better, Deuces Wild, Double Bonus Poker, Double Double Bonus Poker and 5/7 Bonus Poker video poker games. The payout schemes are substantially similar with subtle nuances. Each pay table comprises payouts relative to 1 to 5 coins being played. In almost every instance the payouts have a direct relationship to the number of coins played. So, if two coins are played the payout is twice that of the same payout for one coin being played and if four coins are played the payout is four times that of same payout for one coin being played. However, each pay table provides an enhanced payout for a player having five coins (i.e., maximum coins) being played and obtaining a Royal Flush. In such instances, the payout is not five times that of the same payout for one coin being played but is 10 times. Therefore, many players play five coins because they want the enhanced payout if they hit the Royal Flush. Of course, the odds of hitting a Royal Flush are small at approximately 1 in 40,000.

The embodiments of the present invention provide players with enhanced payouts based on the amount of their cash-in or initial investment in a game of chance. That is, the amount of money (or coupons, tickets or the like) a player places into the video poker machine to initiate play influences payouts. Using video poker as an example, FIGS. 3*a*-3*d* show four unique Jacks of Better pay tables 200-215 corresponding to four different ranges of cash-in amounts associated with a quarter machine. Similar enhanced payout schedules may be generated for other video poker variations (e.g., Deuces Wild) as well. Pay table 200 corresponds to a conventional Jacks or Better pay table used in response to a player cashing in for $50 or less. Pay table 205 is used for cash-in amounts ranging between $50.25 and $100.00 and provides enhanced payouts for Royal Flush, Straight Flush and Four of a Kind outcomes with 5 coins played. Pay table 210 is used for cash-in amounts ranging between $100.25 and $200.00 and provides enhanced payouts for Royal Flush, Straight Flush, Four of a Kind and Full House outcomes with five coins played. Pay table 215 is used for cash-in amounts exceeding $200.00 and provides enhanced payouts for Royal Flush, Straight Flush, Four of a Kind, Full House, Flush and Straight outcomes with five coins played. Those skilled in the art will recognize that enhanced payouts may be generated for any winning outcomes, with any amount of coins played, and the enhancements may be manipulated in any manner desired. For example, the Royal Flush payout may be enhanced to 4250 coins, rather than 4100 coins. Regardless of the pay table, the house or casino should have a suitable edge. Also, it is possible that some payouts related to specific outcomes may be reduced while others are increased. Ideally, the overall payouts related to higher cash-in amounts are greater for the player. In other words, a player has a greater chance of winning or receives a greater return with each enhanced pay table or schedule. In one embodiment, we have higher probability or value per item or table entry or event or favorable winning event. In one embodiment, we have higher dollar amount value for a winning situation or event. That is, in different embodiments, one can get a more favorable result(s), using higher (or shifted or biased) probability and/or higher dollar value.

Figure 4:
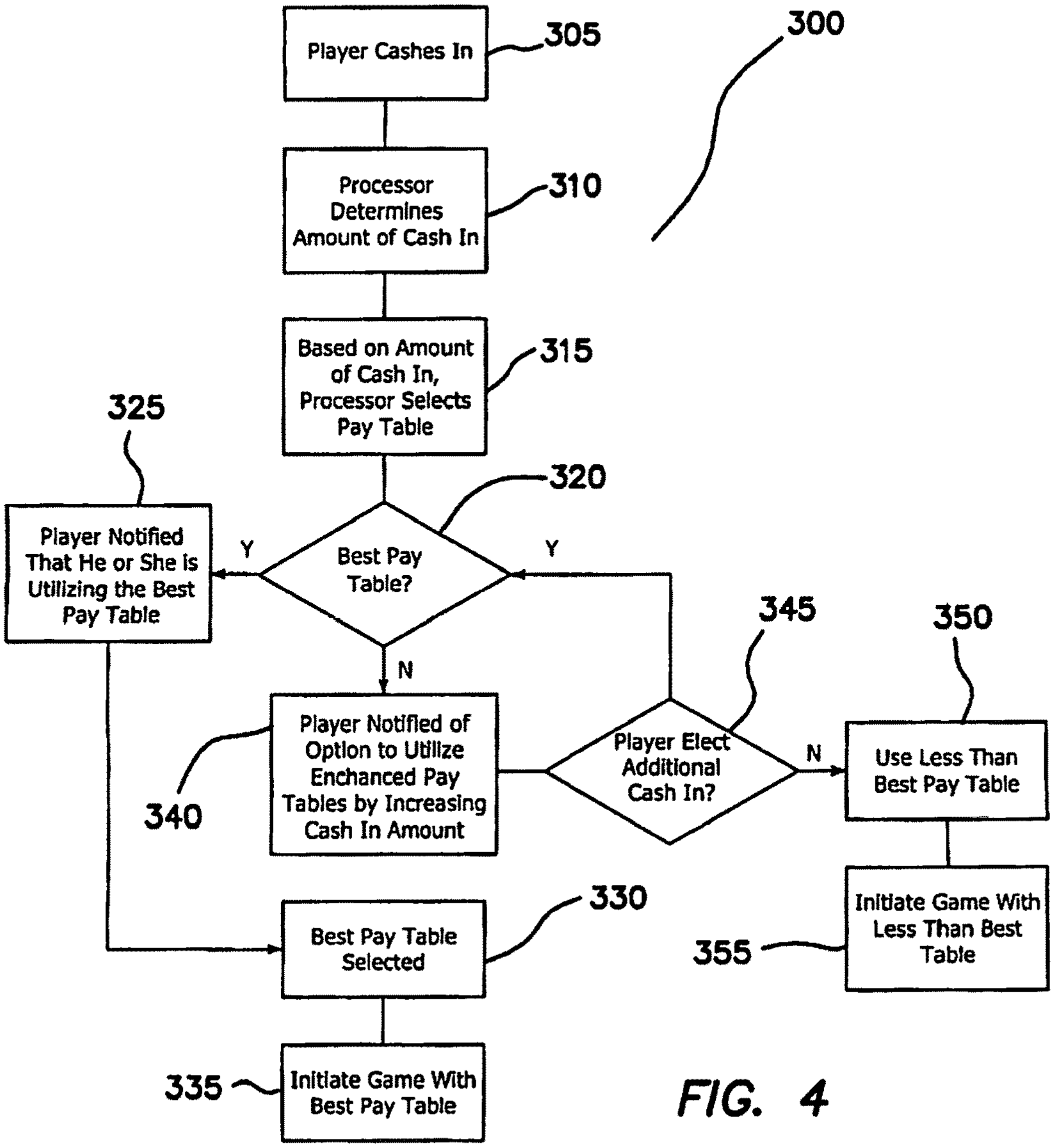
FIG. 4 illustrates a flow chart detailing a methodology associated with an embodiment of the present invention utilized with games of chance facilitated by electronic gaming machines.

FIG. 4 shows a flow chart 300 detailing one embodiment of the present as utilized with an electronic gaming machine or device. Initially, at 305, a player cashes in by inserting currency, coupons or tickets into the machine. At 310, the processor determines the amount of the cash-in and based on the amount of the cash in, at 315, selects a corresponding pay table. At 320, the processor determines if the selected pay table is the best table available for the player. The best pay table means a pay table providing the best overall payout percentage for the player. In other words, the best pay table gives the player the best chance to win. Optionally, at 325, the processor causes the player to receive notification that the best pay table will be in play. At 330, the best table is selected and then, at 335, the game is initiated with the best pay table. If at 320, the best pay table is not to be selected, at 340, the player is prompted to insert additional money to change the current pay table to one with better player payouts. The prompt indicates how much money must be input to utilize one or more pay tables having enhanced payouts over the current pay table. If, at 345, the player declines to insert any additional money, at 350, the current pay table is selected and, at 355, the game is initiated using the selected pay table. If, at 345, the player inserts additional money, a new pay table, which may be the best table or not, is selected, and, at 360, the game is initiated with the selected pay table. The selected pay table remains in effect until the player cashes out the gaming session.

Depending on the casino, players may be permitted to change the pay table as often as possible by cashing out and cashing in regularly or the system may include restrictions such that players may have limited access to enhanced pay tables. For example, players may only be permitted to utilize the enhanced pay tables once per 24 hour period or other pre-determined time period or may only have access one certain days of the week or via invitation. Casino player tracking systems or the like may be responsible for maintaining information related to the number of times that a player has utilized the enhanced payout schedules.

Figure 5:
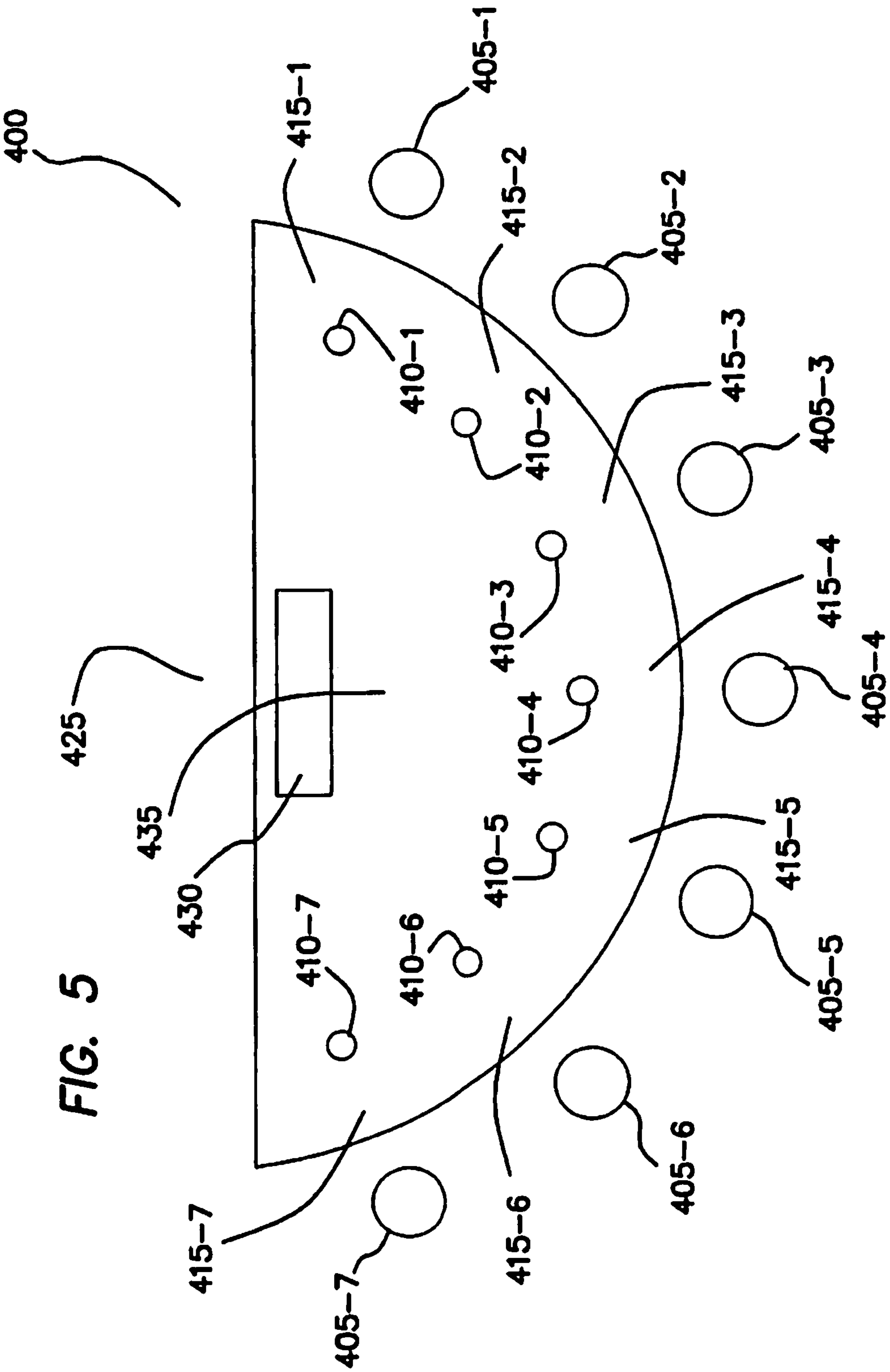
FIG. 5 illustrates a conventional blackjack layout.

FIG. 5 shows a blackjack layout 400. The blackjack layout 400 accommodates seven player positions 405-1 through 405-7, seven player wager areas 410-1 through 410-7, seven player card areas 415-1 through 415-7, a dealer position 425, chip rack 430 and dealer card area 435. The blackjack table supporting the blackjack layout 400 may also support a card shoe and card shuffler. With conventional blackjack using six to eight decks winning wagers typically pay even money and 3 to 2 on a two card 21 (i.e., "Blackjack"). Because of the prevalence of card counting, when one or two decks of cards is used to play blackjack, many casinos now lower the Blackjack payout to even money as well.

Figure 6:
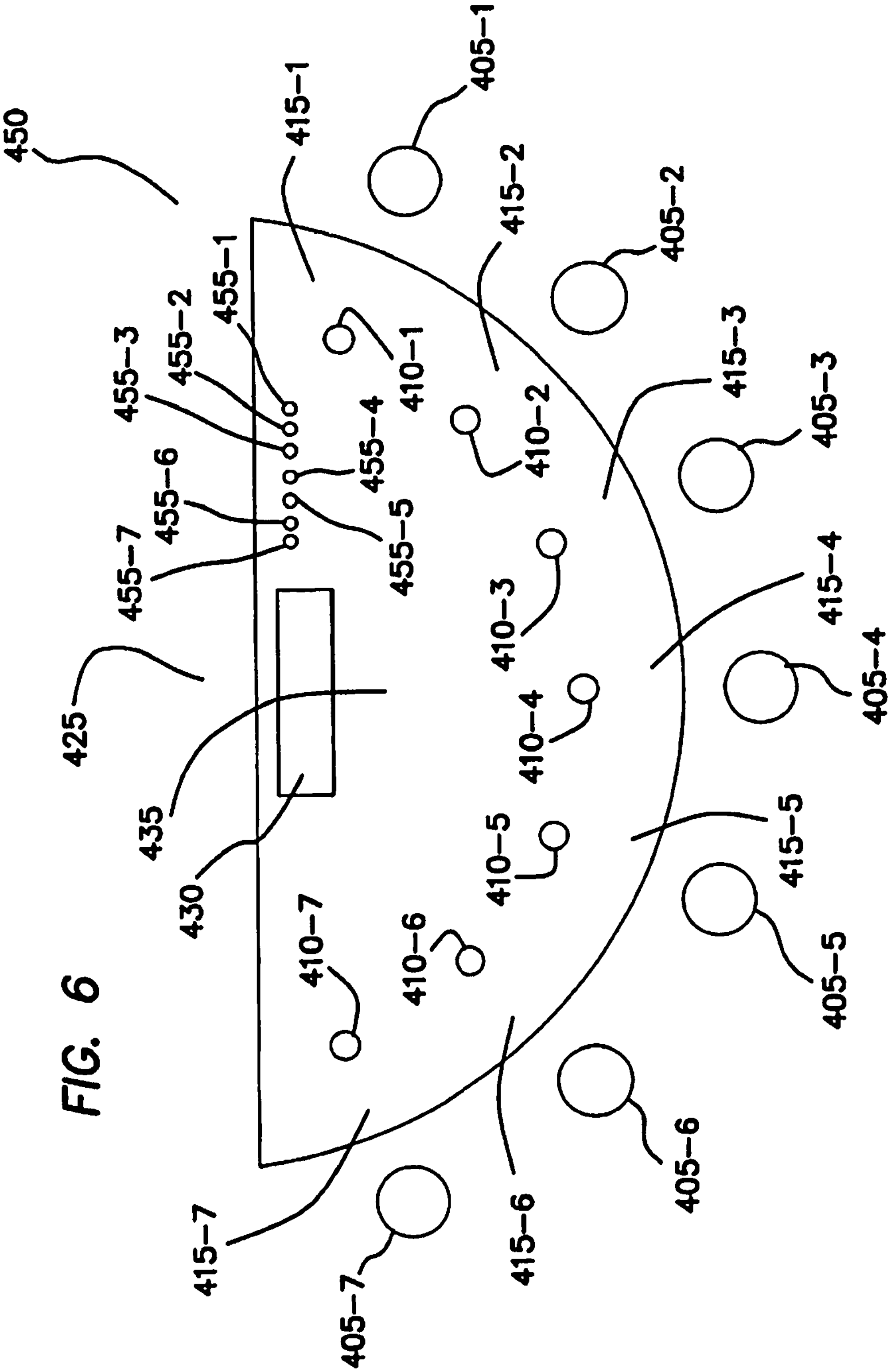
FIG. 6 illustrates an exemplary blackjack layout according to the embodiments of the present invention.

FIG. 6 shows a slightly modified blackjack layout 450 corresponding to the embodiments of the present invention. The modification to the layout 450 comprises player-corresponding circles 455 adjacent to the dealer position 425. The circles 455 provide a location for placement of payout indicators for each player position. Like the embodiment set forth above with respect to electronic gaming machines, the payouts are enhanced depending on the amount of money cashed in by each player. To track the payouts for each player, the dealer utilizes different payout chips indicative of a player's initial investment. So, with a two tiered payout structure a white chip may correspond to a conventional payout and a red chip may correspond to an enhanced payout. An electronic system may also be utilized to track which payouts correspond to which players. For example, most casinos have player tracking systems with monitors installed at most live games of chance which can be used as a reference by the dealer to maintain payout schedules for each player. With blackjack, for example, a larger initial investment, may result in a 3.5 to 1 payout on Blackjacks rather than 3 to 2 or even money. Other payouts, including payouts corresponding to even money wagers, double downs and split hands, may also be enhanced. While not shown, the unique pay tables may be printed on the layout so that players are able to immediately determine the pay table they want to play.

While blackjack is detailed above, other live table games, including Let It Ride and Caribbean Stud Poker, which have pay tables dedicated to low probability poker hands, may also utilize the embodiments of the present invention.

Figures 2E, 7:
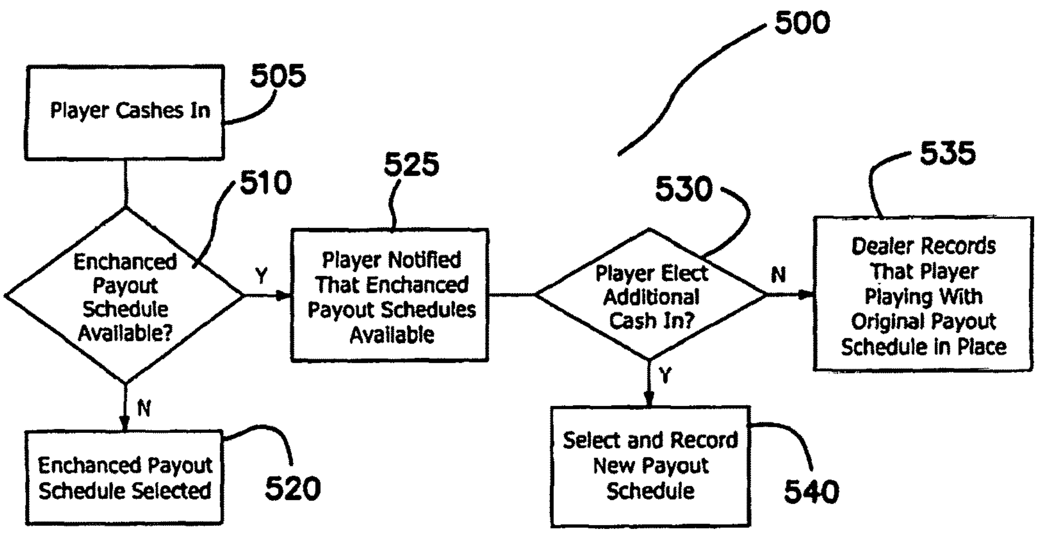

FIG. 7 shows a flow chart 500 detailing a live embodiment of the present invention. At 505, a player cashes in an amount of money. At 510, a dealer determines whether the amount cashed in entitles the player to an enhanced payout schedule. If the player has cashed-in enough to qualify for the best available payout schedule, at 520, the dealer selects and identifies, marks or otherwise maintains a record that the best payouts are being used for the player. If not, at 525, the dealer notifies the player that by cashing in more money the player will be entitled to a better payout schedule. If, at 530, the player declines to cash in additional money, at 535, the dealer selects and identifies, marks or otherwise maintains a record that the player is entitled to conventional payouts or other payouts less than the best payouts available. If, at 530, the player elects to cash in additional money, at 540, the dealer identifies, marks or otherwise maintains a record of the payout schedule to which the player is entitled.

Those skilled in the art will recognize that any game of chance, including, but not limited to craps, blackjack, keno, bingo and roulette, whether facilitated by electronic gaming machines or devices, or live games, may benefit from the embodiments of the present invention. Moreover, any slot machine can be configured to facilitate the embodiments of the present invention. The embodiments of the present invention are also suitable for online systems and server-based systems offering games of chance. With online and/or server-based systems, players access the games of chance from a remote server using a player terminal (dumb or smart), personal computer or hand-held device (e.g., cellular telephone or PDA) but the overall purpose of the embodiments of the present invention remains the same: to provide players with enhanced payout schedules for putting more money into the game.

The embodiments of the present invention benefit the player by providing enhanced payouts and provide the house or casino with a greater likelihood of winning at a higher rate because players have more money invested in the game. Even though players do not have to play all of the money initially invested or cashed in, players are more likely to play money already cashed in over money in their pockets or awaiting at the ATM or cashier.

In another embodiment of the present invention, other bonuses or awards are manipulated or enhanced based on the amount of the initial investment. Most casino resorts now provide players with comps and other amenities based on how, and how much, players play games of chance. In most instances, players accumulate player points which can be redeemed for casino amenities (e.g., food, rooms, etc.). Accordingly, with the embodiments of the present invention, such comps and other amenities may be enhanced based on the player's initial investment. For example, a player may receive double player points based on an initial investment amount exceeding a pre-established threshold amount and triple player points responsive to a larger initial investment. Comps, like free or reduced rate rooms, may also be enhanced based on the initial investment amount. Such enhancements are added to conventional awards or comps the player would conventionally receive.

In one embodiment of the present invention, if players play and lose the entire amount invested, they receive a bonus or award. In one embodiment, the bonus comprises free plays of the machine wherein the number of free plays is based on the amount of money initially invested. In other words, more free plays are provided responsive to a larger initial investment. Indeed, initial investments below a threshold amount (e.g., $50) may not be entitled to any bonus. In another embodiment, players are offered the opportunity to continue playing the gaming machine using the enhanced pay table for any additional monies deposited even if the additional amount deposited is less than the threshold amount for utilizing said enhanced pay table.

In one embodiment, we have a method of conducting a game of chance comprising: accepting an initial investment from one or more players to participate in a game of chance; and if the game of chance is facilitated by an electronic gaming machine, crediting a player on the machine an amount equivalent to the initial investment; while if the game of chance is a live game of chance, providing players with gaming chips equivalent to the initial investment; and then selecting a payout schedule from a plurality of payout schedules, wherein the payout schedules forming the plurality of payout schedules successively provide one or more increased payouts over a conventional payout schedule for the game of chance, as an amount of the initial investment increases.

In one embodiment, the increase in payout can be done using a formula or table or list or database or curve or equation or function. In one embodiment, the increase is in average, or total, or for each instance, or weighted average, or every other instance, or periodic, or randomly selected instance, or every n-th instance in the sequence of events (with n as an integer, equal or bigger than 1), e.g. every $4^{th}$ instance or occurrences, or any predetermined pattern of instance or occurrences. In one embodiment, the increase or decrease is based on the factors mentioned here in this disclosure. In one embodiment, the increase is based on an event, such as an event from outside or inside the machine or casino, as a trigger. In one embodiment, the increase is based on the type or class of an event. In one embodiment, the trigger is based on time or period of time or date or hour or calendar or user related, e.g. user's birth date, e.g. captured on the smart or magnetic card or chip or dangle or memory card or storage stick or other devices for such purposes, or e.g. Christmas day, or $4^{th}$ of July, or $3^{rd}$ Tuesday of each month, or any long weekend, or any Federal or state holiday.

In one embodiment, this period can be extended with addition of more money by the user, using a table or formula, or randomly result oriented, or other events, or other methods, such as coupon, authorization from casino, bonus awards, favorite customer, VIP customer, customer with repeat business, or calendar time or period or date, or user-based event or date, or customized event or date, or trigger event or condition, or logical AND or OR or XOR or other operations on conditions or parameters or events or triggers, e.g.:

If A happens AND B happens, then extend the period for e.g. 2 more days, or 2 more sessions, or 4 more weeks, or 1 more season, or the like.

In one embodiment, the outcome is based on random or semi-random number generator, to produce the outcome from a range of values, but selected randomly from such range, or mapped to such range using a predetermined formula or instruction or method or routine or table or list or function. Or, it can be based on some range of probability which determines the outcome values based on said probability value, e.g. as a function or table or relationship.

Another example is when we have a range of probabilities, e.g. 0.1 to 0.3, and we randomly select one value, e.g. 0.25, from such range, which we can use as a basis for selection of values from a possible range of discrete or continuous outcome values in dollar amount (or bonus objects or selections, e.g. free one night stay in the hotel, or free lunch for 2 people, selected from a list), e.g.:

{1 dollar, 2 dollars, 3 dollars, . . . , 100 dollars}, as discrete set, or

[1, . . . , 100] dollars, as continuous set, or real number axis for values for dollar amounts, or selection of tables 1, 2, 3, 4, or 5, for payment schedules, for which each has different outcomes for dollar amount in the table.

In one example, one assigns the value of 0.25 for the probability value in the example above to table number 2, as an example. Or, in another example, all tables 1 through 5 have the same probability values, as uniform, for being selected, in example above, which corresponds to 0.2 probability value for selection of each table, randomly, which corresponds to different outcomes for the user for winning amounts, or winning combinations, e.g. for cards in different games, e.g. poker.

Some examples which were covered by our previous disclosures (our parent cases) are shown below. We have a method of conducting a game of chance on an electronic gaming machine comprising a display and a memory unit, and in communication with a processor, with said method comprising: said processor accepting an initial investment from a player to participate in said game of chance on said electronic gaming machine; said processor crediting said player's account on said electronic gaming machine an amount equivalent to said initial investment; said processor receiving a first threshold value; receiving a plurality of payout schedules from said memory unit; and if said initial investment is higher than said first threshold value, then said processor assigning a first payout schedule from said plurality of payout schedules to said player's account on said electronic gaming machine; wherein said first payout schedule has a higher payout than that of a second payout schedule among said plurality of payout schedules; then said processor receiving a pre-determined time instance (or time period or date or day or event or threshold or trigger); said processor receiving a threshold number of times; said processor counting a number of times said first payout schedule is used for said player's account on said electronic gaming machine; and if said pre-determined time instance is not reached, and said number of times said first payout schedule is used for said player's account on said electronic gaming machine is below said threshold number of times, then said processor distributing a winning outcome to said player's account according to payout defined in said first payout schedule; and if said pre-determined time instance is reached, or said number of times said first payout schedule is used for said player's account on said electronic gaming machine is equal or above said threshold number of times, then said processor distributing said winning outcome to said player's account according to payout defined in said second payout schedule.

One embodiment is that when we try to increase a slot players "time on machine", as an example. In order to do that, one would need to be given an incentive/reason or a "bonus" for playing beyond what they normally would, time-wise and/or dollar-wise. A player would initially deposit an amount of money into a slot machine to begin a gaming session. He would then play for a while, and stop playing usually when they have lost all or a portion of that money to the machine. Now, if the player is offered the following option or rule, he/she may stay and play on the machine longer, and may even invest or spend more money to do so:

If the player deposits, for example, $100.00 into the machine, he would be given $100 credit at the machine. He could then begin to play and either start to win or lose. If the player's credit begins to diminish, then at every predetermined increment (in this example $20), he would be given a chance to win his money back, back to 100 dollars (or more than 100 dollars, in one embodiment) in the form of a "bonus round" and so on. That is, for every 20 dollar losing to the machine, or for every 20 dollar subtraction from the original value, e.g. at $80, 60, 40 levels or thresholds, and so on, this opportunity comes up (and has a specific probability of winning and amount of winning corresponding to that).

One embodiment is, for example, the player puts in $100 into the machine, and when/if he is down to $80, he will get a bonus round and be given a chance to win back all, a portion of, or maybe, even more than the $20 that he has so far lost, e.g. 30 or 40 dollars more than original value of 100 dollars, i.e., up to 130 or 140 dollars, in different embodiments. Later, as he plays on, if his credit in machine goes down to $60, he will again be given a chance in a bonus round to win back all, a portion of, or maybe, even more than the $40 he has lost of his original cash deposited in the machine. This could happen at every $20 increment to the last dollar, meaning that when player's credit goes to $0, he would yet get another chance in a free bonus round to win back all of, a portion of, or even more than the $100 that he has lost so far, e.g. up to or exactly 130 dollars.

In one embodiment, the increments are uniform, as shown above. In one embodiment, the increments are non-uniform, e.g. steps of losing for 10 dollars in between 20 dollar steps, or steps of gaining back 20 and 30 dollars mixed, in a non-uniform manner, in a predetermined fashion or randomly selected from a pattern of steps. The pattern of steps can be e.g.:

10, 20, 25, 20, 30 dollars, as a series of steps or sequence, for losing money, for thresholds, or steps for gaining money back, starting from the original value, or starting from current value at a given point of time.

In one embodiment, the increments chosen randomly, can be, e.g., chosen from values 10, 20, 25, 30, and 35, e.g.:

10, 20, 30, 20, 30, as a sequence, for steps, for losing, or for gaining steps, e.g. using the same sequence or a different sequence, in different embodiments.

In one embodiment, all components can vary from machine to machine, and/or from property (gaming facility)

to property. In one embodiment, all machines and corresponding values can be accumulated for a user, or averaged, or for multiple users, or done per machine, or per casino, or per user's friends, or per club, or per group, or per social setting, or across the machines for the same game, or per user's family circle, to be thresholded against or compared to, or for the purpose of selecting a proper table for pay out or awards for winnings or the probability of success or amount of wins, per the categories mentioned above, e.g., per group. For example, once the group members, collectively or individually (as different embodiments), reach a threshold amount of win, e.g. 1000 dollars, the machine or machines or casino keeps track of such total or average win, to terminate the use of enhanced-win mode, and switch to other, less favorable, tables or win schedules, for less total or average wins (as different embodiments).

In one embodiment, the tables e.g. 1 through 5 are selected randomly, or based on some trigger or rules or rules engine, which is stored in a processor, microprocessor, table, memory, or database, e.g. based on some or multiple condition(s), e.g. If-Then-Else rules. For example:

IF A happens (e.g. a threshold is reached for dollar value or time), THEN switch to table 3, instead of table 4, for payments, for a period of 1 day, or until we reach another dollar value goal(s) or thresholds.

ELSE select table 2, or average the winning so far, or . . . .

In one embodiment, the higher average value means that sometimes it may be higher outcome, and sometimes lower value outcome, but overall, in average or weighted average, the outcome is higher in value, statistically or for a period of time or probability-wise, e.g. for a winning of a user or users, or per casino or group of people or machine or group of machines. In one embodiment, a machine is independently averaged and monitored, for its own probability, alone. In one embodiment, a machine is collectively aggregated or grouped together with other people or machines for its performance and probability or winning results. Thus, aggregated probability distribution(s) of multiple actors, machines, or elements come in, instead of an individual probability distribution.

In one embodiment, the user is given a notice or alarm about the fact that there is an opportunity to use enhanced tables or table, in various steps of enhancements, e.g. 4 different enhancement tables, each requiring e.g. higher initial deposit in the machine, or higher initial deposits or collective contributions into the machine, so that the user can take advantage of such schemes, as his options. In one embodiment, the user is given notice about thresholds and gains, and corresponding jumps, gain back opportunities, or winnings, with proper rules and description of steps in each directions, i.e., for losing and gaining. In one embodiment, the user is given notice by/on screen of machine, mobile device, texting, email, printout, voice, sound, music, notes, icons, display numbers and symbols, or the like.

Figure 8:
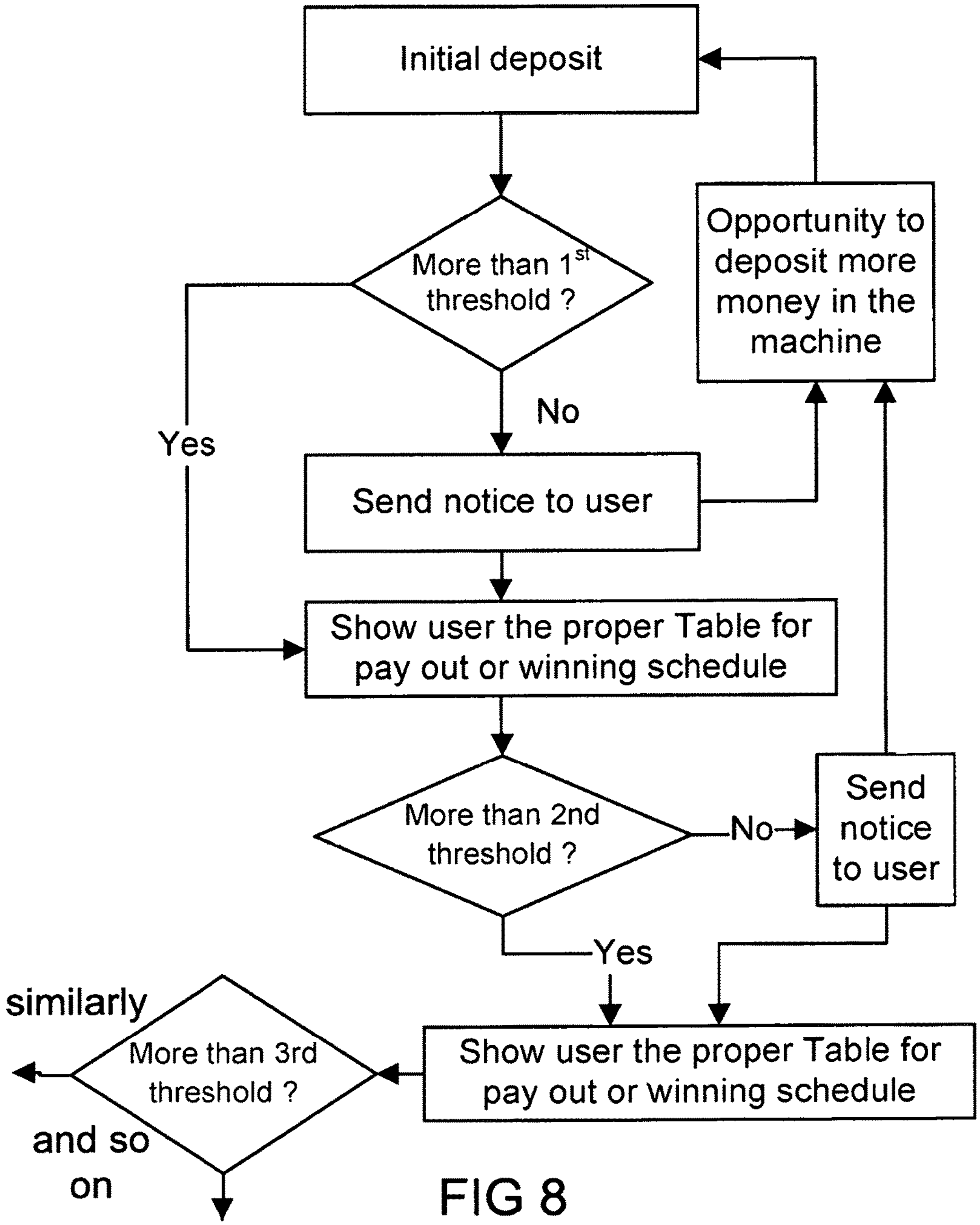
FIG. 8 is an embodiment of usage of multiple thresholds for selection of proper table for winning determination.
Figure 9:
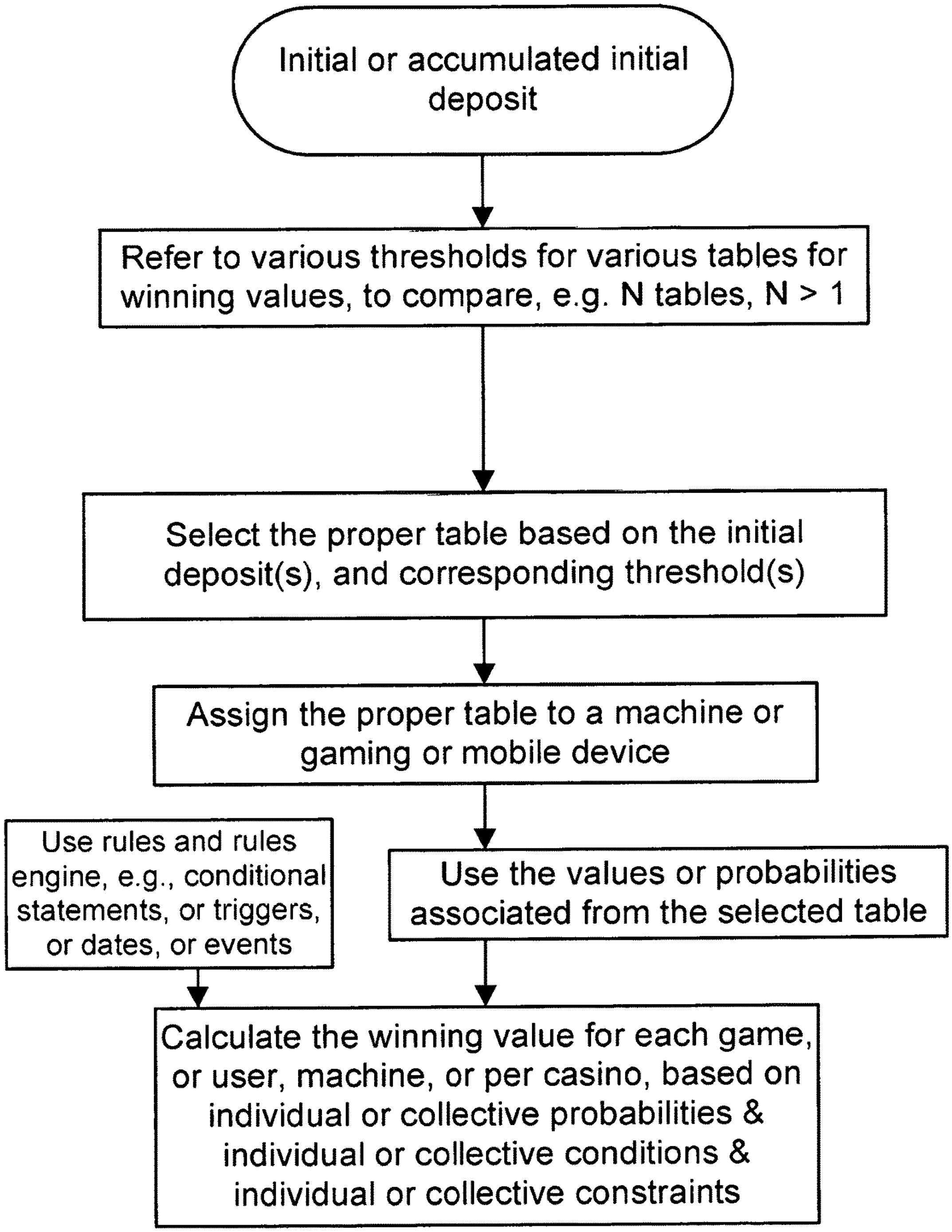
FIG. 9 is an embodiment of usage of multiple thresholds for selection of proper table for winning determination, along with usage of other parameters.
Figure 10:
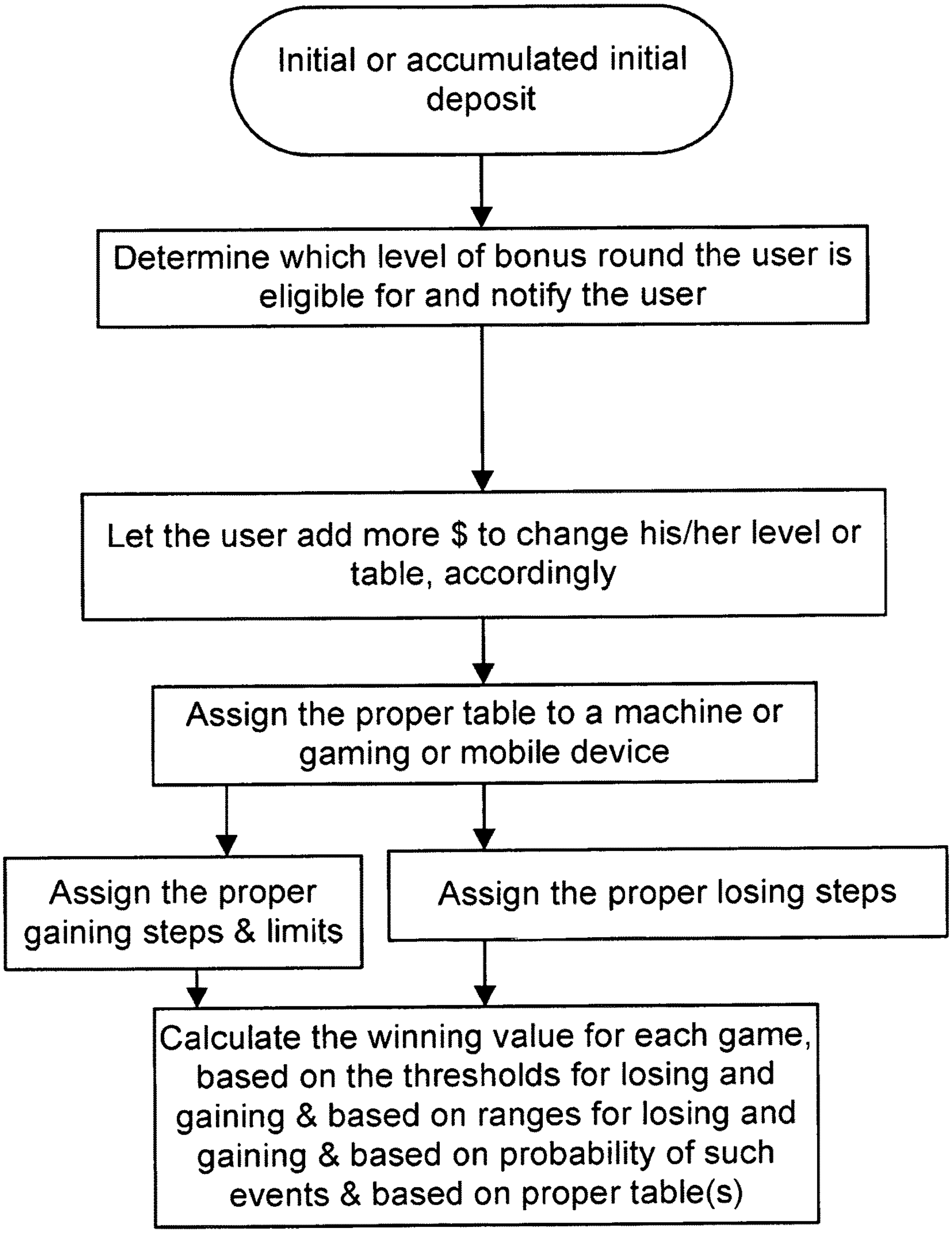
FIG. 10 is an embodiment for selection of proper table for winning determination, along with assigning proper steps for losing part and gaining part.
Figure 11:
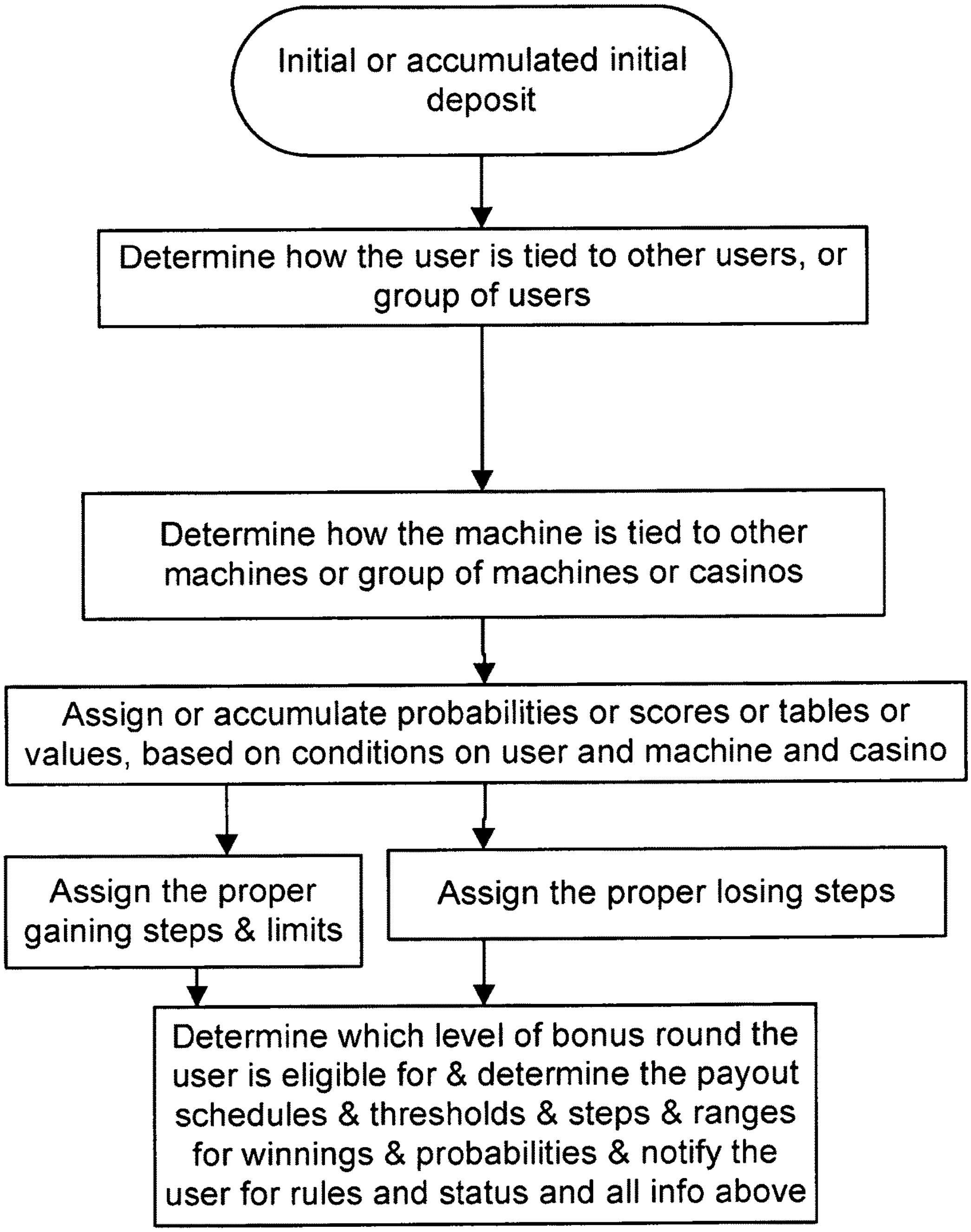
FIG. 11 is an embodiment for winning determination, along with combining users and machines, e.g. for probability and statistical analysis.
Figure 12:
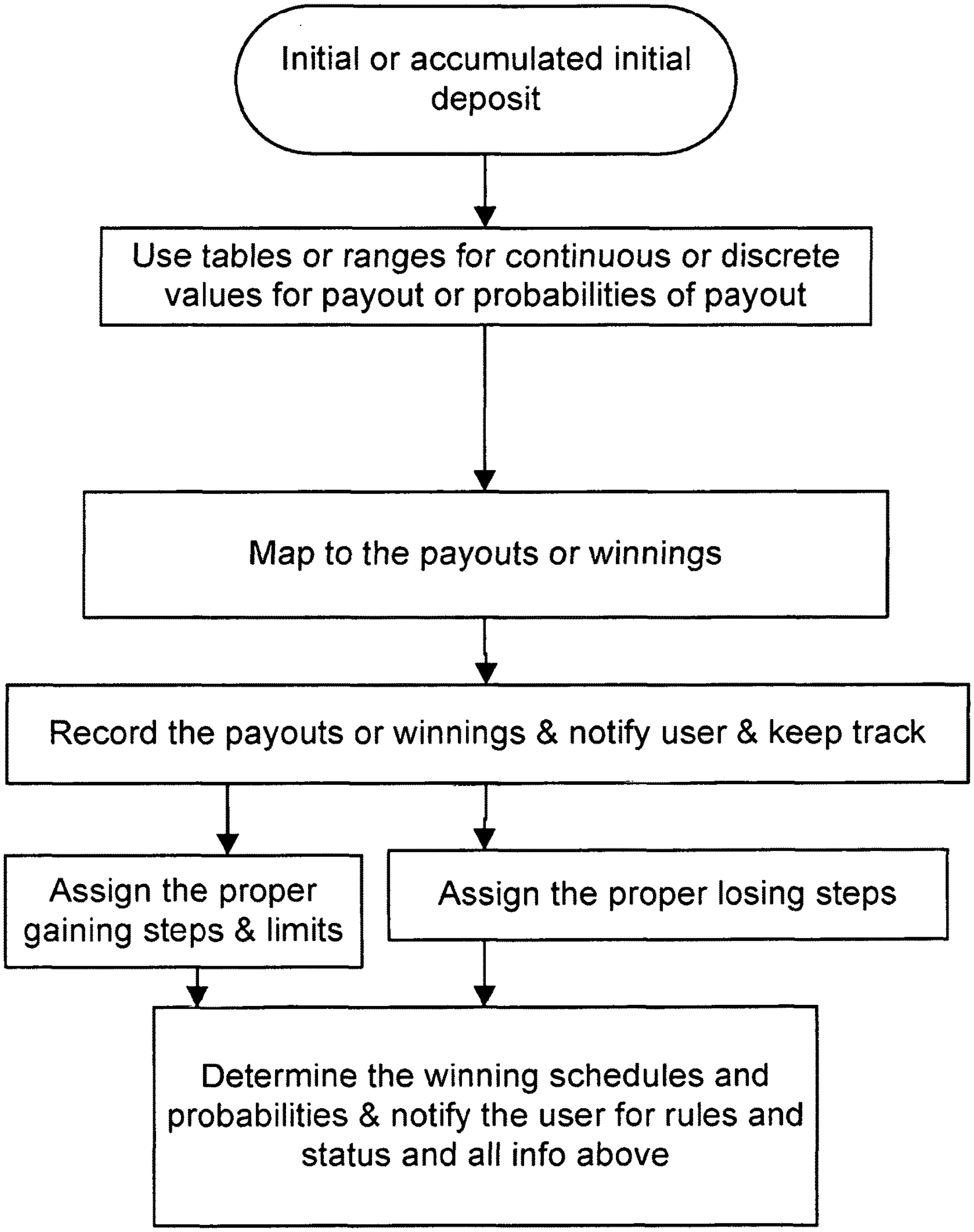
FIG. 12 is an embodiment for winning determination, along with continuous or discrete values or parameters, e.g. for probability and statistical data, for payout.

FIG. 8 is an embodiment of usage of multiple thresholds for selection of proper table for winning determination. FIG. 9 is an embodiment of usage of multiple thresholds for selection of proper table for winning determination, along with usage of other parameters. FIG. 10 is an embodiment for selection of proper table for winning determination, along with assigning proper steps for losing part and gaining part. FIG. 11 is an embodiment for winning determination, along with combining users and machines, e.g. for probability and statistical analysis. FIG. 12 is an embodiment for winning determination, along with continuous or discrete values or parameters, e.g. for probability and statistical data, for payout.

Figure 13:
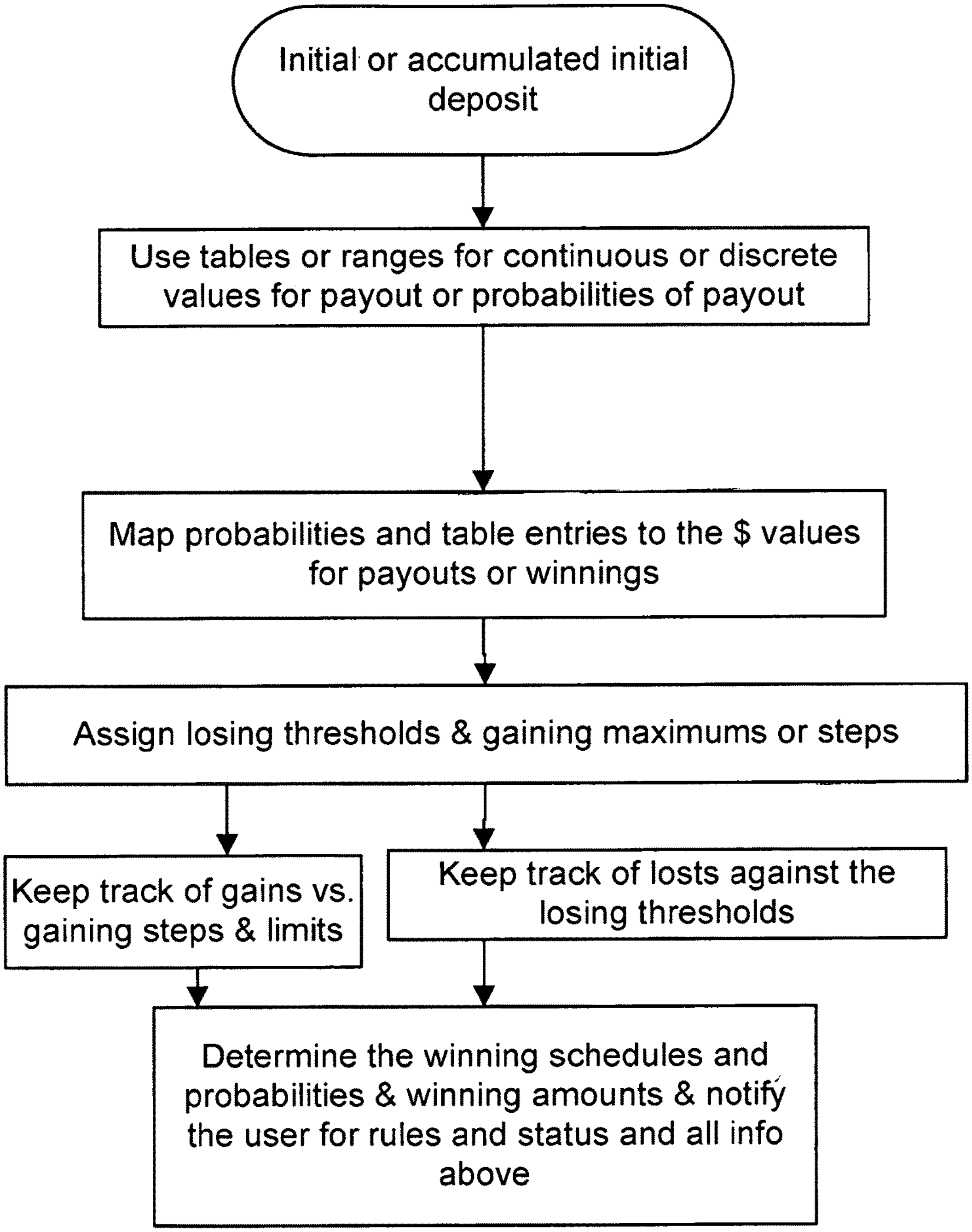
FIG. 13 is an embodiment for winning determination, along with tracking gains and losses, e.g. to choose or switch to the right table, or find the proper values.
Figure 14:
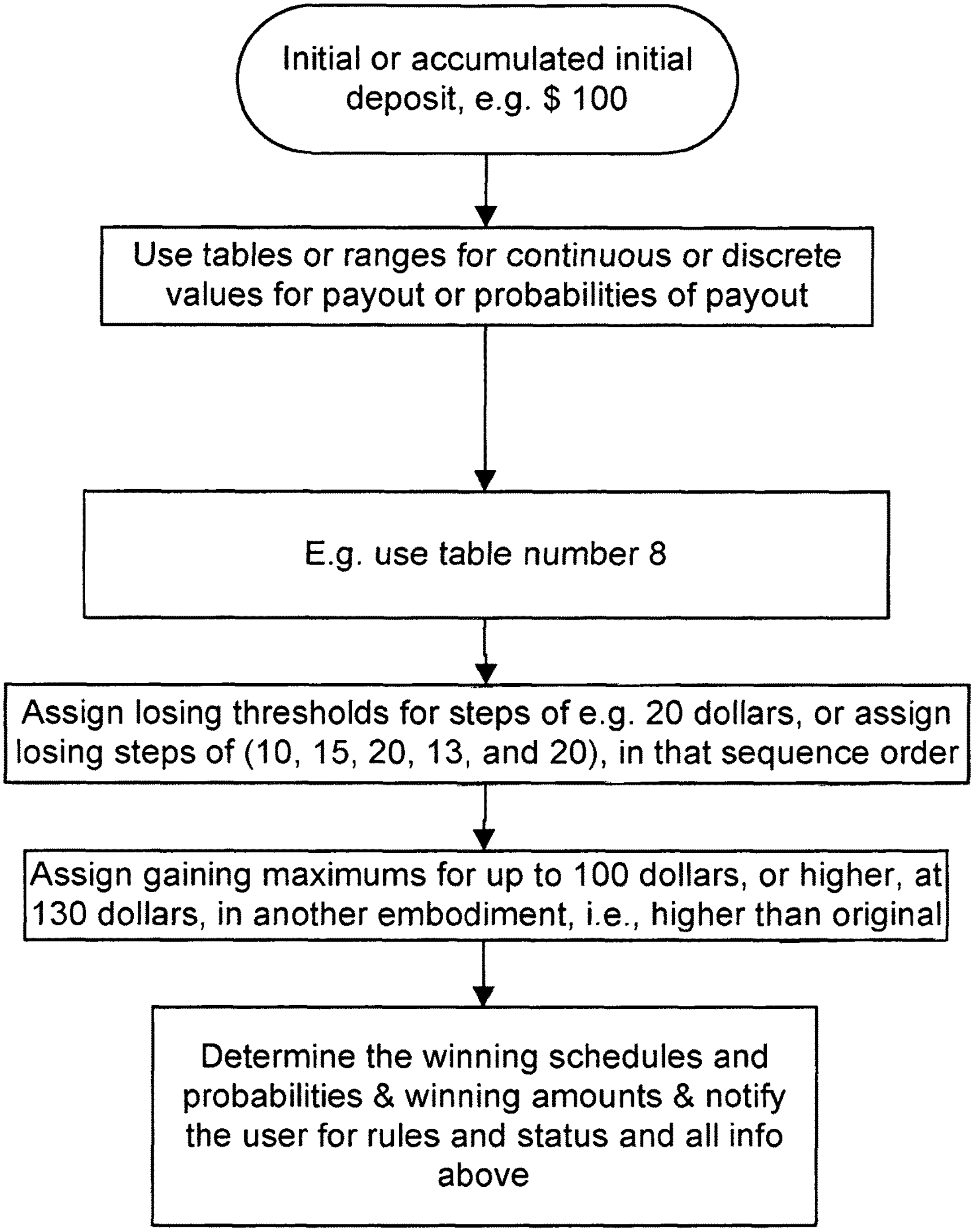
FIG. 14 is an embodiment for winning determination, along with assigning various values for gains and losses, for maximums or steps or thresholds.
Figure 15:
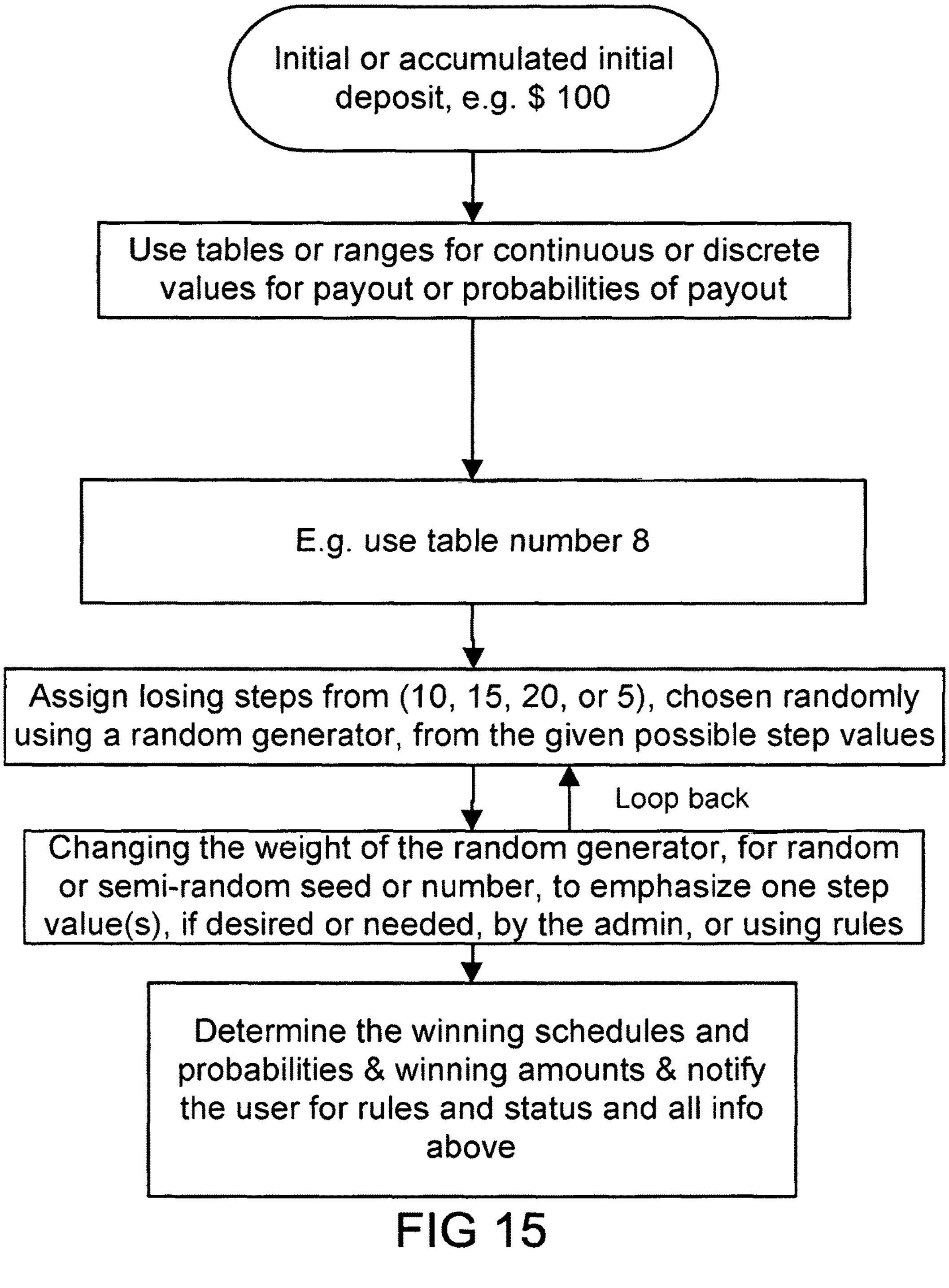
FIG. 15 is an embodiment for winning determination, e.g. along with using a random generator, e.g. for assigning various values for gains and/or losses, for maximums or steps or thresholds.
Figure 16:
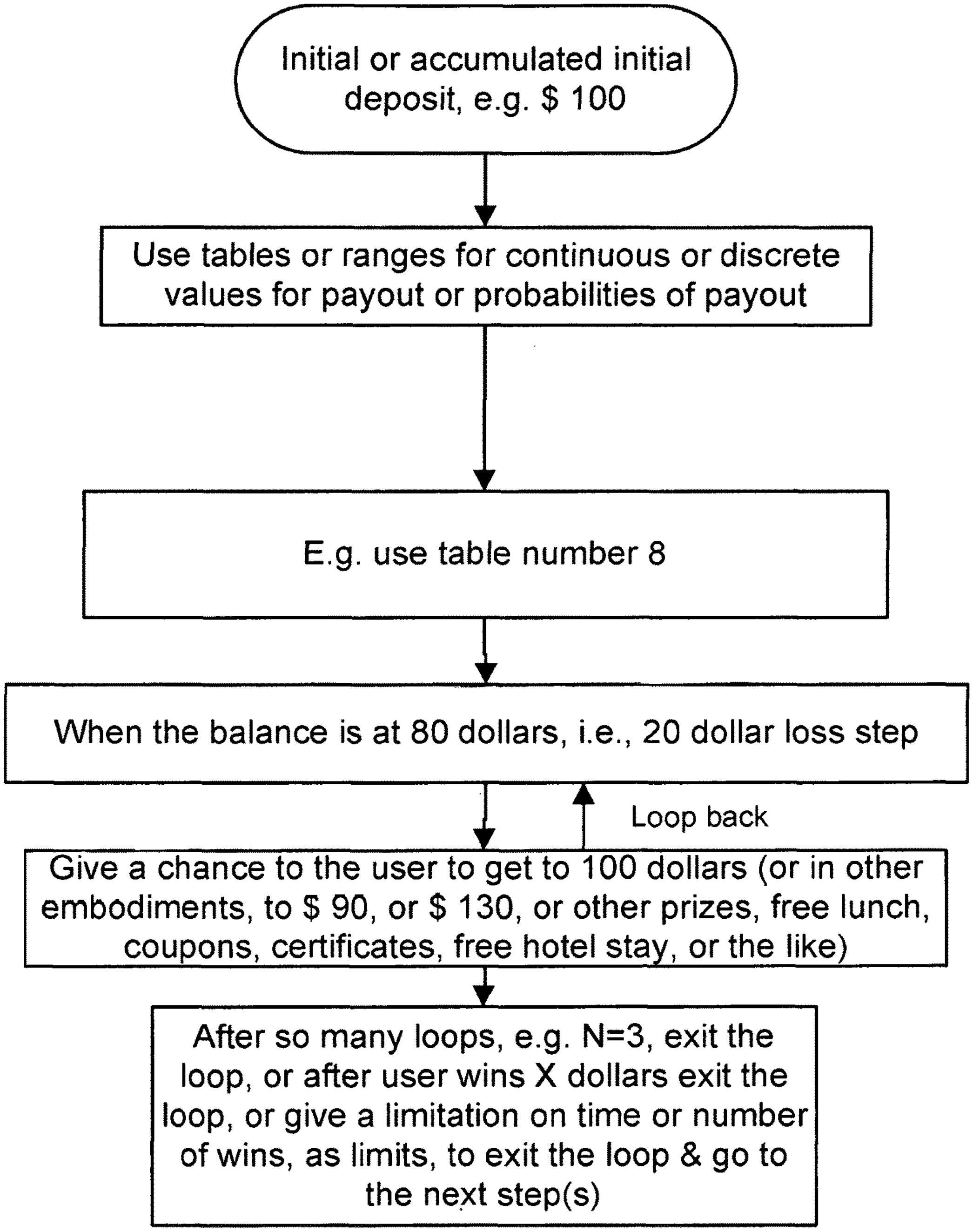
FIG. 16 is an embodiment for winning determination, along with a chance to win some or all or more than original input value, with a loop, and exit condition for the loop, and continuous execution of such routine (plus giving a notice to the user, for the user adding to input value, if desired).

FIG. 13 is an embodiment for winning determination, along with tracking gains and losses, e.g. to choose or switch to the right table, or find the proper values. FIG. 14 is an embodiment for winning determination, along with assigning various values for gains and losses, for maximums or steps or thresholds. FIG. 15 is an embodiment for winning determination, e.g. along with using a random generator, e.g. for assigning various values for gains and/or losses, for maximums or steps or thresholds. FIG. 16 is an embodiment for winning determination, along with a chance to win some or all or more than original input value, with a loop, and exit condition for the loop, and continuous execution of such routine (plus giving a notice to the user, for the user adding to input value, if desired).

Figure 17:
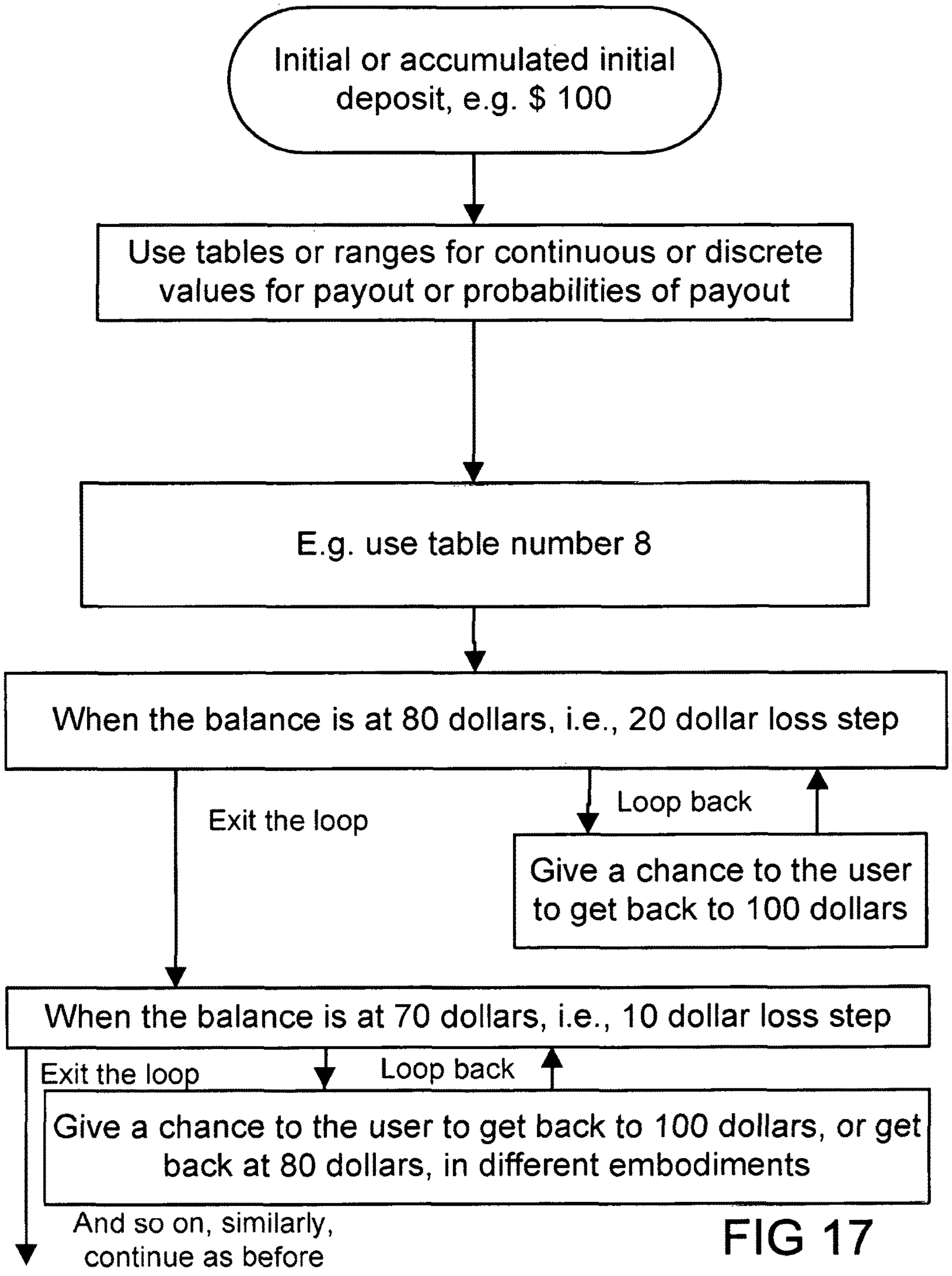
FIG. 17 is an embodiment for winning determination, along with a chance to win some or all or more than original input value, with a loop, and exit condition for the loop, and continuous execution of such routine (e.g. in different steps, going down, with various step sizes, in general, in one embodiment).
Figure 18:
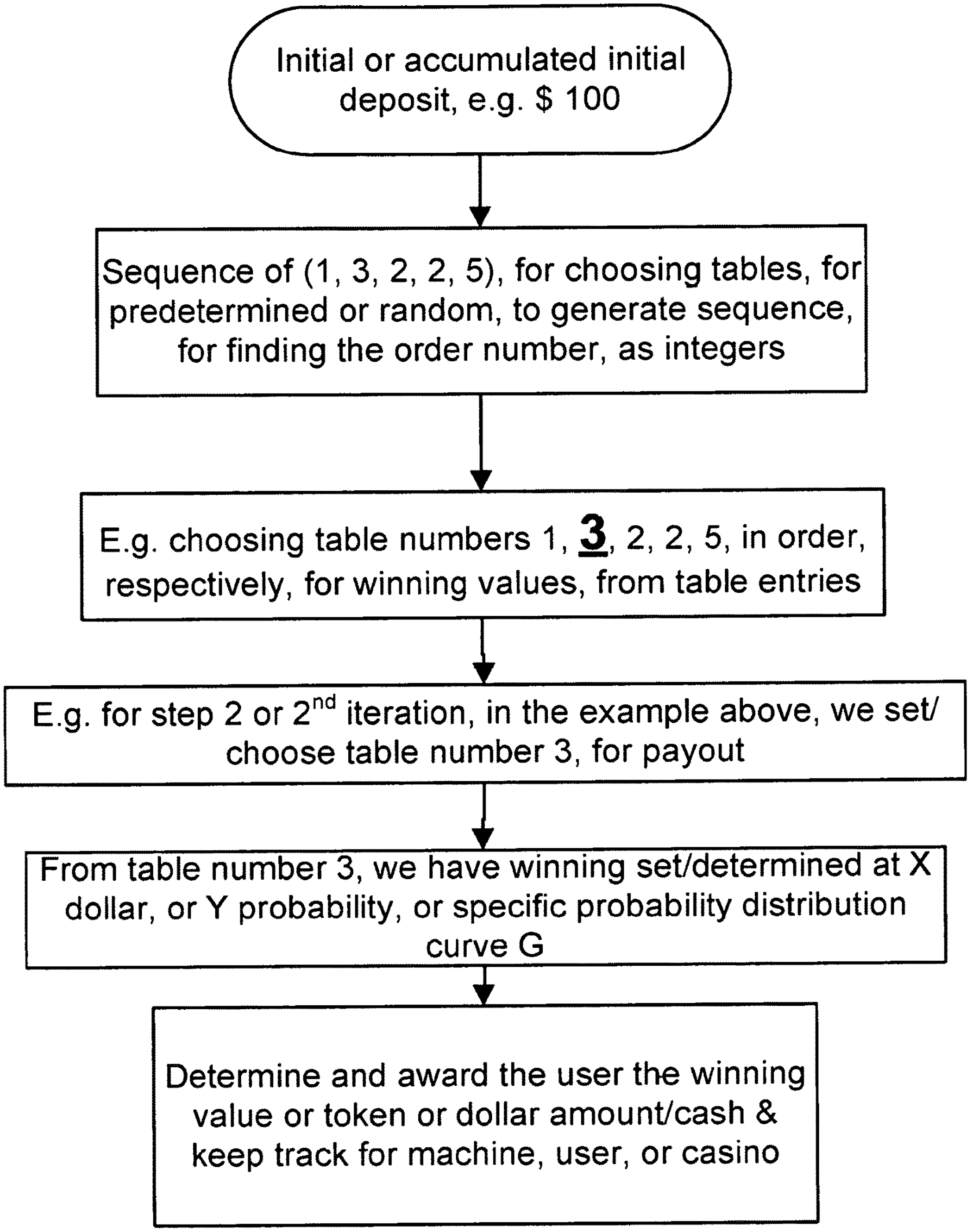
FIG. 18 is an embodiment for winning determination, along with choosing a table from a sequence of numbers indicating the table number.
Figure 19:
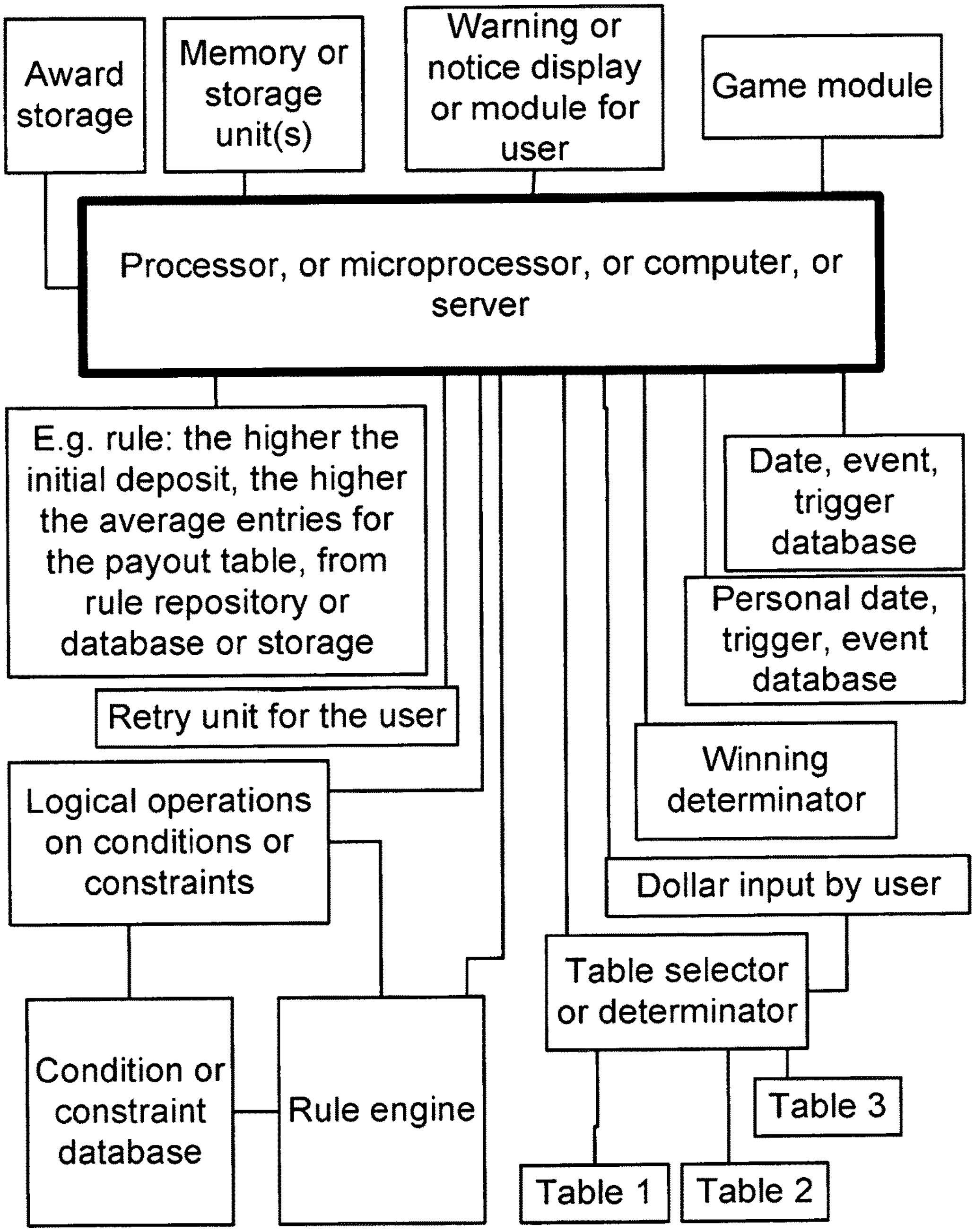
FIG. 19 is an embodiment for winning determination system, along with various components, for operation of various embodiments.
Figure 20:
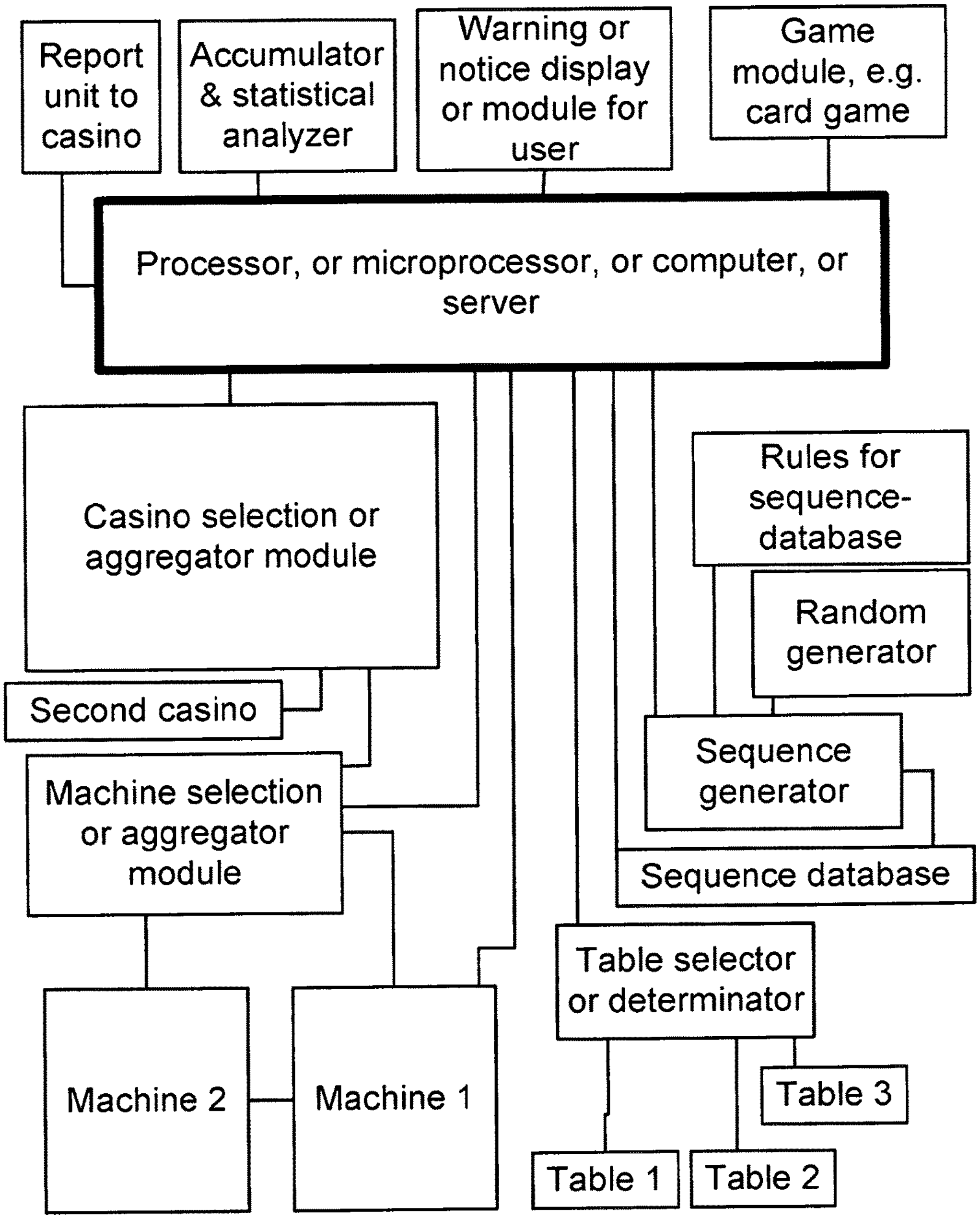
FIG. 20 is an embodiment for winning determination system, along with various components, for operation of various embodiments.

FIG. 17 is an embodiment for winning determination, along with a chance to win some or all or more than original input value, with a loop, and exit condition for the loop, and continuous execution of such routine (e.g. in different steps, going down, with various step sizes, in general, in one embodiment). FIG. 18 is an embodiment for winning determination, along with choosing a table from a sequence of numbers indicating the table number. FIG. 19 is an embodiment for winning determination system, along with various components, for operation of various embodiments. FIG. 20 is an embodiment for winning determination system, along with various components, for operation of various embodiments.

In one example, we have a method of conducting a game of chance on an electronic gaming machine comprising a display and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold value; receiving a plurality of payout schedules from said memory unit; and if said initial investment is higher than said first threshold value, then said processor assigning a first payout schedule from said plurality of payout schedules to said player's account on said electronic gaming machine; wherein said first payout schedule has a higher payout than that of a second payout schedule among said plurality of payout schedules; then receiving a losing step value from a storage unit; said processor calculating a first losing threshold by subtracting said losing step value from said initial investment; and if said player's account balance on said electronic gaming machine is below said first losing threshold, then providing said player a first bonus round, based on said first payout schedule, up to a value equal to said initial investment.

In other examples, we have a method which comprises one or more of the following steps:

said processor receiving a second threshold value;

or assigning a third payout schedule from said plurality of payout schedules to said player's account on said electronic gaming machine;

or receiving a second losing step value from said storage unit;

or calculating a second losing threshold; or combining winning values for various people in a social group or family plan;

or combining probability of winning values for various people in a social group or family plan;

or combining probability distribution curves for winning events for various people in a social group or family plan;
or capping winning values for various people in a social group or family plan, against a maximum winning threshold value;
or combining winning values for various machines in one or more casinos;
or combining probability of winning values for various machines in one or more casinos;
or combining probability distribution curves for winning events for various machines in one or more casinos;
or capping winning values for various machines in one or more casinos, against a maximum winning threshold value;
or using a random generator to select a table or schedule from said plurality of payout schedules;
or using a random generator to select a probability value for winning event;
or using a random generator to select a probability distribution curve for value for winning event;
or selecting a sequence of values for losing steps;
or selecting a sequence of values for gaining steps;
or using a conditional statement for rules engine or module;
or awarding non-cash prizes or merchandise.

Any of the methods or systems given above can be implemented in the following situations, as well, instead of, e.g., the initial deposit(s) amount being the deterministic value or the governing/threshold parameter:

When the awards or bonus round or enhanced winning table is triggered or implemented for and based on lost amounts, e.g., starting from 100 or 200 US$ as initial deposit (or deposits, total), when the user loses 40 US$, as the losing step or value or threshold, to get to 60 or 160 US$ balance, respectively, the enhanced or bonus regime kicks in or is activated. So, the main/important number or value is 40 US$, in this example, which governs the rules and thresholds for this embodiment.

The loss value/step in the embodiment above can also be expressed in terms of percentage or ratio or relative value, rather than absolute value such as 40 US$. For example, we can set the trigger or threshold for enhanced table or bonus round when we have one of the following criteria, as an example, starting from 100 US$, originally:

When we have 10 percent loss; or
When we have ⅔ of the amount lost; or
When we have 0.2 of the original amount loss.

For winning, in one embodiment, we have non-cash, cash, amenities, free upgrade, free room, free lunch, discounted, coupons, free merchandise, bonus round, a chance of winning the original investment/input/dollar value back, or fraction of original back, or more than original back, or any combination of the above.

In one embodiment, we have the total loss of a person is accumulated in one or more sessions, or for a family or circle of friends, or for a period or multiple periods, or for a single machine or for a series or machines or for a casino or multiple casinos, or in a city or multiple cities. So, for example, the person loses 100 dollars in total, then he will get a prize or bonus round or elevated winning table or favorable outcome table or free lunch or free stay at hotel or free game or free time on machine. For example, the person loses 80 dollars and gets a message, on screen of the computer or game machine or on its printed ticket or e-ticket or by email or on a card or smart card or magnetic card or credit card or customer card or ticket, that if he loses 20 dollars more, he will get a lunch worth of 50 dollars at a local affiliated or non-affiliated restaurant, as a coupon or gift card or ticket. Also, in one example, this can continue more, e.g., with another step and prize at a higher level of loss, e.g., when the person loses 180 dollars, and gets a message for the threshold for 200 dollars, as at that time, it will get a 80 dollar hotel stay for one night value or helicopter ride on the city or a show at night. So, at this scenario, everybody feels a winner, as the gambler may get a value ($80) more than the value he is going to risk at the last step ($20). Also, casino only pays a fraction of $80 to the restaurant, which is cheaper than 20 dollars, and the restaurant has many more customers at a pre-determined value, which is a good business, overall.

In one embodiment, we have a situation when a person loses L=40 dollars or a percentage of the original amount, then we (casino or game machine) will give him/her a prize, lunch, bonus round, favorite table of results or better/higher probability of win, or a chance to another play. In other embodiments, we have any of the embodiments described above, but without any threshold or requirement of initial deposits, or threshold being equal to zero dollars.

In one embodiment, we have a situation when if the person is on a machine for 1 hour, then gets the bonus or prize, or alternatively, with these conditions:

Staying on the machine for 20 more minutes, or 10 more plays on the machine, or 2 more sessions or continuous sessions on the game machine, or in casino.

In one embodiment, we have free play as prize, or 20 dollars worth of play. In one embodiment, we have triggers based on deposits made to the machine. In one embodiment, we have triggers based on amounts lost on the machine, for the same examples given above. In one embodiment, we have triggers based on same machine, play, session, casino, game, type, visit, day, month, year, season, average, total values, or the like. In one embodiment, we have triggers based on total amount in absolute value, e.g., lost in one chain of events or session or sitting or sequence. In one embodiment, we have the games in poker, blackjack, computerized, simulation, or slot machines.

In one embodiment, we have the condition or trigger based on, e.g.:

Same sitting, having X dollars now
Same day or week, having X dollars now
If play 3 hours
If play 3 hours, continuously
If play 3 hours, and loses 450 dollars or more
For a specific machine or computer game or module
During non-peak hours
During peak hours
If after losing 50 dollars, if stay 30 minutes more, or lose 40 dollars more
If after 2 hours on machine, if stay 30 minutes more, or lose 40 dollars more
If loses r dollars, then gets a x dollar lunch, but if loses s dollars, it has more choices for lunch or dinner to choose from
No initial deposit requirements, but for every 20-dollar intervals/losses, decide for prizes, or adjust for prizes and levels and values (note that these numbers are just examples, and not limiting, for all the above examples)
Table of values: 40 $, next 50 $, next 15 $: ask for player to put in these values, in the sequence, for prizes or rewards, or use random numbers generated by a computer for such a sequence Based on card across a casino, machines, casino-wide, or not-machine-specific, as also described fully, already, in our parent case, which the current case is a CIP of In one embodiment, we have a situation that if we lose more dollars, we will get a prize: A method of conducting a game of chance on an electronic gaming machine comprising a display, and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold value for triggering prize or reward; said processor receiving a second threshold value for notifying said player; a counter calculating said player's losing total; said processor receiving said player's losing total; if said player's losing total is more than said second threshold value for notifying said player, then subtracting said player's losing total from said first threshold value for triggering prize or reward, to get a first difference value; displaying said first difference value to said player on said display; recording said first difference value on said player's card; said processor receiving a first predetermined amount of time; if said player comes back and logs in to said electronic gaming machine or a particular casino within said first predetermined amount of time since last time said player logged out, a card reader reading said first difference value from said player's card; wherein said card reader is within or connected to said electronic gaming machine; if said player further loses another amount equal or more than said first difference value, then said electronic gaming machine presenting said player with a prize, reward, game option, coupon, lunch ticket, show ticket, hotel room ticket, or discounted or free service.

In one embodiment, we have the following variations to the above:

- aggregating all losses on all machines in said particular casino.
- aggregating all losses on all machines in all sister casinos.
- receiving a warning on a cell phone.
- receiving a warning on a laptop.
- combining losses for various people in a social group or family plan.
- extending deadline for expiration of said player's card.
- adding more steps for thresholds for other prizes.
- adding more choices for other prizes.
- combining winning values for various machines in one or more casinos.
- combining probability of winning values for various machines in one or more casinos.
- combining probability distribution curves for winning events for various machines in one or more casinos.
- capping winning values for various machines in one or more casinos, against a maximum winning threshold value.
- using a random generator to select a table or schedule from a plurality of payout schedules.
- using a random generator to select a probability value for winning event.
- using a random generator to select a probability distribution curve for value for winning event.
- selecting a sequence of values for step thresholds.
- selecting a sequence of values for losing thresholds.
- using a conditional statement for rules engine or module.
- said first predetermined amount of time is one day.

In one embodiment, we have a situation that if we stay longer time period, we will get a prize: A method of conducting a game of chance on an electronic gaming machine comprising a display, and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold time value for triggering prize or reward; said processor receiving a second threshold time value for warning said player; a time recorder keeping a time for a total log-in time for said player on said electronic gaming machine; said processor receiving said total log-in time from said time recorder; if said first threshold time value for triggering prize or reward minus said total log-in time is less than said second threshold time value for warning said player, then giving a notice to said player; displaying said notice to said player on said display; recording said notice on said player's card; said processor receiving a first predetermined amount of time; if said player comes back and logs in to said electronic gaming machine or a particular casino within said first predetermined amount of time since last time said player logged out, a card reader reading said total log-in time from said player's card; wherein said card reader is within or connected to said electronic gaming machine; if said player further logs in another period of time equal or more than said first threshold time value for triggering prize or reward minus said total log-in time, then said electronic gaming machine presenting said player with a prize, reward, game option, coupon, lunch ticket, show ticket, hotel room ticket, or discounted or free service.

In one embodiment, we have a situation that if we stay more number of plays, we will get a prize: A method of conducting a game of chance on an electronic gaming machine comprising a display, and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold value for triggering prize or reward; said processor receiving a second threshold value for notifying said player; a counter calculating said player's total number of individual game plays; said processor receiving said player's total number of individual game plays; if said player's total number of individual game plays is more than said second threshold value for notifying said player, then subtracting said player's total number of individual game plays from said first threshold value for triggering prize or reward, to get a first difference value; displaying said first difference value to said player on said display; recording said first difference value on said player's card; said processor receiving a first predetermined amount of time; if said player comes back and logs in to said electronic gaming machine or a particular casino within said first predetermined amount of time since last time said player logged out, a card reader reading said first difference value from said player's card; wherein said card reader is within or connected to said electronic gaming machine; if said player further plays another number of individual game plays equal or more than said first difference value, then said electronic gaming machine presenting said player with a prize, reward, game option, coupon, lunch ticket, show ticket, hotel room ticket, or discounted or free service.

In one embodiment, we have a situation that if we stay on non-peak hour periods, we will get a prize: A method of conducting a game of chance on an electronic gaming machine comprising a display, and a memory unit, and in communication with a processor, said method comprising: said processor accepting an initial investment from a player to participate in said game of chance on said electronic gaming machine; said processor crediting said player's account on said electronic gaming machine an amount equivalent to said initial investment; said processor receiving a first threshold time value for triggering prize or reward; said processor receiving a second threshold time value for warning said player; said processor receiving a definition of non-peak hour periods from a time database; a time recorder keeping a time for a total log-in time for said player on said electronic gaming machine for accumulation of said non-peak hour periods for said player; said processor receiving said total log-in time for said accumulation of said non-peak hour periods for said player from said time recorder; if said first threshold time value for triggering prize or reward minus said total log-in time for said accumulation of said non-peak hour periods for said player is less than said second threshold time value for warning said player, then giving a notice to said player; displaying said notice to said player on said display; recording said notice on said player's card; said processor receiving a first predetermined amount of time; if said player comes back and logs in to said electronic gaming machine or a particular casino within said first predetermined amount of time since last time said player logged out, a card reader reading said total log-in time for said accumulation of said non-peak hour periods for said player from said player's card; wherein said card reader is within or connected to said electronic gaming machine; if said player further logs in another period of time of said non-peak hour periods equal or more than said first threshold time value for triggering prize or reward minus said total log-in time for said accumulation of said non-peak hour periods for said player, then said electronic gaming machine presenting said player with a prize, reward, game option, coupon, lunch ticket, show ticket, hotel room ticket, or discounted or free service.

In one embodiment, we have defined the non-peak hour periods as when less people are trying to play the games and stay on machines to encourage people stay on, on odd hours, for better distribution of users and avoiding peaks and congestions or uniformly distribute the population throughout the day or week, for optimum profit and utilization of games and machines, e.g., to avoid people waiting for sitting on a machine, due to congestion and overcrowding, which can be avoided by population distribution among different hours, as uniform as possible, to increase game participations and play time, and less idling or unused time (minimizing under-utilization periods). For example, if between the hours 6 am to 10 am, the machine is vacant or unused, we want to encourage people to come that period. So, we gave them advantage of winning or prizes, to compensate for inherent lack of (or less) customers for those periods, as explained above in details.

In one embodiment, we have card for personal information and ticket for dollar amount and ad info, as well as any other relevant info. The same information can be recorded on both card and ticket or coupon. The reader and printer can record and print or read to/from any one of them. In one embodiment, we have a central database holding the same info, e.g., via the card or ticket or other means.

In one embodiment, we have the player with 2 choices, of playing more or leaving. In one embodiment, we have the log-in concept used very broadly, e.g., for anytime the player is back on the machine or start playing again or put the card or ticket in the machine or turn of the machine. For example, when a player is not identified and leaves the machine and comes back later, from the ticket, card, RFID, tag, or similar means, the machine can still know that he is the same person that was here before, and he can benefit from his history/file/prior transactions with the machine, to get more favorable results, as shown above. In one embodiment, we have internet based, computer based, tablet based, tel. based, or laptop based, for the machine, e.g., for one or more players, alone or together, to be able to do the teachings shown above.

In one embodiment, we have live marketing, promotion, and/or instant rewards, with real time feedback, e.g., to decide what option or awards or choices to give the player, on spot. In one embodiment, we have customized options for the casinos, so that the unit of machine can be programmed or input for parameters or adjusted by menus or knobs, so that billions of different variations can be programmed on spot or centrally or remotely or varied or periodically changed or modified based on casinos' desire or marketing needs or predictions, to optimize, with all parameters given above for these machines as variables, and adjustable or changeable, to give maximum flexibility to the casinos for better customer satisfaction and loyalty, and higher profits at the end. So, all the parameters in this invention/disclosure can be changed as independent or dependent variables, controlled by a remote or central computer or server, as was also described in the parent application.

The dynamic bonusing is used for variable parameters, e.g., changing and setting the parameters by casinos for: time, thresholds, periods, dollar values, ranges, conditions, bonus amount, bonus round, and the like, or as other parameters mentioned in this invention. The dynamic parameter database comprises all the variables for the game, as listed in various parts of this invention, such as thresholds, times, periods, margins, percentages, awards, dollar values, triggers, probabilities, chances, statistics, curves, ratios/percentages, absolute values, relative values, and the like.

The dynamic parameter interface lets the casino change the parameters in the database, with its display. The parameter initializer for the game and the game controller sets the parameters and then runs the game, respectively, based on the dynamic parameters, read from the dynamic parameter database. So, the same game on different machines have different performances and outcomes, and they can be changed routinely, manually, or periodically, or based on time or trigger or event or conditions or if/then rules or rules engine, or remotely, or centrally, or by a processor, or by a pattern, or by a computer, by casino, for marketing or optimization or customer loyalty or testing customer purposes.

In one embodiment, we have an electronic gaming machine owner entering a set of dynamic parameters, which comprises: initial time, ending time, time periods, time thresholds, initial dollar value, dollar value thresholds, dollar value ranges, bonus amount values, trigger time values, trigger dollar values, probability values, probability curves, probability tables, winning chances, winning tables, winning values, reward levels, reward tables, reward thresholds, casino margins, and house percentages, through a dynamic parameter interface.

In one embodiment, we have table games (such as poker or card games) and slot machines. In one embodiment, we have the metrics based on number of plays or sessions per hour, with G percentage house/casino advantage, for comparison of benefits or differences with the prior situation. For example, we have 3 $/play, or 15 sec/game (e.g. a sitting of 1 hour produces 240 games, statistically, in average), with the number of plays, average wagers specified, and house advantage in percentage F % or ratio H, for average win or profit of the casino or machine, statistically. Another example is "average daily theoretical" value. For estimate/calculations, we have 2 methods: (a) spread for table games, with estimate of number of games per hour or time window, and (b) for slot machines, with exact number of push/pull handle or button on the machine.

In other embodiments, we have: adjusting values in said game rules and command engine, based on a rule, time, trigger, condition, casino, user, said player, said electronic gaming machine owner, marketing requirement, customer demand, sales history, customer traffic, season, time of day, profit history, profit margin, location, or customer taste.

In other embodiments, we have: a parameter initializer reading said set of dynamic parameters from said dynamic parameter database; said parameter initializer setting values for game parameters and rules in a game rules and command engine, using said set of dynamic parameters; said processor accepting an initial investment from a player to participate in said game of chance on said electronic gaming machine; said processor crediting said player's account on said electronic gaming machine an amount equivalent to said initial investment; said processor receiving a first threshold value for triggering prize or reward from said game rules and command engine; said processor receiving a second threshold value for notifying said player from said game rules and command engine.

In other embodiments, we have the following examples of games:

1. Additional rewards granted to player in exchange for player's card signup as play progresses.
   a. Allows for a system through which an un-carded player would be presented with messages encouraging him to sign up for a players card.
   b. Tied to total player spend and/or playing habits (i.e., max bet, average bet, etc)
   c. The intention is to provide repeated and incremental incentive to a player to sign up, in proportion with his value to the casino.
   d. As the player is worth more, the system prompts the player with additional incentives:
      i. if you sign up now, you would get $5 Free Play, then $10, etc.
2. Additional rewards granted to player as player progresses through Average Daily Theo tiers.
   a. As players hit different thresholds of worth to the casino, they would typically be moved into different reward tiers.
   b. These tiers are typically opaque to the player (differentiated from player facing tiers, i.e., Sliver, Gold, Platinum, etc.), and are expressed primarily through monthly mailers and invitations to the events.
   c. This system would allow for an immediate rewarding/inviting during play when a player has exhibited behavior that would move them into a different tier.
   d. For example, Player is playing at a different level than before or, as a new player, is exhibiting play that would typically result in an additional reward or invite to an event, the system prompts and rewards that player at the machine (whether or not they have to go to a players club booth to redeem, or get a voucher at the machine).
3. Notification of players club, player facing tier status during play and temporary 'boosts' to status.
   a. Some players clubs feature player-facing tier structures (Silver/Gold/Platinum) with additional benefits to players, as they move into higher tiers.
   b. Those tiers are typically achieved through volume of play, i.e., coin-in the machine. $1=1 point (or the like). The more you play, the higher your status, which opens up financial and other rewards (premium parking, line-skip privileges, etc.).
   c. This extension would prompt the player with his current tier status and how far he needs to go (i.e., how many more points he needs) to move into the next tier.
   d. Additionally, the system could temporarily increase the point accumulation speed to increase player's time on device or coin in.
   e. For example, when player reaches a threshold of time on device or coin in (or whatever triggers it), they receive e.g. 2× tier points for e.g. the next 20 minutes or T time period.

The following table shows some of the definitions and parameters used for our system, as how it is done in the industry:

TABLE 1

Parameters used.

| term | Definition | calculation |
|---|---|---|
| handle | Total amount wagered | Bet per spin × bet (spin) count |
| Average bet | Average money risked on each decision to wager. For table games, this is a visual estimate by table games employee. | Handle/number of spins |
| bet | The total amount a player risk on a single outcome. | N/A |
| Time played | Irrelevant fro slots. For table games, it is when the player sits down to when the player gets up. | Time out − time in |
| theoretical | The expected amount that the casino expects to win from a player based on money risked and house advantage. | Different for slots & tables (see chart) |
| Reinvestment percentage | This is the amount of expected win that the casino spends to retain players through promotions, comps, and other rewards. | Custom percentage × theoretical |
| Player session | Time between the placement of the first bet to the placement of the last bet. | Time of last bet − time of first bet |
| Bet (spin) count | Number of bets placed. | N/A |

The following is an example of calculations for our system, for Theoretical Win calculation, by the game type, as how it is done in the industry:

TABLE 2

Example for calculations:

| | slots | Table games |
|---|---|---|
| Time played (m) | | 90 |
| Estimated bets per hour or time | | 40 |
| Bet (spin) count | 100 | 60 |
| Average bet | $ 3.00 | $ 25.00 |
| Handle | $300.00 | $1,500.00 |
| House advantage | 7.50% | 2.00% |
| Theoretical Win | $ 22.50 | $ 30.00 |

The following are some examples, for the teaching of the parent cases:

Use in game bonus to trigger match play type bonus. E.g., half is cash and half is free play. E.g., you put 20 $ and they match 20 $ for free play, for a total of 40 $.

Use casino to award the concert tickets randomly on nights of soft/low attendance.

Use casino to create immediate bounce back, e.g., losing 20 $ at last hour, but if put 20 $ more in, then it gets a bonus.

Use casino to award dessert, meal coupon, after dinner, so that the player comes back after dinner to play more.

Determine average time on machine. After passing average threshold, then give bonus to stay in more.

Refund 20% of loss, for quick loss, but redeemable with another deposit.

Random bonus, but only redeemable when customer signs up for player's card (assign random code to a new account).

Random hot seat, but actually use a formula to determine (e.g., biggest statistical loser, based on time played and relative losing percentage), to reward the casino's long-time losers.

Anybody losing 20 $ in short period of time T, get 0.5 back as bonus, for quick loss.

If starting with 40 $, and after some win/losing, the player played or lost or won 250 $, as total, or more, cumulatively, then win a prize, bonus round, or free play, or free night at hotel, or free lunch, based on average daily theoretical, with option of using a player's card, with accumulating rewards, with more bonuses, if joining the player's club.

Other Inventions: Proxy Playing/Betting:

The following are the examples and embodiments of the invention for proxy or replacement betting or gambling, that can be combined, as shown in figures, with details:

A method of conducting a game of chance on an electronic gaming device, said method comprising: a processor receiving a name of an expert player from an expert database; wherein said electronic gaming device comprises said processor; said processor receiving a history and statistical data for performance of said expert player from a performance database; said processor displaying said history and statistical data for performance of said expert player on a device monitor; said processor ranking said expert player based on said history and statistical data for performance of said expert player; selecting said expert player for a syndicate for said game of chance on said electronic gaming device; a first player choosing said expert player from said syndicate's database; said expert player betting a first value of currency on said game of chance on said electronic gaming device; said processor producing a first outcome for said expert player betting said first value of currency on said game of chance; said electronic gaming device communicating with a remote device; said first player betting a second value of currency on said game of chance on said remote device; said processor producing a second outcome for said first player betting said second value of currency on said game of chance; said processor receiving a first rule from a rule database; wherein said second outcome is a function of said first outcome, based on said first rule, processed in a rule engine; plus the following features, as an option added, in any combination:

a manager choosing said expert player.

choosing multiple experts.

choosing multiple managers.

choosing multiple syndicates.

choosing multiple buckets for different accounts for different bets.

limiting followers.

choosing followers.

setting conditions for followers.

averaging values from multiple experts.

weighted-averaging values from multiple experts.

said second outcome is same as said first outcome.

betting as a proxy on a second person, who is betting on a third person, as a chain of proxies.

adjusting percentage or salary based on using an auction model.

adjusting percentage or salary based on using a hedging model.

adjusting percentage or salary based on using a stock market model.

adjusting percentage or salary based on demand on said expert player.

using authentication to verify an identity of a person.

group-betting for said game of chance.

charging a portion of winnings as a management fee.

Figure 21:
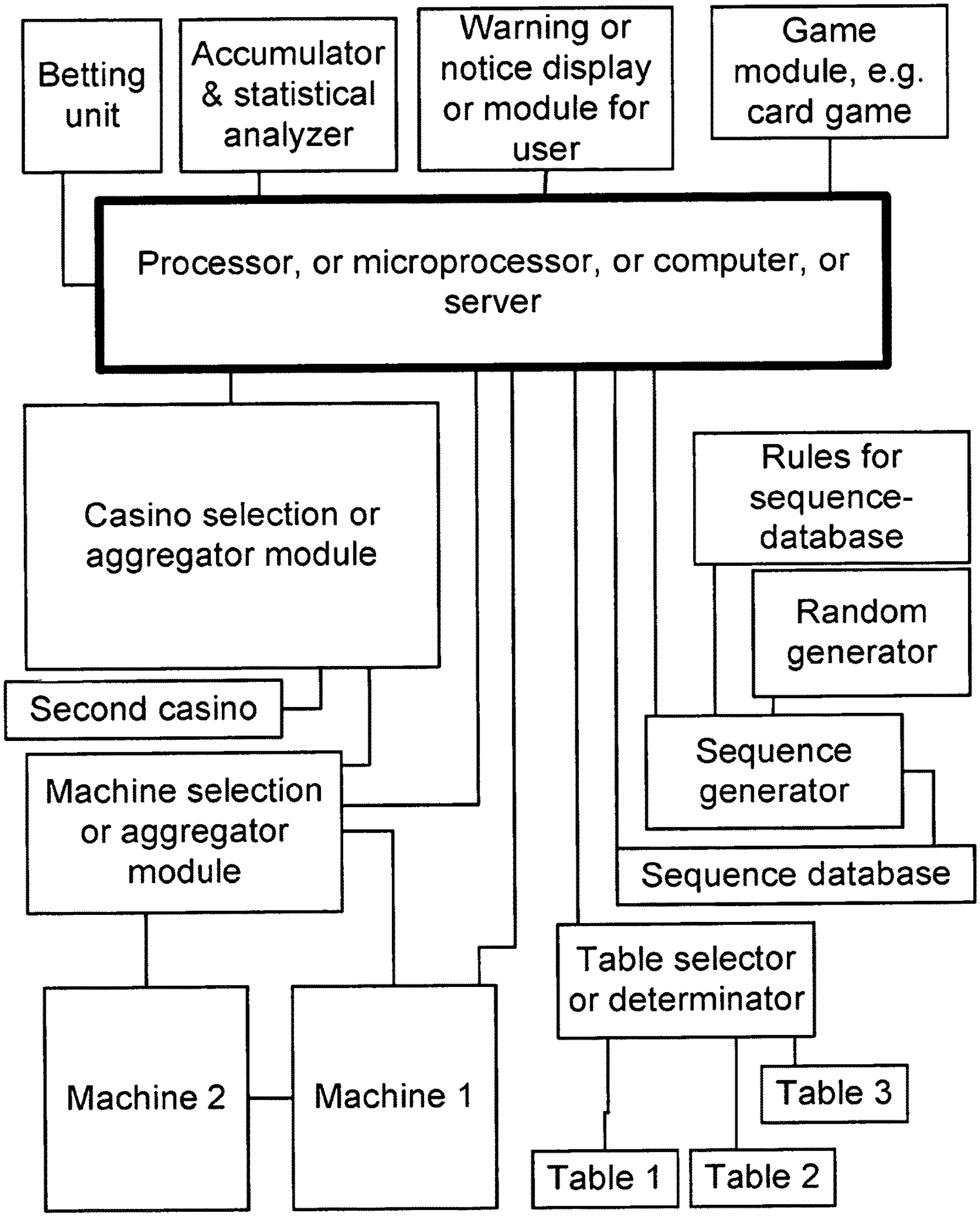
FIG. 21 is an embodiment for proxy betting system for different machines and different casinos, as well as different games.
Figure 22:
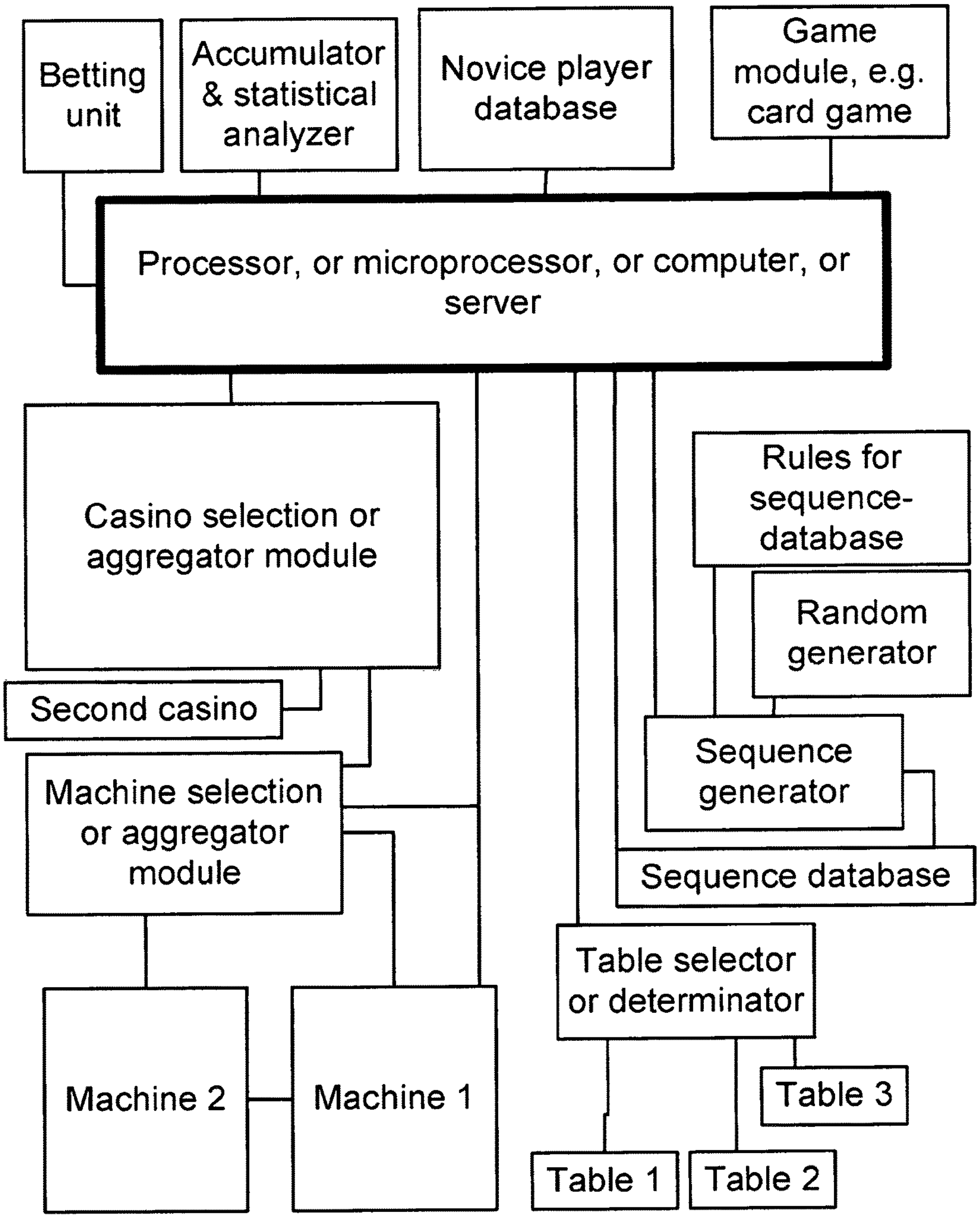
FIG. 22 is an embodiment for proxy betting system for novice players' participation.
Figure 23:
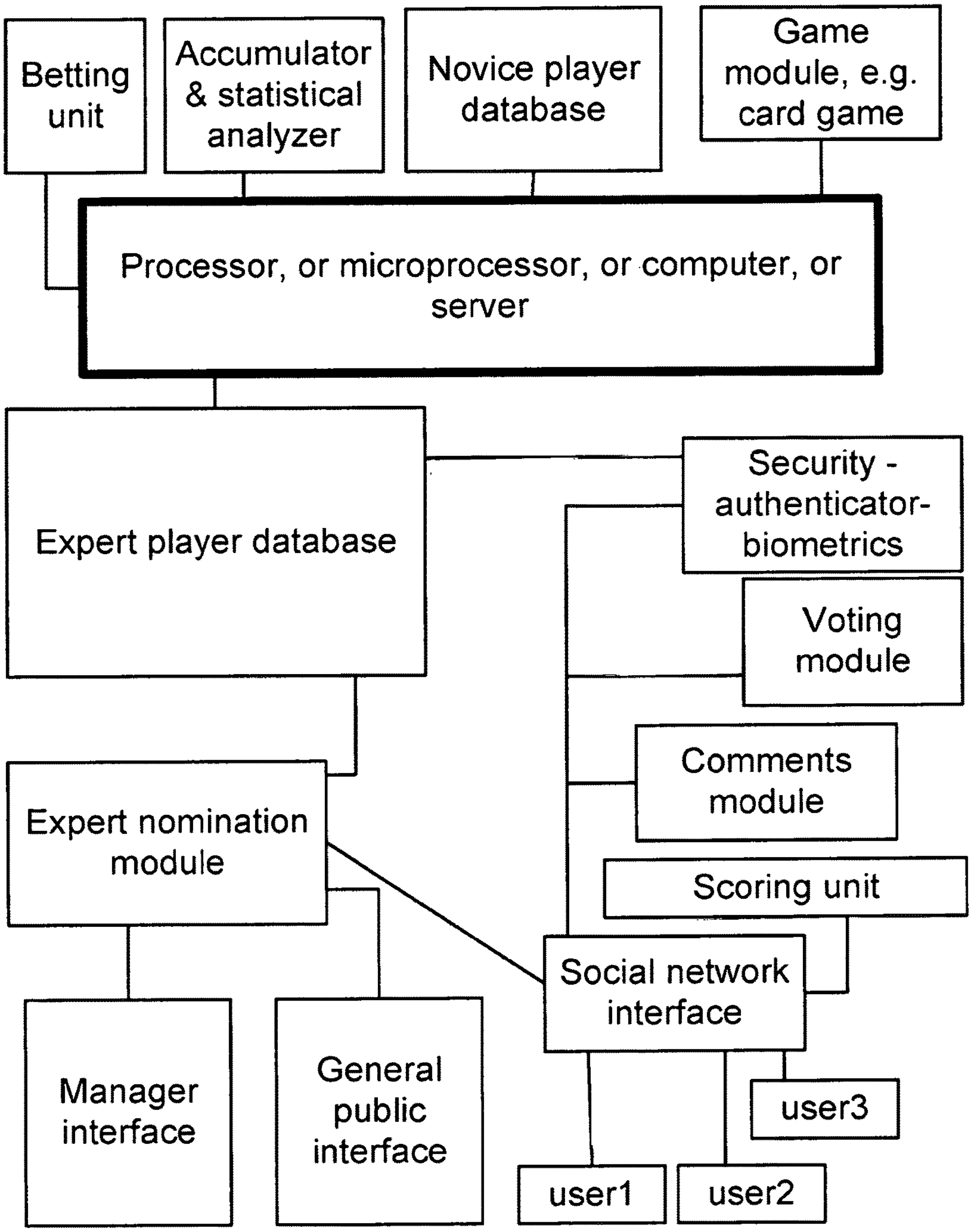
FIG. 23 is an embodiment for proxy betting system for expert or leader determination or setting up module.
Figure 24:
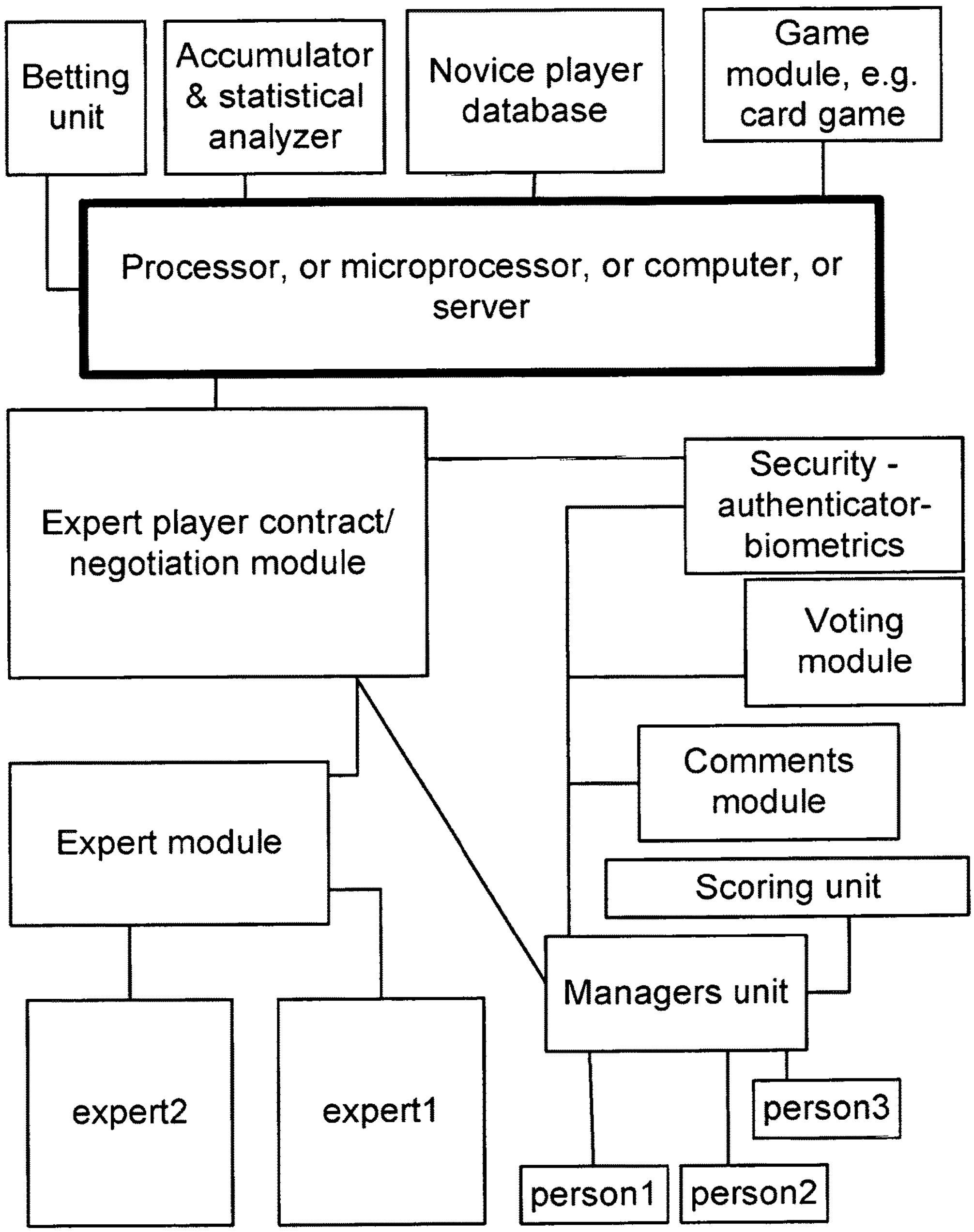
FIG. 24 is an embodiment for proxy betting system for manager and expert negotiating and contracting module.

FIG. 21 is an embodiment for proxy betting system for different machines and different casinos, as well as different games. FIG. 22 is an embodiment for proxy betting system for novice players' participation. FIG. 23 is an embodiment for proxy betting system for expert or leader determination or setting up module. FIG. 24 is an embodiment for proxy betting system for manager and expert negotiating and contracting module.

Figure 25:
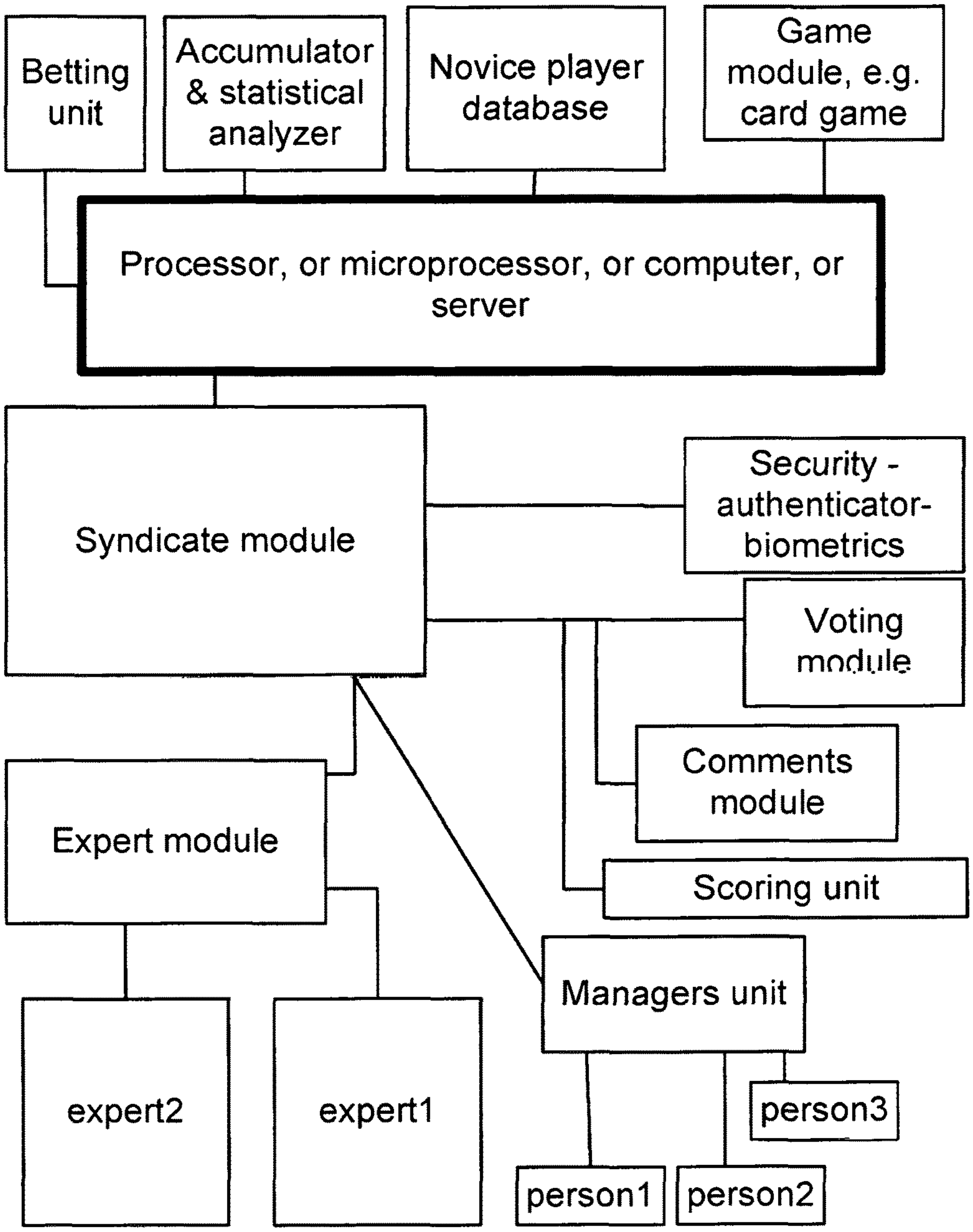
FIG. 25 is an embodiment for proxy betting system for syndicate module with all components.
Figure 26:
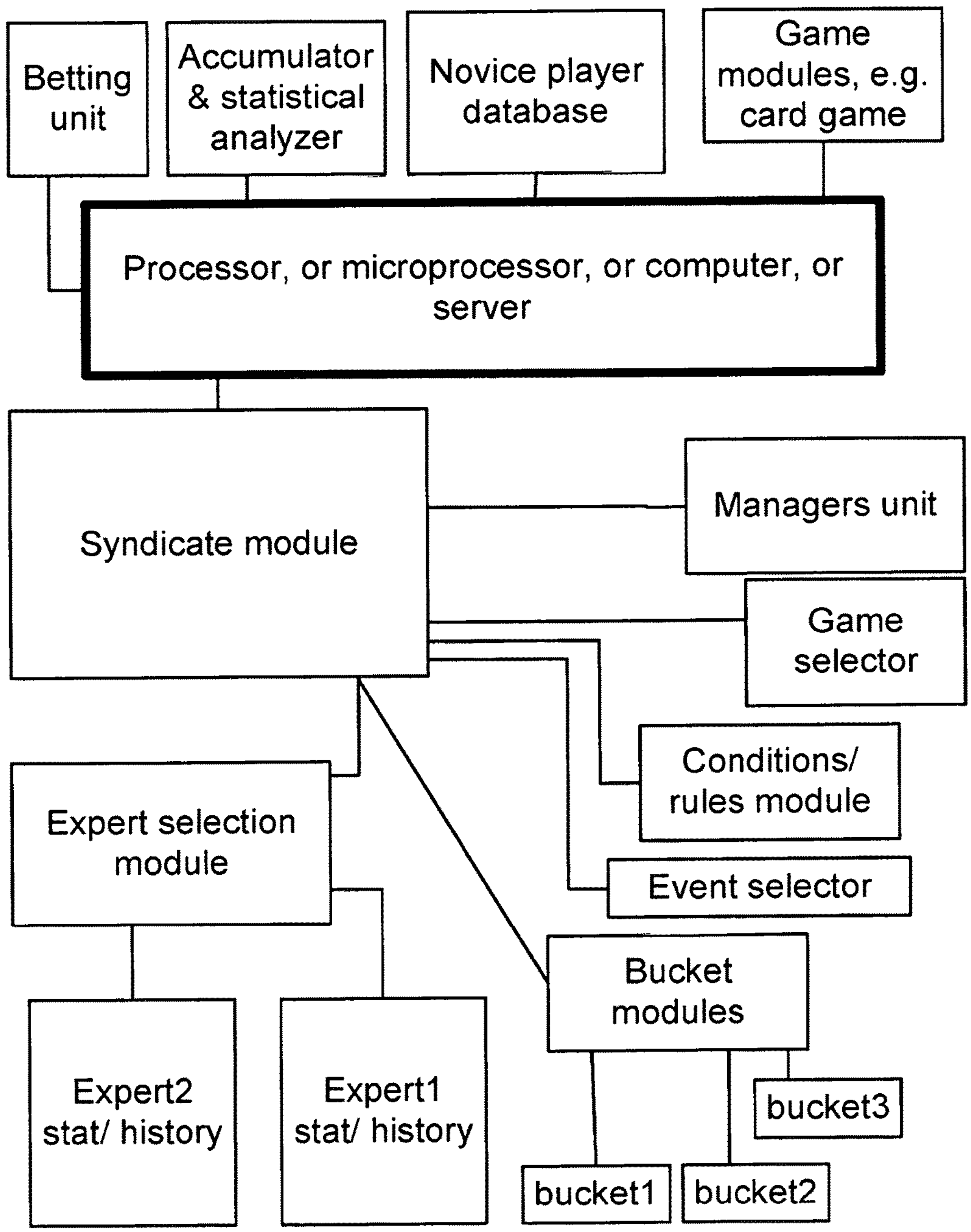
FIG. 26 is an embodiment for proxy betting system for different bucket modules for different purposes for betting as separate accounts.
Figure 27:
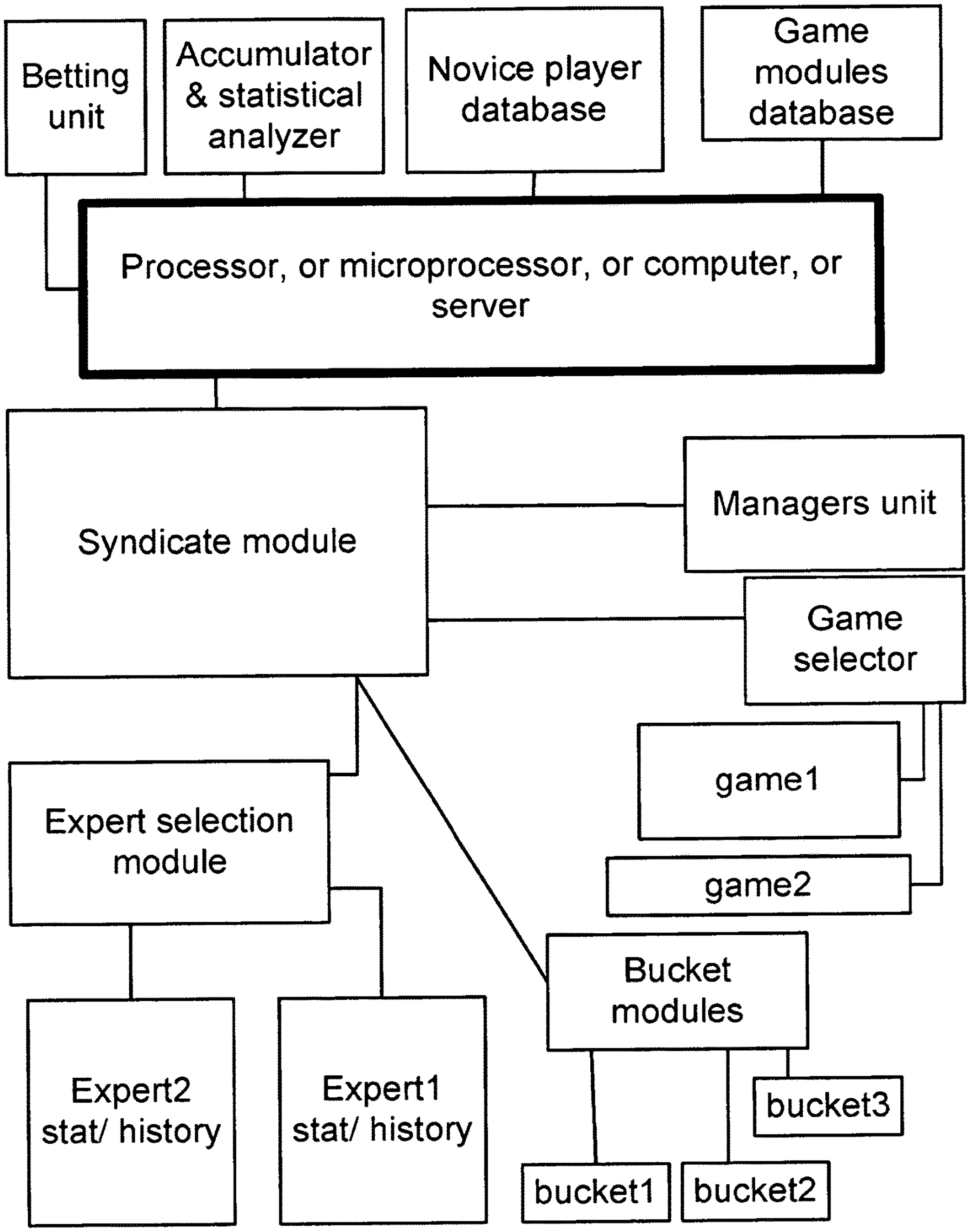
FIG. 27 is an embodiment for proxy betting system for different games, with experts' statistics/history.
Figure 28:
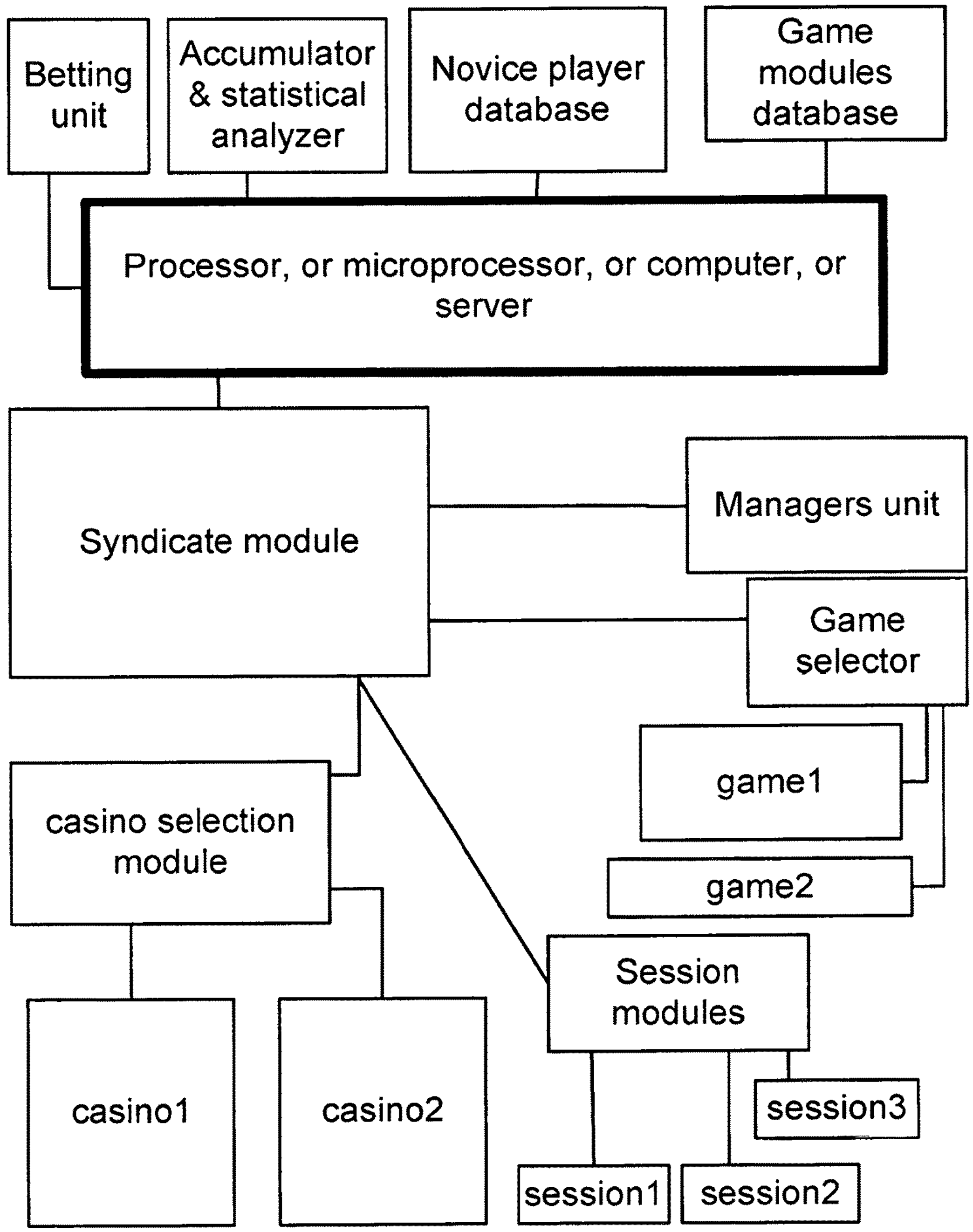
FIG. 28 is an embodiment for proxy betting system for different sessions of some games.

FIG. 25 is an embodiment for proxy betting system for syndicate module with all components. FIG. 26 is an embodiment for proxy betting system for different bucket modules for different purposes for betting as separate accounts. FIG. 27 is an embodiment for proxy betting system for different games, with experts' statistics/history. FIG. 28 is an embodiment for proxy betting system for different sessions of some games.

Figure 29:
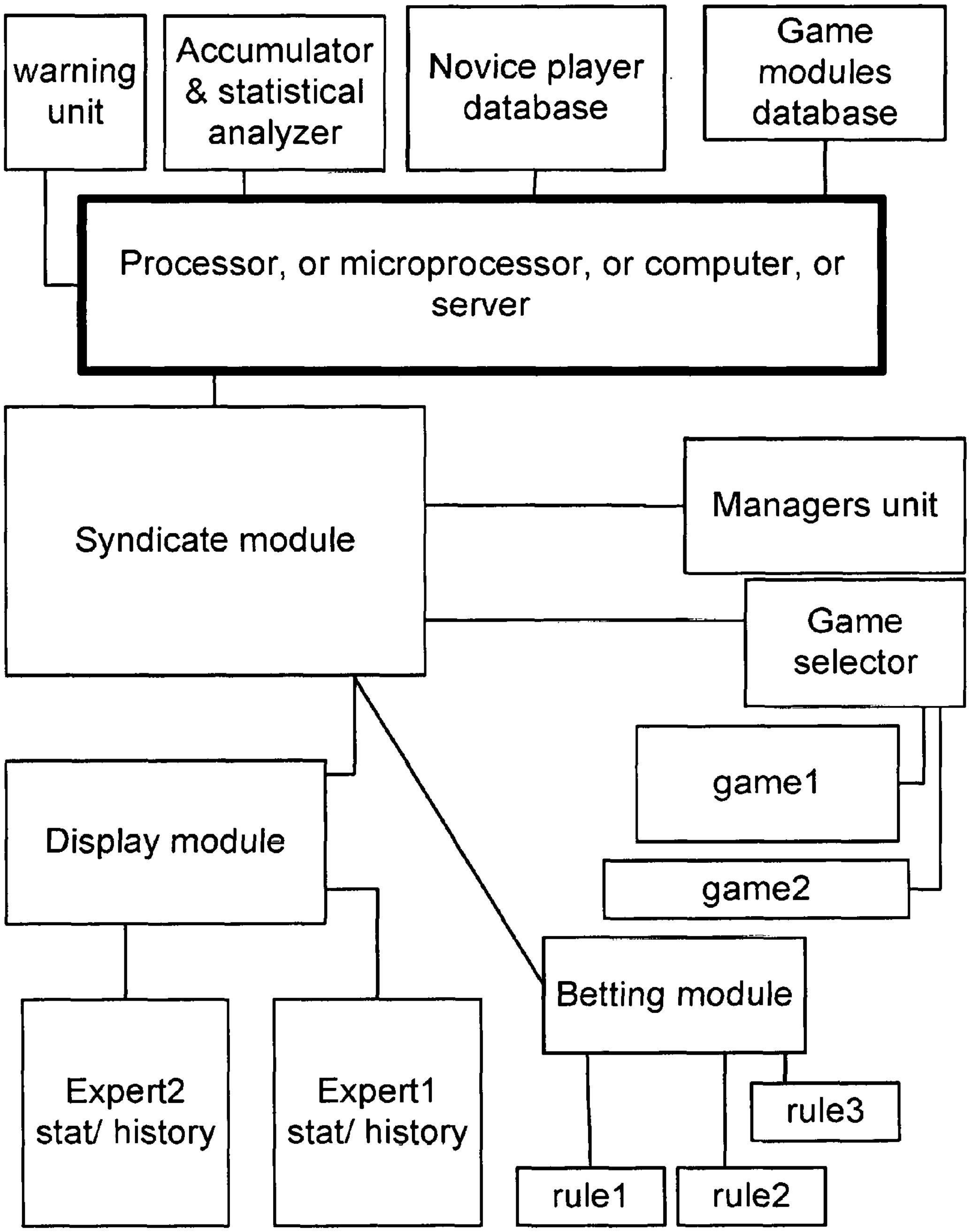
FIG. 29 is an embodiment for proxy betting system for betting module and display stat/history for experts.
Figure 30:
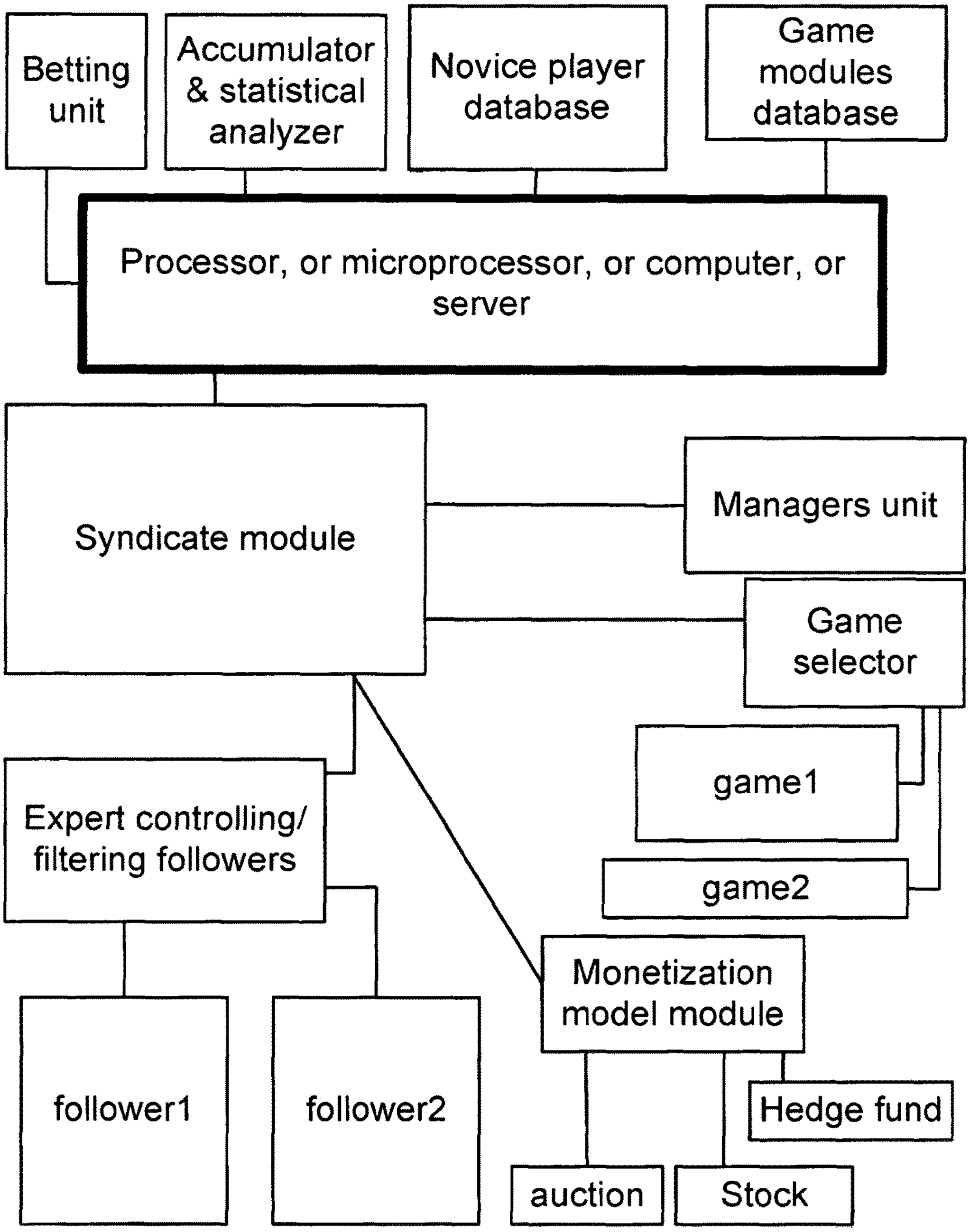
FIG. 30 is an embodiment for proxy betting system for different monetization module based on various models, with experts choosing or limiting the followers, as their options.
Figure 31:
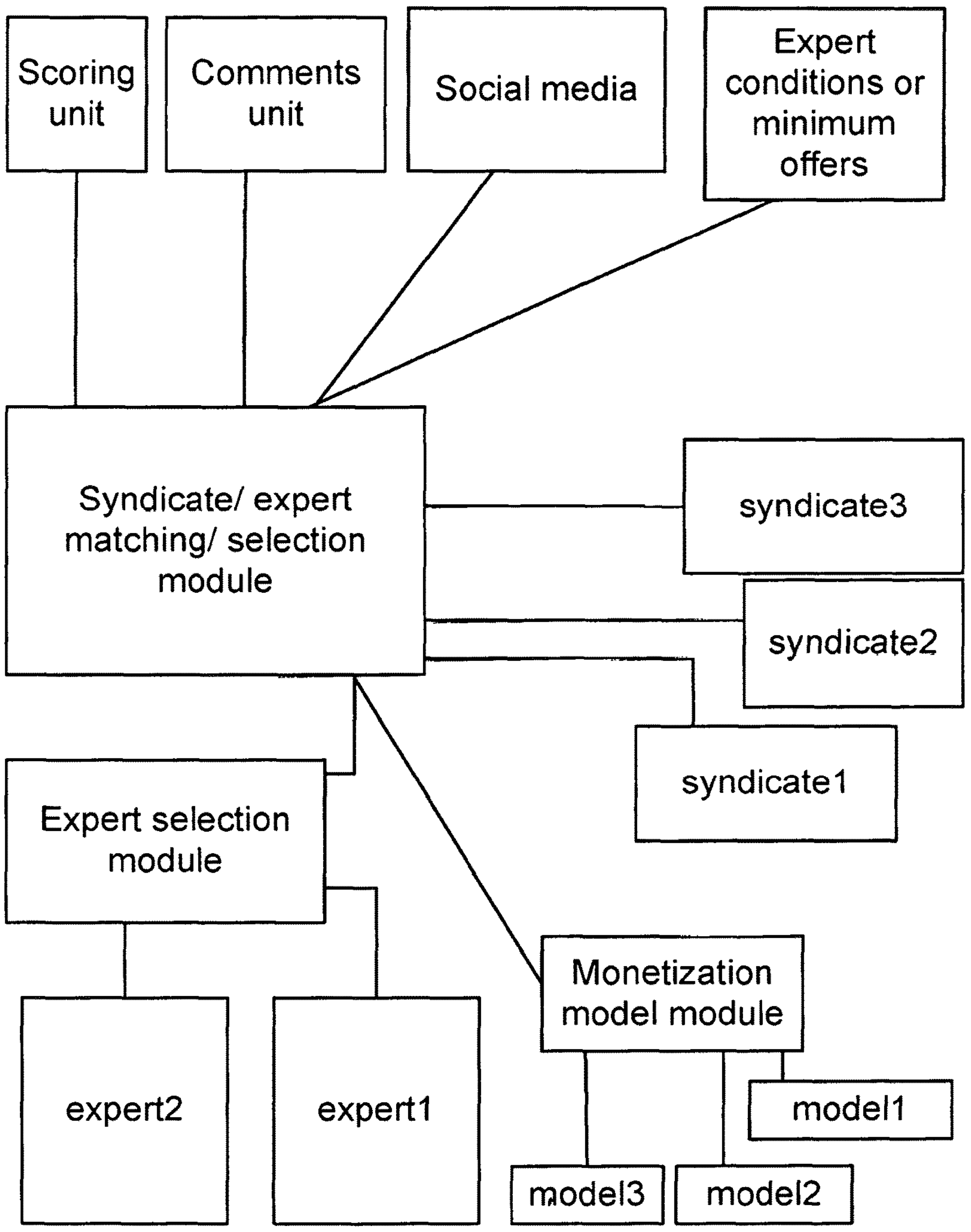
FIG. 31 is an embodiment for proxy betting system for different syndicates, different experts, and different models.

FIG. 29 is an embodiment for proxy betting system for betting module and display stat/history for experts. FIG. 30 is an embodiment for proxy betting system for different monetization module based on various models, with experts choosing or limiting the followers, as their options. FIG. 31 is an embodiment for proxy betting system for different syndicates, different experts, and different models.

Figure 32:
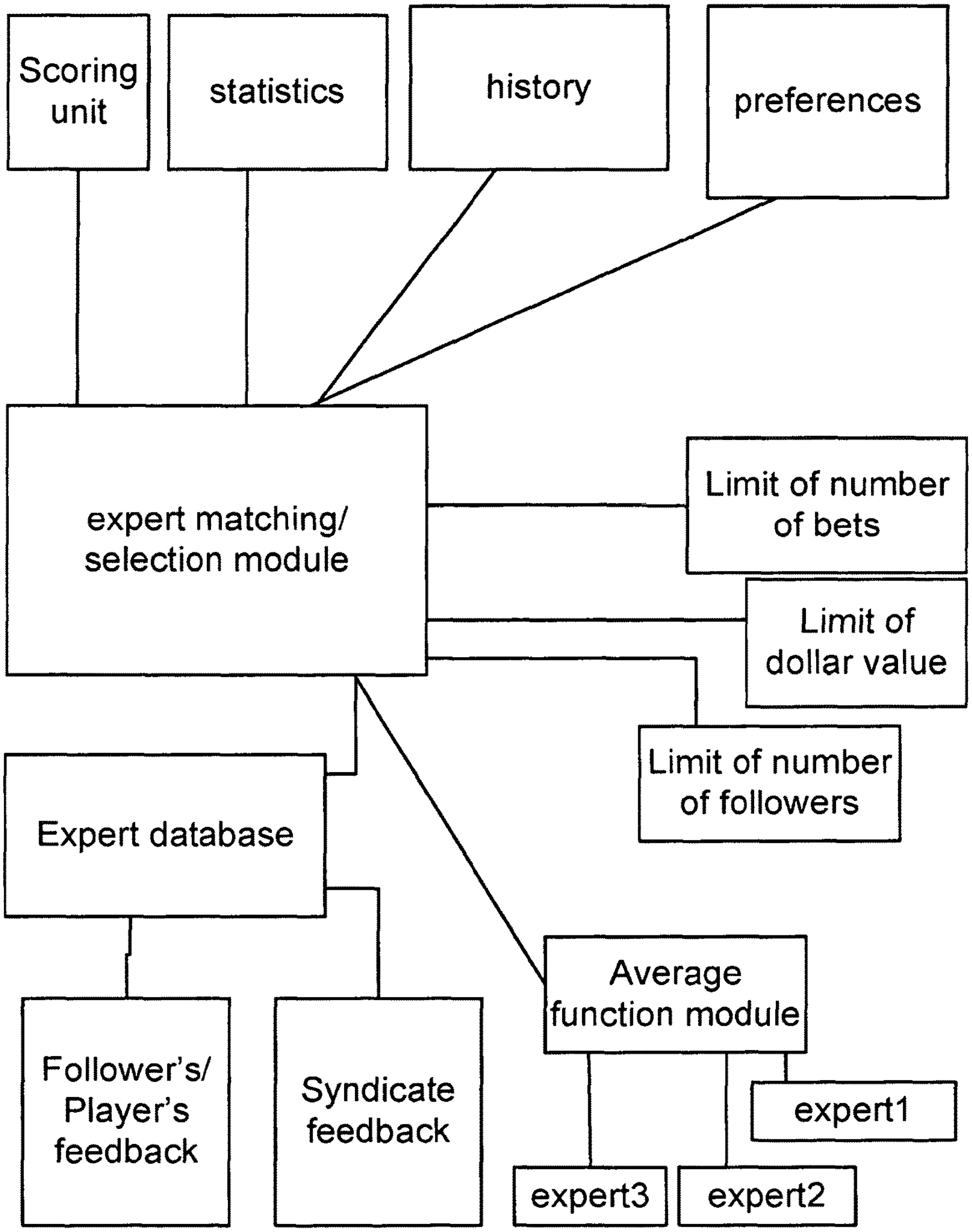
FIG. 32 is an embodiment for proxy betting system for different limitations, feedback, and experts, with corresponding functions on the expert results, e.g., averaging their values, for betting purposes.
Figure 33:
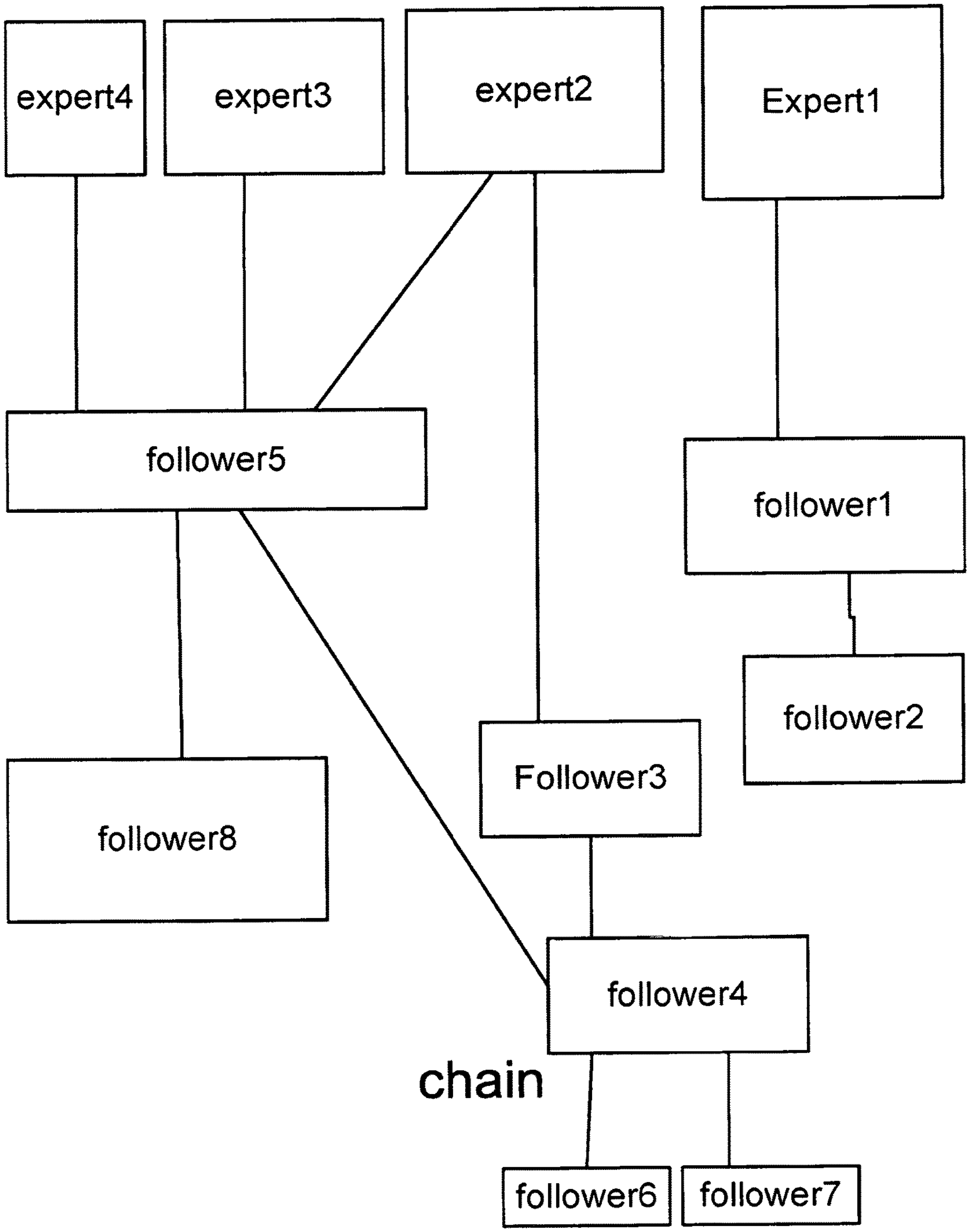
FIG. 33 is an embodiment for proxy betting system for chain of followers based on the main experts, as hierarchical.
Figure 34:
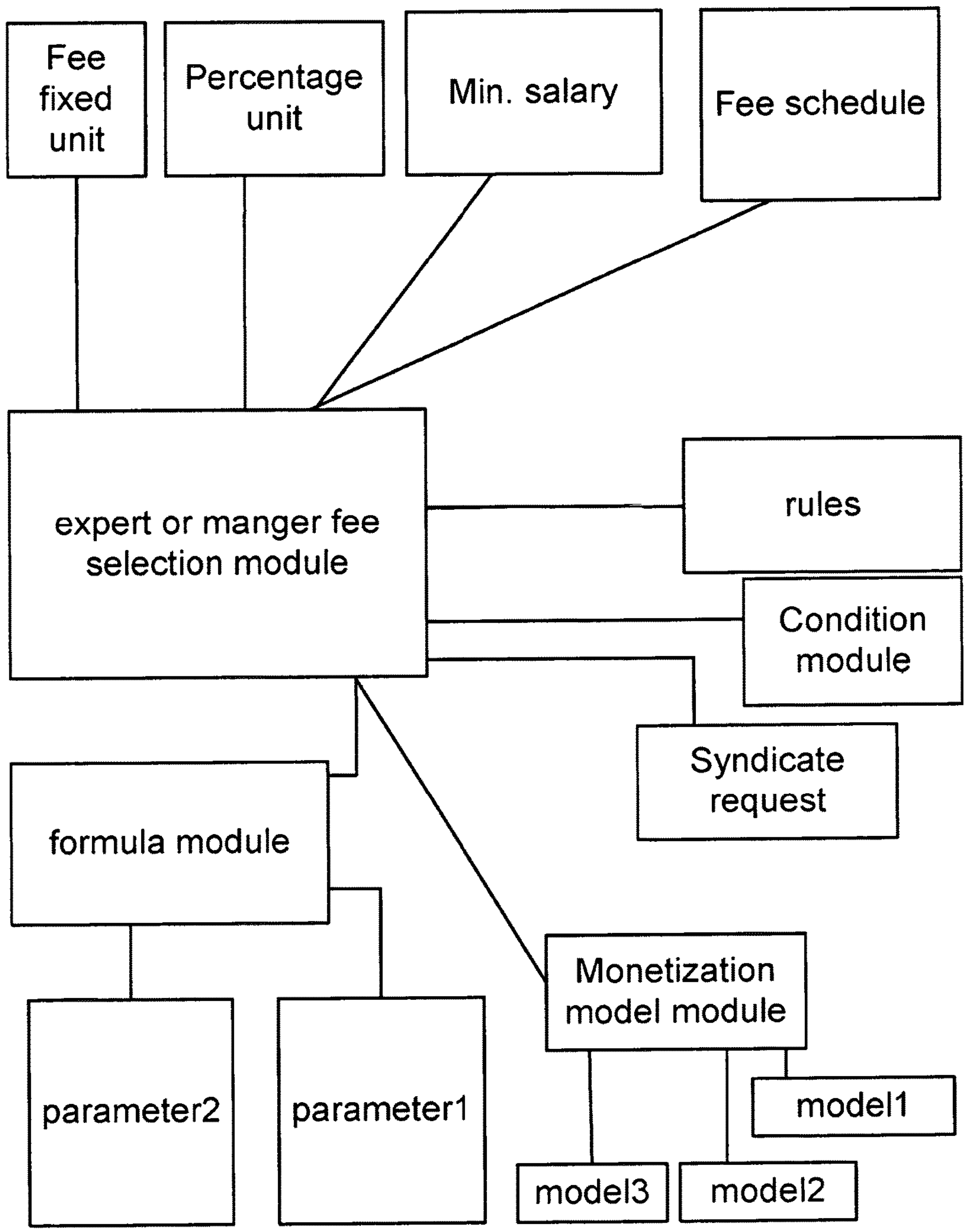
FIG. 34 is an embodiment for proxy betting system for different formulas, fees, and schedules.

FIG. 32 is an embodiment for proxy betting system for different limitations, feedback, and experts, with corresponding functions on the expert results, e.g., averaging their values, for betting purposes. FIG. 33 is an embodiment for proxy betting system for chain of followers based on the main experts, as hierarchical. FIG. 34 is an embodiment for proxy betting system for different formulas, fees, and schedules.

Figure 35:
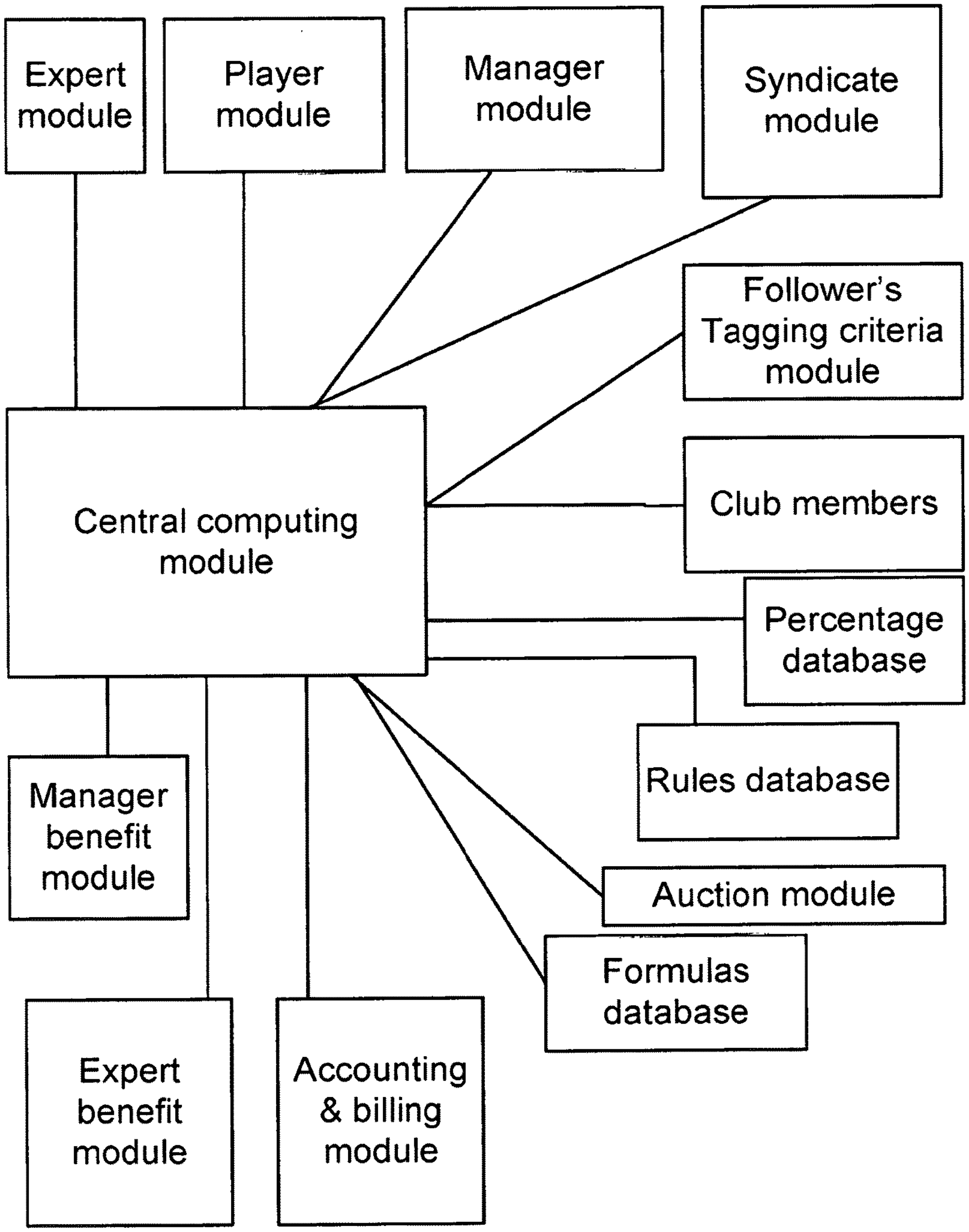
FIG. 35 is an embodiment for proxy betting system for different parties, and how they interact, and on what basis.
Figure 36:
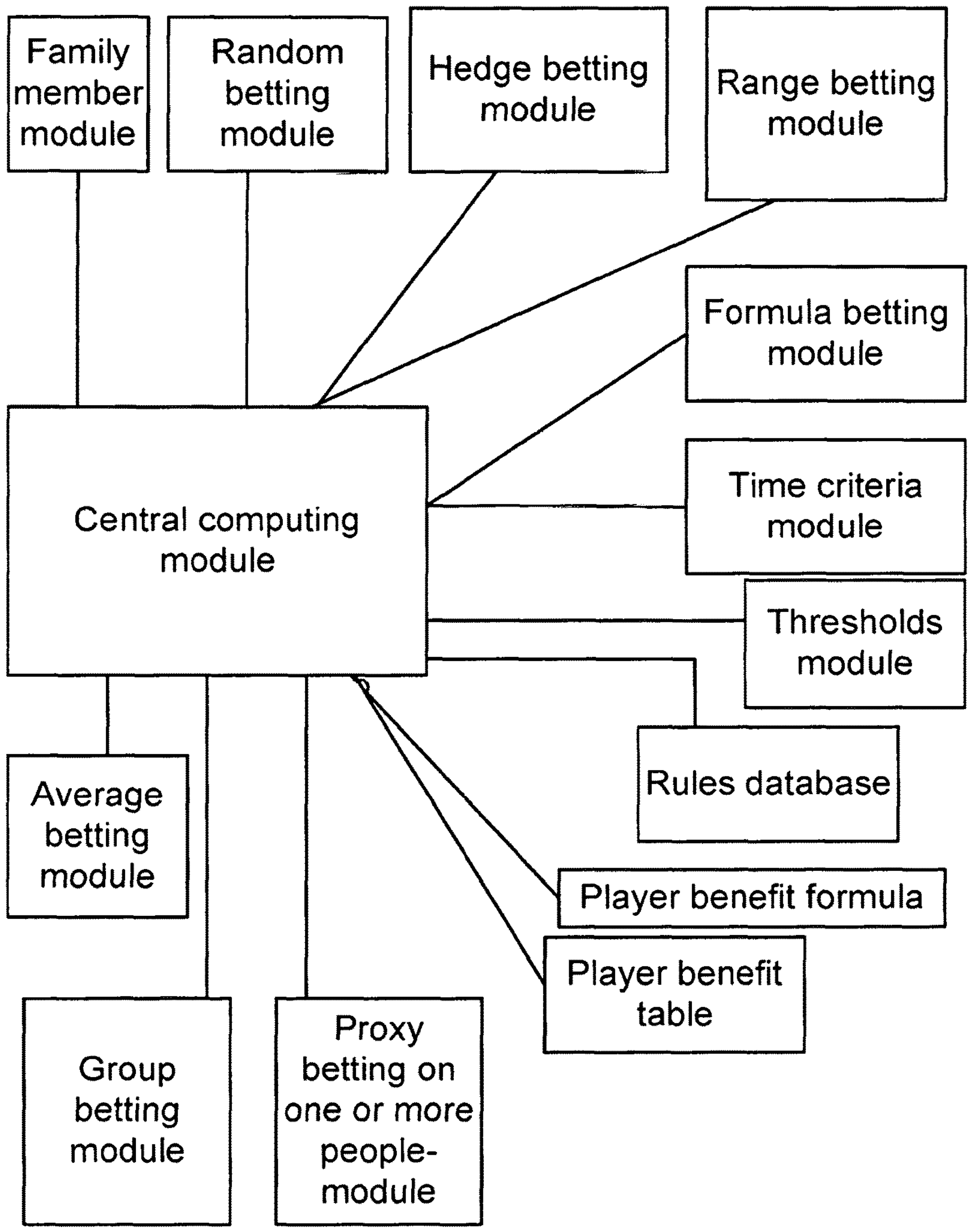
FIG. 36 is an embodiment for proxy betting system for different types of betting and their parameters.

FIG. 35 is an embodiment for proxy betting system for different parties, and how they interact, and on what basis. FIG. 36 is an embodiment for proxy betting system for different types of betting and their parameters.

When there is a big population, e.g., 10,000 people, they all can bet on one person on a machine in Las Vegas, or whatever he plays in a day, or on a specific format or session or game or class or type, or during a period, or multiple machines or in a casino or in a city, all tracked and accumulated by computer and network of devices. The minimum bet on a physical table or an electronic game may be 10,000 US$, but the follower can bet very small, e.g., 1 dollar, making it more popular. The size of bet could be reversed, i.e., larger, e.g., 100,000 US$, for a very rich follower. This can be for slot machines, mobile apps, regular table, card game, e.g., poker, physical game, e-game, slot machine systems, casino central computer, through network or Internet, online game, interactive, simulation, casino machine, PC, PDA, watch, smart phone, pad, slot management system, remote, in-casino, outside casino, or game box.

In one embodiment, the person buys a coupon or card or ticket to follow another person. In one embodiment, the person follows from social media site. In one embodiment, the person has separate bidding, automatically or manually set. In one embodiment, the person has ranking and prestige with prize and plaques. In one embodiment, the casino gets percentage or fixed dollar amount/currency/fee. In one embodiment, the person gets referral and a fee for that. In one embodiment, the person plays on a card/smart card. In one embodiment, it is connected to the bank account. In one embodiment, there is a player's card or club card.

In one embodiment, the new player is able to search for games in progress in same or different casinos or cities or places, from a large database or menu or choices, or the games in near future or scheduled for some time, or for specific people scheduled, or famous people or experts, or same physical location or property, or types of games, losing or winning games/machines/people/experts/casinos/places/managers/owners/ or the like, or how long or how often win/lose, statistics, continuous losing/winning, odds, breaks, how often, probability, standard deviation, norm, ratios, best/worst ratio or range, longest running, stat on hour/day/week/month/recent/year/life/for specific game/location/machine/event/etc., winning now, percentage for wins, total win so far, history, logs, tabs, records, or the like. This enables filtering and narrowing down the experts, or choosing from remote with no knowledge in advance, or by luck or randomly. Other embodiments are:

Tag along with expert.

Machine inviting to tag along with expert.

Humans inviting to tag along with expert.

One cannot go to all casinos, but can search for those criteria for lucky machine/expert/person, to tag along with him, with or without his knowledge, as options available.

The search is done once, or continuous or periodic, or as a notification comes, when an event happens or threshold met, e.g., saying "a lucky person H playing game T on date S", to make it easier to tag along.

Can do drag along in a syndicate or by manager choice, to force the new player for a min number of play, or time period or salary or fee or winning/losing or min engagement or min risk, or min dollar amount or percentage or events.

Can search on a phone or search engine for expert person.

Slot management system commands the devices and machines, to convert them to the proxy machines, or launching machines, or master machines for experts.

Piggyback on others' winning or success.

One can play on one machine and switch to proxy mode on the same machine at any time.

One can go proxy on specific game, or go to another casino, by online presence only.

They can be on the same system, or remote, or various entities.

Two casinos exchange values or dollar amount or percentages for the fees for handling other casino's proxy hosting or request, for the benefit of both casinos.

Having an exchange for fee exchange for all casinos participating.

One may be bored to play in a quiet small casino, but with large setting with crowd with much sound and view, through monitor or video, and many people winning with glamour, more people will play from remote.

The display shows the 2$^{nd}$ hall or casino, from remote.

It can show the screen of other machine, or person playing, or both, or with option for the above.

If one wants a person, or game, or machine, as specific one, or one passing the condition set upon, or the threshold passed, as the basis, then, one can search for those as criteria, e.g. from remote, and tag along with some or all of them, by filtering.

Having threshold, e.g., when somebody losses, or start losing, or start winning, or loses more than X, or winning more than Y, or for period of X losing, or for period of Y winning, or any if-then condition, or any situation defined by another person's win/lose/combo with time axis defined, with range of time, range of percentages, range of values, or the like, as condition(s) for trigger, to bet or stop betting or start betting or switch between people or transfer between games and machines or casinos.

Expert or "lucky guy" or perceived lucky person or machine or event or time or game or casino or object associated with them, or favorite, or for location/time/constraint for a presence in a remote location, or as convenience for location and time, or being in multiple places and events: as basis for leader or betting event.

One decides based on reason or condition or event or trigger to bet/not-bet or reverse, or with no reason at all.

Next player or 2$^{nd}$ player or remote player or novice player: following the leader.

Based on superstitious or lucky object/event, starting betting or stopping.

Sometimes, as option, mandatory, to drag along with the leader or expert or lucky guy, to drag along the new player, for some minimum number/amount of events/time/value/winning/losing/combo, as mandatory, min engagement.

Conditions/thresholds set by manager, expert, or owner: which can be as same people or different people/entities.

One condition: the hourly rate, or $/hr or percentages, for fee for work, for managing or playing or the like.

Owner of casino/game/machine/network is different from manager of syndicate, as one option.

Owner of casino is same as manager of syndicate, as one option.

2 casinos work as proxy, and helping each other or customers, and charge each other for proxy, hosting, or transfer, accordingly, as a fee or percentage.

It can be any system which is capable of doing the functions above.

Figure 37:
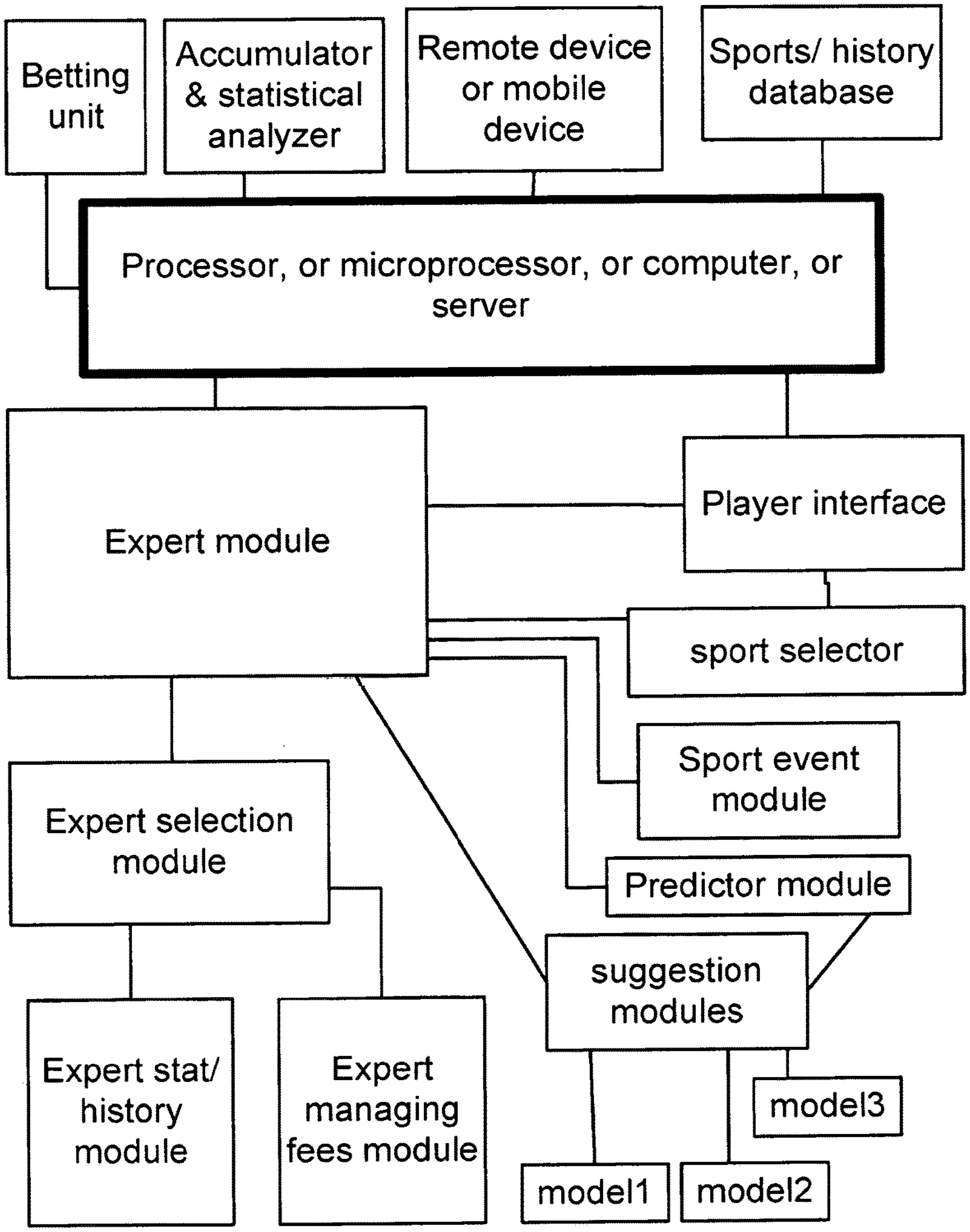
FIG. 37 is an embodiment for proxy betting system for different types of betting and their parameters.

FIG. 37 is an embodiment for proxy betting system for different types of betting and their parameters. In one embodiment, the player bets on sports/sports wagering, e.g., real games, fantasy games, or simulated games, or electronic table games or on devices, or real table games, at location or remotely. In one embodiment, the player is involved with enterprise wagering. In one embodiment, the player is involved from a remote location, e.g., off-site or out of state or out of country or off-shore or international location. In one embodiment, the player is pooling resources and assets from various parties, as a cash pool, and takes a lead. In one embodiment, the player bets on sports events, results, or combination of results, e.g., average scores in 5 games or for a season. In one embodiment, the dividend is paid on accumulated pool of bets in one syndicate, or as return on capital or investment. In one embodiment, the return is based on percentage, or min amount, or combination of them.

In one embodiment, the proxy betting is based on direct or indirect proxy role. For example, one may be proxy to another one, as a chain of proxies, that can extend more than one extension to multiple entities, e.g., similar to hierarchy or tree structure. For example, one may be putting bonds or guarantees for bets to be paid for himself or for others, as a cash reserve or equivalent, to back up the casino or game website, to make sure the bets are covered or backed by the house or casino or website. For example, one may be pulling the cash from other people on opposite sides of a bet to try to balance all winnings with losses of others, or alternatively, has a reserve for all winnings to be paid directly by the house, directly or as a backup plan.

In one embodiment, the platform for the betting is virtual, physical, electronic, on mobile device, mobile app, on phone, on tablet, on computer, on laptop, on cloud, call-in, PDA, at remote place, on computing or communication device, or the like. In one embodiment, the expert is sports writer, blogger, commentator, well-known person, or the like, to create or initiate a fund, for example, for sports or table games or racing or car racing or horse or dog racing, e.g., poker. In one embodiment, there are multiple types of games, or connected games, or network games with multi-players, remotely, on one or more machines or computers or devices. In one embodiment, the leader gets a percentage or fixed or combination or rewards or based on performance or formulas, e.g., as management fee, e.g., in all cases, or in the case of winning, only, or as a fixed salary, or as employee or contractor, for managing the pool.

In one embodiment, we have this for bookings such as horse, dog, car, or other racings. In one embodiment, we can select a person to choose whatever they choose themselves, to go for us, as well. In one embodiment, we can select a person to guide us or advice us or pick for us, but not obligated to listen to him 100 percent. In one embodiment, we can select a person to guide us, and we are obligated to listen to him 100 percent, blindly. In multiple embodiments, we can select a person to pick for us, or buy for us, or bet for us, or decide for us. In one embodiment, we can select a person to select winners or losers, e.g., in sports or teams e.g. basketball, with corresponding point spreads, and gets a commission of a fixed fee, plus a percentage of the winnings. In one embodiment, we can select a guidance and a guru or expert, and at the end of the year, e.g., the system rewards the guru's follower with the best results (e.g. in terms of income or rate or outcome or winnings or percentage or performance or average or overall or relative improvement) some grand prize, in addition to regular betting and winnings, that encourages following the guru in the future.

Other variations or examples are also covered here, as embodiments: live casino games, table games, sports betting, daily fantasy sports, and simulation sports, as well as betting on celebrities, friends, proxies, or someone who always bets on a specific team or teams from a specific town/area. Proxy or agent betting also includes sports betting. Syndicate or union betting is included, in which a single individual/company is betting on behalf of a group of individuals, with or without their input on specific events. Manager of Syndicate bets a salary and/or percentage of the win, in one embodiment. Group betting is included, where a number of betting entities pool on a single decision. Other variations include: Table games and sports betting, or fantasy sports and daily fantasy sports, or betting on experts themselves, as well as the games the experts pick, e.g., betting on experts against each other, or pool(s) of experts and/or betting entities. The expert/leader player is a regular person, a company, an entity, a marketing firm, an aggregator firm, a public relationship firm, an investing firm, an investor, a signing-up firm, an intermediary firm, a middleman, an agent, a celebrity, a smart person, an athlete, proxy on proxy, chain or proxy, nested proxy in proxy, for N chains, or a knowledgeable person. These also apply to point spreads, point totals for over/under, money-line wagers, fantasy sports, and daily fantasy sports, as various embodiments.

In one embodiment, for proxy, we have a player bet for or against or hedge against other player/group/machine/bank of machines/casino/casinos/set of games/set of hardware, which bet can be dollar for dollar/percentage base/for entire play time/limited time/time increments/handle pulls/switch from "for" to "against" and vice versa/switch to win after so many losses or so much losses and vice versa.

In one embodiment, the proxy plays along more than one entity, or can bet on multiple players at the same time, or distribute the funds or percentage or dollar value among them, based on formula and rules or predetermined settings beforehand or dynamically changed during the game, or triggered or changed based on conditions or events.

It can be view play and/or trend of play/player/specific type of game, in real time or with delay with page flip, and/or stock market style graphs or similar mechanism. Player is e.g. provided with analysis. Analysis can be emailed to player or multiple emails or saved into proxy player's account. It can be kept and accessed at machine level by player/proxy player/potential proxy players, at later time for review, with or without encryption/biometric access/free/for fee/subscription/membership/limited-time free access, as examples/options.

"Pro player" or fave/favorite player history analysis can be available for review at machine level or emailed or saved into proxy player's account. Proxy play can be many levels/layers deep. It can be for sports (or electronic sports). It can be betting on/against player of electronic game of chance and/or skill, or mixture of both, e.g., backgammon and chess type games. It can be pool style betting.

It can be betting on which original player wins more at the end (when one or both quit playing) (or by a predetermined time or period of time). This can be either players chosen at random by proxy player or players who are playing in a slot tournament. It covers basic slot machine (electronic game of chance) and other extensions in slots (electronic game of skill/chance and electronic game of skill).

It can be play casino games as a proxy player on a stationary unit with various ways to display games that are being played/winning/losing/how long they game has been going on/how much money the original player has left now/trend of current game/trend of day/trend of unit/trend of original player in general and/or today/this week/this year/years, or history and all statistics or comparisons between the featured players, with tables and graphs, or searchable based on databases and numbers and tables for various query and conditions for specific game or player or type of game or casino.

It can be the privacy set by the main player or agreed to show/announce/broadcast/publicize to others his statistics/winnings, to become famous and get income or percentage of win from it, as the player of choice for others, as the ones that are hidden from public are less likely being used as leaders for proxy games. So, the more the expert is public and the better the history, the easier for others to follow and bet on him, with more followers and less risk (for having access to known history for the leader/expert in the game, for people to follow, as proxy).

It can be play casino games on a portable device (i.e. tablet) as a proxy player and connect via wireless method (i.e. Bluetooth), or Internet, or cable or optical connections, to games that interest the public, as he/she, as a member of public, walks around and observes. Or, he/she follows a player that interests him/her, either physically or by logging into a system and follow his activity via his players card log in or his account specific to proxy play.

It can be play casino games as a proxy player via Internet, either only within the property or within city/county limits or within parameters of law of land or rules and policies of purveyor. For example, this allows player to play on his laptop or tablet from his room, while he rests or his wife gets dressed for dinner (with nothing else to do), making it very mobile and accessible at all times, thus, increasing the usages for public.

There can be a website specific to proxy gaming where players can research and choose what player/game/property/the like to follow and bet on. There could be many levels of membership that would allow anywhere from very limited to full access to various information for research and choosing. Also, wherever it is legal, much of proxy betting as explained above (and in older specs of the parent cases) can be done on/through this website.

There can be a communal gaming. There can be server based. There can be 100% passive gaming as secondary player, or partially, or active, or some portion active, e.g., choosing some parameters by the follower in the game, as e.g. 80 percent done by the leader and 20 percent by the follower, so that follower can feel that there is some contribution in the game so that it feels more exciting and involved in the game, in addition to following on the leader's result and relying on the leader, as well.

There can be a proxy machine would increase the number of popular machines. If a certain game happens to be very popular among players today, a property can still only get so many units of it. So, let's say there is a bank of 8 of those games on a floor, but there are probably another few players who wish they could be playing that game. If that game is now available to play at a proxy machine, the players, the casino and the manufacturer will all benefit from the extra player being able to play their favorite game. This will also provide a tool for management to gauge whether they should purchase more units of a popular game. Also, this way, with proxy, they can change games, as the popularity of the games change, and there is a shift on the most popular game, which simply can replace by proxy, without any need of real upgrade or substitution, which is very expensive and not practical at all in a short time period. This makes the game more flexible per device or machine to attract more people in.

Secondary player's game ends when the primary player stops playing. At this point, the secondary player gets a certain period of time to reserve the main game and walk over to the machine and begin his own game. First and foremost, however, the primary player gets a few seconds of grace period to insert more cash into his machine before a proxy player reserves it. Or, a new leader player can sit in or replace the original or they can switch or overlap or not overlap, or physically or in abstract, replace each other in the leadership position, for people to follow. This provides a great urgency for both players to decide whether they want to continue on the machine, for more demands for the machine.

In one embodiment, we have converting or reconfiguring a different machine to proxy or simulate or follow or act as said electronic gaming device; with some other options:

providing a user-interface for privacy setting.
The expert player has an ID, and hidden from public.
Using more than one experts, with access using fees, and filtered for privacy by expert.
Partially guided by expert.
Fully guided by expert.
Replace one expert with another one.
2 experts working together.
Bet against one expert & follow another one.
Hedge against one expert.
Reserve seat on a machine, by following an expert, or pay in advance.
Expert can sit more on same machine, within some time period.
Using guide on game of pure chance.
Using guide on game of pure chance, plus strategies and thinking.
providing proxy between a first casino to a second casino for a given game.
providing proxy between a first manufacture to a second manufacture for a given game.
providing proxy machine or virtual machine for a first entity, from a second entity;
charging fee or giving percentage for said providing proxy machine or virtual machine, or reservation fee, on said first entity, said second entity, said expert player, and/or said first player.
for a given game or type of machine or a specific machine, providing proxy machine or virtual machine or simulation machine.
providing proxy machine for future game played by another person, reserved for a user.
providing proxy machine for delayed game played by another person, reserved for a user.
providing proxy machine for future game played by another person, reserved for a user, for a predetermined time in future, already set by said user, for a given machine or game or type of game.
providing proxy, with no input from a user.
providing proxy, following a machine or computer device or randomizer computing module, as a leader to follow for proxy mechanism.

Any variations of the above teaching is also intended to be covered and protected by the current patent application. Any 2 or more embodiments can be combined or mixed, as well.

The invention claimed is:

1. A method of conducting a game of chance for a sport event, said method comprising:

a processor receiving a name of an expert player from an expert database;
wherein an electronic gaming device comprises said processor;
said processor receiving a history and statistical data for performance of said expert player from a performance database;
wherein said processor is within a game hardware module;
wherein said game of chance is based on a random number generated by a random number generator;
wherein said random number is based on a probability or probability distribution for a parameter value or an event;
said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

said expert player guiding said first player on said game of chance;

specifying a second value of currency from a portion of a gross value submitted by said first player;

wherein said second value of currency is stated as an absolute value or as a percentage portion of said gross value;

specifying a third value of currency for betting on another expertise player;

wherein said third value of currency is less than or equal to difference of said gross value and said second value of currency;

said first player betting said second value of currency on said game of chance on said remote device, based on said guidance from said expert player;

said processor producing a second outcome for said first player betting said second value of currency on said game of chance on said sport team, winning, outcome, final ranking, relative ranking, remaining teams, monthly groupings, weekly groupings, playoffs, or point spreads.

2. A method of conducting a game of chance for a sport event, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

said expert player partially guiding said first player on said game of chance;

specifying a second value of currency from a portion of a gross value submitted by said first player;

wherein said second value of currency is stated as an absolute value or as a percentage portion of said gross value;

specifying a third value of currency for betting on another expertise player;

wherein said third value of currency is less than or equal to difference of said gross value and said second value of currency;

said first player betting said second value of currency on said game of chance on said remote device, based on said partially guidance from said expert player;

said processor producing a second outcome for said first player betting said second value of currency on said game of chance on said sport team, winning, outcome, final ranking, relative ranking, remaining teams, monthly groupings, weekly groupings, playoffs, or point spreads;

wherein said first player controls or determines at least one parameter for or affecting said second outcome on said game of chance on said sport team.

3. A method of conducting a game of chance for a sport event, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

said expert player guiding said first player on said game of chance;

specifying a second value of currency from a portion of a gross value submitted by said first player;

wherein said second value of currency is stated as an absolute value or as a percentage portion of said gross value;

specifying a third value of currency for betting on another expertise player;

wherein said third value of currency is less than or equal to difference of said gross value and said second value of currency;

said another expertise player guiding said first player on said game of chance, replacing said expert player;

said first player betting said second value of currency on said game of chance on said remote device, based on said guidance from said another expertise player;

said processor producing a second outcome for said first player betting said second value of currency on said game of chance on said sport team, winning, outcome, final ranking, relative ranking, remaining teams, monthly groupings, weekly groupings, playoffs, or point spreads.

4. A method of conducting a game of chance for a sport event, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

said expert player guiding said first player on said game of chance;

specifying a second value of currency from a portion of a gross value submitted by said first player;

wherein said second value of currency is stated as an absolute value or as a percentage portion of said gross value;

specifying a third value of currency for betting on another expertise player;

wherein said third value of currency is less than or equal to difference of said gross value and said second value of currency;

said another expertise player guiding said first player on said game of chance, together with said expert player;

said first player betting said second value of currency on said game of chance on said remote device, based on said guidance from said another expertise player and said expert player;

said processor producing a second outcome for said first player betting said second value of currency on said game of chance on said sport team, winning, outcome, final ranking, relative ranking, remaining teams, monthly groupings, weekly groupings, playoffs, or point spreads.

5. A method of conducting a game of chance for a sport event, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

said expert player guiding said first player on said game of chance;

specifying a second value of currency from a portion of a gross value submitted by said first player;

wherein said second value of currency is stated as an absolute value or as a percentage portion of said gross value;

specifying a third value of currency for betting against another expertise player;

wherein said third value of currency is less than or equal to difference of said gross value and said second value of currency;

said another expertise player reversely-guiding said first player on said game of chance, together with guidance from said expert player;

said first player betting said second value of currency on said game of chance on said remote device, based on said guidance from said expert player and reverse-guidance from said another expertise player;

said processor producing a second outcome for said first player betting said second value of currency on said game of chance on said sport team, winning, outcome, final ranking, relative ranking, remaining teams, monthly groupings, weekly groupings, playoffs, or point spreads.

6. A method of conducting a game of chance for a sport event, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database, to bet against said expert player;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

said expert player reversely-guiding said first player on said game of chance;

specifying a second value of currency from a portion of a gross value submitted by said first player;

wherein said second value of currency is stated as an absolute value or as a percentage portion of said gross value;

specifying a third value of currency for betting against another expertise player;

wherein said third value of currency is less than or equal to difference of said gross value and said second value of currency;

said another expertise player reversely-guiding said first player on said game of chance, together with reverse-guidance from said expert player;

said first player betting said second value of currency on said game of chance on said remote device, based on said reverse-guidance from said expert player and reverse-guidance from said another expertise player;

said processor producing a second outcome for said first player betting said second value of currency on said game of chance on said sport team, winning, outcome, final ranking, relative ranking, remaining teams, monthly groupings, weekly groupings, playoffs, or point spreads.

7. A method of conducting a game of chance for a sport event, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database, to follow said expert player on said game of chance and have an option to replace said expert player on said electronic gaming device;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

said expert player guiding said first player on said game of chance;

specifying a second value of currency submitted by said first player;

said first player betting said second value of currency on said game of chance on said remote device, based on said guidance from said expert player;

said processor producing a second outcome for said first player betting said second value of currency on said game of chance on said sport team, winning, outcome, final ranking, relative ranking, remaining teams, monthly groupings, weekly groupings, playoffs, or point spreads;

after expert player finishes playing on said electronic gaming device, said first player replacing said expert player on said electronic gaming device.

8. A method of conducting a game of chance for a sport event, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database, to have an option to replace said expert player on said electronic gaming device;

said first player paying said expert player or said syndicate for said game of chance on said electronic gaming device or owner of said electronic gaming device, for said option to replace said expert player on said electronic gaming device, for a limited amount of time after said expert player finishes playing on said electronic gaming device;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

after expert player finishes playing on said electronic gaming device, and before said limited amount of time passes, said first player replacing said expert player on said electronic gaming device;

said processor producing a second outcome for said first player betting a second value of currency on said game of chance on said sport team, winning, outcome, final ranking, relative ranking, remaining teams, monthly groupings, weekly groupings, playoffs, or point spreads.

9. A method of conducting a game of chance for a sport event, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance for said sport event;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database, to follow said expert player on said game of chance and have an option to replace said expert player on said electronic gaming device within a fixed period of time after said expert player interrupts on playing on said electronic gaming device;

said expert player betting a first value of currency on said game of chance on said electronic gaming device for a sport team, winning, outcome, final ranking, relative ranking, remaining teams, monthly groupings, weekly groupings, playoffs, or point spreads;

said processor producing a first outcome for said expert player betting said first value of currency on said game of chance;

said electronic gaming device communicating with a remote device;

said expert player guiding said first player on said game of chance;

specifying a second value of currency submitted by said first player;

said first player betting said second value of currency on said game of chance on said remote device, based on said guidance from said expert player;

said processor producing a second outcome for said first player betting said second value of currency on said game of chance on said sport team, winning, outcome, final ranking, relative ranking, remaining teams, monthly groupings, weekly groupings, playoffs, or point spreads;

after expert player interrupts on playing on said electronic gaming device, and before said fixed period of time passes, said expert player continues playing on said electronic gaming device.

10. A method of conducting a game of chance for a slot machine or a table game, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database;

said expert player betting a first value of currency on said game of chance on said electronic gaming device for said slot machine or said table game;

said processor producing a first outcome for said expert player betting said first value of currency on said game of chance;

said electronic gaming device communicating with a remote device;

said expert player guiding said first player on said game of chance;

said first player betting said a second value of currency on said game of chance on said remote device, based on said guidance from said expert player;

said processor producing a second outcome for said first player betting said second value of currency on said game of chance.

11. The method of conducting a game of chance for a slot machine or a table game as recited in claim 10, said method comprising:

a manager choosing said expert player.

12. The method of conducting a game of chance for a slot machine or a table game as recited in claim 10, said method comprising:

converting or reconfiguring a different machine to proxy or simulate or follow or act as said electronic gaming device.

13. The method of conducting a game of chance for a slot machine or a table game as recited in claim 10, said method comprising:

providing a user-interface for privacy setting.

14. The method of conducting a game of chance for a slot machine or a table game as recited in claim 10, said method comprising:

providing proxy between a first casino to a second casino for a given game.

15. The method of conducting a game of chance for a slot machine or a table game as recited in claim 10, said method comprising:

providing proxy between a first manufacture to a second manufacture for a given game.

16. The method of conducting a game of chance for a slot machine or a table game as recited in claim 10, said method comprising:

providing proxy machine or virtual machine for a first entity, from a second entity;

charging fee or giving percentage for said providing proxy machine or virtual machine, or reservation fee, on said first entity, said second entity, said expert player, and/or said first player.

17. The method of conducting a game of chance for a slot machine or a table game as recited in claim 10, said method comprising:

for a given game or type of machine or a specific machine, providing proxy machine or virtual machine or simulation machine.

18. The method of conducting a game of chance for a slot machine or a table game as recited in claim 10, said method comprising:

providing proxy machine for future game played by another person, reserved for a user.

19. The method of conducting a game of chance for a slot machine or a table game as recited in claim 10, said method comprising:

providing proxy machine for delayed game played by another person, reserved for a user.

20. The method of conducting a game of chance for a slot machine or a table game as recited in claim 10, said method comprising:

providing proxy machine for future game played by another person, reserved for a user, for a predetermined time in future, already set by said user, for a given machine or game or type of game.

21. The method of conducting a game of chance for a slot machine or a table game as recited in claim 10, said method comprising:

providing proxy, with no input from a user.

22. The method of conducting a game of chance for a slot machine or a table game as recited in claim 10, said method comprising:

providing proxy, following a machine or computer device or randomizer computing module, as a leader to follow for proxy mechanism.

23. A method of conducting a game of chance for a slot machine or a table game, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on permission or privacy level of said expert player, and based on subscription model for said expert player to get a fixed amount of money beforehand or a percentage of net or gross wins for each session of said game of chance;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database;

said expert player betting a first value of currency on said game of chance on said electronic gaming device for said slot machine or said table game;

said processor producing a first outcome for said expert player betting said first value of currency on said game of chance;

said electronic gaming device communicating with a remote device;

said expert player guiding said first player on said game of chance, with skills and strategies involved in said game of chance;

said first player betting said a second value of currency on said game of chance on said remote device, based on said guidance and said skills and strategies from said expert player;

said processor producing a second outcome for said first player betting said second value of currency on said game of chance.

24. The method of conducting a game of chance for a slot machine or a table game as recited in claim 23, said method comprising:

a manager choosing said expert player.

25. The method of conducting a game of chance for a slot machine or a table game as recited in claim 11, said method comprising:

converting or reconfiguring a different machine to proxy or simulate or follow or act as said electronic gaming device.

26. The method of conducting a game of chance for a slot machine or a table game as recited in claim 23, said method comprising:

providing a user-interface for privacy setting.

27. A method of conducting a game of chance for a slot machine or a table game, said method comprising:

a processor receiving a name of an expert player from an expert database;

wherein an electronic gaming device comprises said processor;

said processor receiving a history and statistical data for performance of said expert player from a performance database;

wherein said processor is within a game hardware module;

wherein said game of chance is based on a random number generated by a random number generator;

wherein said random number is based on a probability or probability distribution for a parameter value or an event;

said processor displaying said history and statistical data for performance of said expert player on a device monitor, based on a unique randomly generated number as an identification for said expert player, hiding real name of said expert player;

wherein said history and statistical data for performance of said expert player are tracked by a machine aggregator module within said electronic gaming device;

wherein said history and statistical data for performance of said expert player are stored in a first memory unit;

said processor ranking said expert player based on said history and statistical data for performance of said expert player;

selecting said expert player for a syndicate for said game of chance on said electronic gaming device;

a first player choosing said expert player from said syndicate's database, using said identification for said expert player;

said expert player betting a first value of currency on said game of chance on said electronic gaming device for said slot machine or said table game;

said processor producing a first outcome for said expert player betting said first value of currency on said game of chance;

said electronic gaming device communicating with a remote device;

said expert player guiding said first player on said game of chance;

said first player betting said a second value of currency on said game of chance on said remote device, based on said guidance from said expert player;

said processor producing a second outcome for said first player betting said second value of currency on said game of chance.

28. The method of conducting a game of chance for a slot machine or a table game as recited in claim 27, said method comprising:

a manager choosing said expert player.

29. The method of conducting a game of chance for a slot machine or a table game as recited in claim 27, said method comprising:

converting or reconfiguring a different machine to proxy or simulate or follow or act as said electronic gaming device.

30. The method of conducting a game of chance for a slot machine or a table game as recited in claim 27, said method comprising:

providing a user-interface for privacy setting.

* * * * *